United States Patent
Gao et al.

(10) Patent No.: US 10,897,761 B2
(45) Date of Patent: Jan. 19, 2021

(54) DATA TRANSMISSION METHOD, TERMINAL AND BASE STATION OF PROCESSING DATA TRANSMISSION IN DIFFERENT TTI LENGTHS

(71) Applicant: CHINA ACADEMY OF TELECOMMUNICATIONS TECHNOLOGY, Beijing (CN)

(72) Inventors: Xuejuan Gao, Beijing (CN); Fangchen Cheng, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 10 days.

(21) Appl. No.: 16/301,425

(22) PCT Filed: Apr. 25, 2017

(86) PCT No.: PCT/CN2017/081880
§ 371 (c)(1),
(2) Date: Nov. 13, 2018

(87) PCT Pub. No.: WO2017/193809
PCT Pub. Date: Nov. 16, 2017

(65) Prior Publication Data
US 2019/0174492 A1    Jun. 6, 2019

(30) Foreign Application Priority Data
May 13, 2016    (CN) .......................... 2016 1 0320186

(51) Int. Cl.
*H04W 72/04*    (2009.01)
*H04W 72/12*    (2009.01)
(Continued)

(52) U.S. Cl.
CPC ...... *H04W 72/0446* (2013.01); *H04B 7/0628* (2013.01); *H04L 5/0044* (2013.01);
(Continued)

(58) Field of Classification Search
CPC ... H04L 5/0007; H04L 5/0053; H04L 5/0048; H04L 5/001; H04L 1/0031; H04L 1/0088;
(Continued)

(56) References Cited

U.S. PATENT DOCUMENTS

2012/0087314 A1    4/2012 Maeda et al.
2013/0223402 A1*   8/2013 Feng ................. H04L 5/0023
                                                    370/330
(Continued)

FOREIGN PATENT DOCUMENTS

CN    103687009 A    3/2014
CN    104067683 A    9/2014
(Continued)

OTHER PUBLICATIONS

Extended European Search Report from EP app. No. 17795427.8, dated Mar. 29, 2019.
(Continued)

*Primary Examiner* — Sai Aung
(74) *Attorney, Agent, or Firm* — Ladas & Parry, LLP

(57) ABSTRACT

A data transmission method, a terminal and a base station are provided. The data transmission method includes: determining, by a terminal, data transmitted in the first TTI length and/or data transmitted in the second TTI length that are processed in a same sub-frame based on capability reported by the terminal or a predefined rule, the data including a shared channel and/or a control channel; wherein the first TTI length is less than the second TTI length.

22 Claims, 6 Drawing Sheets

(51) Int. Cl.
  *H04L 5/00*  (2006.01)
  *H04B 7/06*  (2006.01)
  *H04W 72/02*  (2009.01)
  *H04B 7/0413*  (2017.01)

(52) U.S. Cl.
  CPC .......... *H04W 72/02* (2013.01); *H04W 72/12* (2013.01); *H04B 7/0413* (2013.01); *H04L 5/001* (2013.01); *H04L 5/0023* (2013.01); *H04L 5/0048* (2013.01)

(58) Field of Classification Search
  CPC . H04L 1/1671; H04L 27/2601; H04L 5/0092; H04L 1/0003; H04L 1/0007; H04L 1/005
  See application file for complete search history.

(56) References Cited

U.S. PATENT DOCUMENTS

| | | | |
|---|---|---|---|
| 2013/0242729 A1* | 9/2013 | Chen ................ | H04W 28/0289 370/230 |
| 2015/0016431 A1* | 1/2015 | Ranta-Aho ....... | H04W 72/0406 370/336 |
| 2015/0351093 A1 | 12/2015 | Au et al. | |
| 2016/0066316 A1 | 3/2016 | Bhushan et al. | |
| 2016/0095137 A1* | 3/2016 | Chen ................... | H04L 5/0007 370/329 |
| 2016/0128095 A1 | 5/2016 | Damnjanovic et al. | |
| 2017/0135084 A1* | 5/2017 | Kuchibhotla ........ | H04L 5/0007 |

FOREIGN PATENT DOCUMENTS

| | | |
|---|---|---|
| CN | 104303565 A | 1/2015 |
| CN | 104620629 A | 5/2015 |
| CN | 105407524 A | 3/2016 |
| EP | 1816807 A1 | 8/2007 |
| JP | 2016059075 A | 4/2016 |
| WO | 2015179136 A1 | 11/2015 |
| WO | 2016069141 A1 | 5/2016 |

OTHER PUBLICATIONS

First Office Action and Search Report from CN app. No. 201610320186.8, dated May 13, 2019, with English translation from Global Dossier.
Written Opinion of the International Searching Authority from PCT/CN2017/081880, dated Jun. 30, 2017, with English translation from WIPO.
International Preliminary Report on Patentability from PCT/CN2017/081880, dated Nov. 13, 2018, with English translation from WIPO.
International Search Report for PCT/CN2017/081880 dated Jun. 30, 2017 and its English translation provided by WIPO.
Written Opinion of the International Search Authority PCT/CN2017/081880 dated Jun. 30, 2017 and its English translation provided by Google Translate.
Notice of Reasons for Refusal from Jp app. No. 2018-559920, dated Oct. 23, 2019, with English translation from Global Dossier.
"Views on TTI length", R1-162108, 3GPP TSG RAN WG1 Meeting #84bis, Busan, Korea, Apr. 11-15, 2016.
"Discussion on the simultaneous transmissions of normal TTI and sTTI", R1-164235, 3GPP TSG RAN WG1 Meeting #85, Nanjing, China, May 23-27, 2016.

* cited by examiner determining, by a terminal, data transmitted in a first TTI length and/or data transmitted in a second TTI length that are processed in a same sub-frame based on capability reported by the terminal or a pre-defined rule, the data including a shared channel and/or a control channel; wherein the first TTI length is less than the second TTI length.

/ 11

Fig. 1 determining, by a base station, data transmitted in a first TTI length and/or data transmitted in a second TTI length that are processed by a terminal in a same sub-frame based on capability reported by the terminal or a pre-defined rule, the data including a shared channel and/or a control channel; wherein the first TTI length is less than the second TTI length.

/ 21

Fig. 2

DATA TRANSMISSION METHOD, TERMINAL AND BASE STATION OF PROCESSING DATA TRANSMISSION IN DIFFERENT TTI LENGTHS

CROSS-REFERENCE TO RELATED APPLICATIONS

The present application is a U.S. national phase application of PCT Application No. PCT/CN2017/081880 filed on Apr. 25, 2017, which claims a priority to a Chinese patent application No. 201610320186.8 filed in China on May 13, 2016, the disclosures of which are incorporated herein by reference in their entireties.

TECHNICAL FIELD

The present disclosure relates to the field of communication technology, in particular to a data transmission method, a terminal and a base station.

BACKGROUND

With the development of mobile communication service requirements, organizations such as the ITU have defined higher user side delay performance requirements for future mobile communication systems. One of the main ways to reduce user delay performance is to reduce the Transmission Time Interval (TTI) length. In the future system communication system, both a short TTI data transmission and a traditional TTI length data transmission coexist, and the specific data transmission scheme has not been determined yet.

The traditional TTI refers to one sub-frame defined in the LTE system, that is, a TTI with a length of 1 ms; the short TTI refers to a TTI with a transmission length of less than 1 ms. It is determined that uplink channels supporting short TTI transmission at least include a short physical uplink control channel (s-PUCCH, Short Physical Uplink Control CHannel) and a short physical uplink shared channel (s-PUSCH, Short Physical Uplink Shared CHannel). The downlink channels supporting short TTI transmission at least include a short physical downlink control channel (s-PDCCH, Short Physical Downlink Control CHannel) and a short physical downlink shared channel (s-PDSCH, Short Physical Downlink Shared CHannel).

In the related art, for downlink data transmission, a terminal can receive only one data transmission in one sub-frame and on one carrier, and the data transmission can be a single transport block (Transport Block (TB)) transmission or two transport blocks transmission. In a sub-frame, only one data transmission can be transmitted on one carrier, and the data transmission can be a single TB transmission or two TBs transmission.

In the subsequent evolution of the communication system, short TTI and traditional TTI transmission can distributed on system spectrum resources by TDM (Time Division Multiplexing), FDM (Frequency Division Multiplexing), or TDM+FDM. For a same terminal, there is no clear solution on how to process short TTI transmissions and traditional TTI transmissions.

SUMMARY

An object of the present disclosure is to provide a data transmission method, a terminal and a base station, so as to solve the problem in the relate art that one terminal cannot process data transmission in different TTI lengths.

In order to solve the above problem, the present disclosure provides in some embodiments a data transmission method, including: determining, by a terminal, data transmitted in a first Transmission Time Interval (TTI) length and/or data transmitted in a second TTI length that are processed in a same sub-frame based on capability reported by the terminal or a predefined rule, the data including a shared channel and/or a control channel, wherein the first TTI length is less than the second TTI length.

In some embodiments, the determining, by a terminal, data transmitted in the first TTI length and/or data transmitted in the second TTI length that are processed in a same sub-frame based on capability reported by the terminal or a predefined rule includes at least one of: Mode 1: determining the data transmitted in the first TTI length and/or the data transmitted in the second TTI length that are processed in the same sub-frame based on carrier aggregation capability and/or multiple-input multiple-output (MIMO) capability reported by the terminal; Mode 2: determining the data transmitted in the first TTI length and/or the data transmitted in the second TTI length that are processed in the same sub-frame based on capability of an upper limit value of quantity of transport blocks (TB) that are simultaneously processed in the same sub-frame or the capability of an upper limit value of quantity of TTIs that are simultaneously processed in the same sub-frame, reported by the terminal; and Mode 3: determining the data transmitted in the first TTI length and/or the data transmitted in the second TTI length that are processed in the same sub-frame based on capability of whether the data transmitted in the first TTI length and the data transmitted in the second TTI length are simultaneously processed in the same sub-frame reported by the terminal.

In some embodiments, the determining the data transmitted in the first TTI length and/or the data transmitted in the second TTI length that are processed in the same sub-frame based on the capability of whether the data transmitted in the first TTI length and data transmitted in the second TTI length are simultaneously processed in the same sub-frame, reported by the terminal includes: when the capability reported by the terminal indicates that the terminal supports the data transmitted in the first TTI length and the data transmitted in the second TTI length being simultaneously processed in the same sub-frame, if the data transmitted in the first TTI length and the data transmitted in the second TTI length are simultaneously scheduled in a current sub-frame, the data transmitted in the first TTI length and the data transmitted in the second TTI length being simultaneously processed by the terminal in the current sub-frame; or determining, by the terminal, the data transmitted in the first TTI length and/or the data transmitted in the second TTI length that are processed by the terminal in the same sub-frame based on Mode 1 or Mode 2; when the capability reported by the terminal indicates that the terminal does not support the data transmitted in the first TTI length and the data transmitted in the second TTI length being simultaneously processed in the same sub-frame, if the data transmitted in the first TTI length and the data transmitted in the second TTI length are simultaneously scheduled in a current sub-frame, determining, by the terminal, to process the data transmitted in the first TTI length or the data transmitted in the second TTI length based on configuration signaling or the predefined rule; and/or when the capability reported by the terminal indicates that the terminal supports a control channel transmitted in the first TTI length and a control channel transmitted in the second TTI length being simultaneously detected in a same sub-frame, simultaneously detecting, by the terminal, the control channel transmitted in the first TTI length and the control channel transmitted in the second TTI length in the current sub-frame; when the capability reported by the terminal indicates that the terminal does not support the control channel transmitted in the first TTI length and the control channel transmitted in the second TTI length being simultaneously detected in the same sub-frame, detecting, by the terminal the control channel transmitted in the first TTI length or the control channel transmitted in the second TTI length in the current sub-frame based on the configuration signaling or the predefined rule.

In some embodiments, the capability of whether the data transmitted in the first TTI length and the data transmitted in the second TTI length are simultaneously processed in the same sub-frame, reported by the terminal includes: for uplink transmission and downlink transmission, the capability being reported together or separately; and/or for the terminal supporting carrier aggregation, the capability being reported together for all aggregated carriers or being reported separately for each aggregated carrier.

In some embodiments, the determining the data transmitted in the first TTI length and/or the data transmitted in the second TTI length that are processed in the same sub-frame based on an upper limit value of the quantity of transport blocks or an upper limit value of the quantity of TTIs that are simultaneously processed in the same sub-frame includes: if a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, the data transmitted in the first TTI length and the data transmitted in the second TTI length being simultaneously processed by the terminal in the current sub-frame, otherwise, determining, the terminal, to process a part of the data transmitted in the first TTI length and the data transmitted in the second TTI length based on configuration signaling or the predefined rule.

In some embodiments, the capability of an upper limit value of quantity of TBs that are simultaneously processed in the same sub-frame or the capability of the upper limit value of the quantity of TTI being simultaneously processed in the same sub-frame, reported by the terminal includes: for uplink transmission and downlink transmission, the capability being reported together or separately.

In some embodiments, the determining the data transmitted in the first TTI length and/or the data transmitted in the second TTI length that are processed in the same sub-frame based on the carrier aggregation capability and/or the MIMO capability reported by the terminal includes: when the terminal does not support carrier aggregation, determining, by the terminal, not to support the data transmitted in the first TTI length and the data transmitted in the second TTI length being simultaneously processed in the same sub-frame; if the data transmitted in the first TTI length and the data transmitted in the second TTI length are simultaneously scheduled in a current sub-frame, determining, by the terminal, to process the data transmitted in the first TTI length or the data transmitted in the second TTI length based on configuration signaling or the predefined rule.

In some embodiments, the determining the data transmitted in the first TTI length and/or the data transmitted in the second TTI length that are processed in the same sub-frame based on the carrier aggregation capability and/or the MIMO capability reported by the terminal includes: for uplink transmission, when the terminal does not support carrier aggregation and the data transmitted in the first TTI length and the data transmitted in the second TTI length are simultaneously scheduled in a current sub-frame: if the terminal has finished encoding of the data transmitted in the second TTI length before the data transmitted in the first TTI length has been processed, the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on configuration signaling or the predefined rule.

In some embodiments, the determining the data transmitted in the first TTI length and/or the data transmitted in the second TTI length that are processed in the same sub-frame based on the carrier aggregation capability and/or the MIMO capability reported by the terminal includes: if the terminal does not support carrier aggregation but supports MIMO, obtaining a total number of TBs based on the MIMO capability reported by the terminal; if a total number of the TBs of the data transmitted in the first TTI length that have an aligned start position in a time domain or overlap in the time domain and the data transmitted in the second TTI length in a current sub-frame is less than or equal to total number of TBs supported by the terminal, the data transmitted in the first TTI length and the data transmitted in the second TTI length being simultaneously processed by the terminal in the current sub-frame; otherwise, Mode A: the terminal does not support the data transmitted in the first TTI length and the data transmitted in the second TTI length being simultaneously processed in the current sub-frame, and the data transmitted in the first TTI length or the data transmitted in the second TTI length being processed based on configuration signaling or the predefined rule; and/or Mode B: for uplink transmission, if the terminal has finished the encoding of the data transmitted in the second TTI length before the data transmitted in the first TTI length has been processed, the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on the configuration signaling or the predefined rule.

In some embodiments, the determining the data transmitted in the first TTI length and/or the data transmitted in the second TTI length that are processed in the same sub-frame based on the carrier aggregation capability and/or the MIMO capability reported by the terminal includes: if the terminal supports carrier aggregation, determining an upper limit value of quantity of TBs or an upper limit value of the quantity of TTIs that are simultaneously processed by the terminal in the same sub-frame based on an upper limit value of the aggregated carriers supported by the terminal; or if the terminal supports carrier aggregation, determining the upper limit value of quantity of TBs that are simultaneously processed by the terminal in the same sub-frame based on the upper limit value of the aggregated carriers supported by the terminal and the MIMO capability of each aggregated carrier; or determining the upper limit value of the quantity of TBs that are simultaneously processed by the terminal in the same sub-frame based on the carrier aggregation capability and the MIMO capability of the terminal; if a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTIs, the data transmitted in the first TTI length and the data transmitted in the second TTI length being simultaneously processed by the terminal in the current sub-frame; otherwise, Mode A: a part of the data transmitted in the first TTI length and the data transmitted in the second TTI length being processed by the terminal based on configuration signaling or the predefined rule; and/or Mode B: for uplink transmission, if the terminal has finished the encoding of the data transmitted in the second TTI length before the data transmitted in the first TTI length has been processed, the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on the configuration signaling or the predefined rule, or if the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process a part of the data transmitted in the first TTI length and the data transmitted in the second TTI length based on the configuration signaling or the predefined rule.

In some embodiments, the determining, by a terminal, data transmitted in the first TTI length and/or data transmitted in the second TTI length that are processed in a same sub-frame based on a predefined rule includes: for uplink transmission, when the data transmitted in the first TTI length and the data transmitted in the second TTI length are simultaneously scheduled in a current sub-frame: if the terminal has finished the encoding of the data transmitted in the second TTI length before the data transmitted in the first TTI length has been processed, the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on configuration signaling or the predefined rule; or for uplink transmission and for each carrier, when the data transmitted in the first TTI length and the data transmitted in the second TTI length are simultaneously scheduled in the current sub-frame: if the terminal has finished the encoding of the data transmitted in the second TTI length before the data transmitted in the first TTI length has been processed, the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on a configuration signaling or a predefined rule; or for uplink transmission and/or downlink transmission, determining not to support the data transmitted in the first TTI length and the data transmitted in the second TTI length being simultaneously processed in a same sub-frame and in a same carrier, when the data transmitted in the first TTI length and the data transmitted in the second TTI length are simultaneously scheduled in the current sub-frame and in a same carrier, determining, by the terminal, to process the data transmitted in the first TTI length or the data transmitted in the second TTI length in the same carrier based on the configuration signaling or the predefined rule; or for uplink transmission and/or downlink transmission, determining not to support the data transmitted in the first TTI length and the data transmitted in the second TTI length being simultaneously processed in a same sub-frame, when the data transmitted in the first TTI length and the data transmitted in the second TTI length simultaneously exists in a current sub-frame, determining, by the terminal, to process the data transmitted in the first TTI length or the data transmitted in the second TTI length based on the configuration signaling or the predefined rule; or determining not to support the control channel transmitted in the first TTI length and the control channel transmitted in the second TTI length being simultaneously detected in a same sub-frame and in a same carrier, detecting, by the terminal the control channel transmitted in the first TTI length or the control channel transmitted in the second TTI length in the current sub-frame and in the same carrier based on the configuration signaling or the predefined rule; or determining not to support the control channel transmitted in the first TTI length and the control channel transmitted in the second TTI length being simultaneously detected in a same sub-frame, detecting, by the terminal the control channel transmitted in the first TTI length or the control channel transmitted in the second TTI length in the current sub-frame based on the configuration signaling or the predefined rule; or determining to support the control channel transmitted in the first TTI length and the control channel transmitted in the second TTI length being simultaneously detected in a same sub-frame and in a same carrier, detecting, by the terminal the control channel transmitted in the first TTI length and the control channel transmitted in the second TTI length in the current sub-frame and in the same carrier; or determining to support the control channel transmitted in the first TTI length and the control channel transmitted in the second TTI length being simultaneously detected in a same sub-frame, detecting, by the terminal the control channel transmitted in the first TTI length and the control channel transmitted in the second TTI length in the current sub-frame simultaneously.

In some embodiments, the determining, by the terminal, to process the data transmitted in the first TTI length or the data transmitted in the second TTI length based on the configuration signaling or the predefined rule includes: the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule defining that for downlink transmission, before a sub-frame where the data transmitted in the second TTI length belongs to, if the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or the predefined rule defining that for downlink transmission, in a sub-frame where the data transmitted in the second TTI length belongs to, if the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length; or the predefined rule defining that for uplink transmission, before a sub-frame where the data transmitted in the second TTI length belongs to, if the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or the predefined rule defining that for uplink transmission, in a sub-frame where the data transmitted in the second TTI length belongs to, if the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length.

In some embodiments, the determining, by the terminal, to process a part of the data transmitted in the first TTI length and the data transmitted in the second TTI length based on configuration signaling or the predefined rule includes: the configuration signaling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if a total number of the TBs included in the determined data in a current sub-frame based on the configuration signaling exceeds an upper limit value of quantity of TBs or the total number of the TTIs included in the determined data in the current sub-frame based on the configuration signaling exceeds the upper limit value of the quantity of TTIs, the carrier index is further used for selection; or the configuration singling indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the configuration signaling indicating a ratio to allocate the upper limit value of quantity of TBs or the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the predefined rule exceeds the upper limit value of the quantity of TBs or the total number of the TTIs included in the determined data in the current sub-frame based on the predefined rule exceeds the upper limit value of the quantity of TTIs, the carrier index is further used for selection; or the predefined rule defining that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used selection; or the predefined rule defining a ratio to allocate the upper limit value of the quantity of TBs or the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection.

In some embodiments, the detecting, by the terminal the control channel transmitted in the first TTI length or the control channel transmitted in the second TTI length based on the configuration signaling or the predefined rule includes: the configuration singling indicating that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that for downlink transmission, before a sub-frame where the control channel transmitted in the second TTI length belongs to, if the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for downlink transmission, in a sub-frame where the control channel transmitted in the second TTI length belongs to, if the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length; or the predefined rule defining that for uplink transmission, before a sub-frame where the control channel transmitted in the second TTI length belongs to, if the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for uplink transmission, in a sub-frame where the control channel transmitted in the second TTI length belongs to, if the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length.

In some embodiments, the method further includes: receiving or transmitting the data transmitted in the first TTI length and the data transmitted in the second TTI length in a same carrier, in a same sub-frame and in different frequency resources; or when the frequency resource used by the data transmitted in the first TTI length and the frequency resource used by the data transmitted in the second TTI length in a same carrier and in a same sub-frame overlap, for downlink transmission, determining, by the terminal, that a base station overwrites the data transmitted in the second TTI length by the data transmitted in the first TTI length at the overlapped frequency resource, and for uplink transmission, the terminal overwrites the data transmitted in the second TTI length by the data transmitted in the first TTI length at the overlapped frequency resource; or for uplink transmission, punching data of the data transmitted in the second TTI length on symbols overlapping with the data transmitted in the first TTI length when data transmitted in the first TTI length and the data transmitted in the second TTI length.

In some embodiments, the first TTI length is less than 1 ms, the second TTI length is equal to 1 ms; and/or a plurality of TTIs that has an aligned start position in a time domain or overlap in the time domain has a same TTI length or different TTI lengths.

In another aspect, a data transmission method includes: determining, by a base station, data transmitted in a first Transmission Time Interval (TTI) length and/or data transmitted in a second TTI length that are processed by a terminal in a same sub-frame based on capability reported by the terminal or a predefined rule, the data including a shared channel and/or a control channel; wherein the first TTI length is less than the second TTI length.

In some embodiments, the determining, by a base station, data transmitted in the first TTI length and/or data transmitted in the second TTI length that are processed by a terminal in a same sub-frame based on capability reported by the terminal or a predefined rule includes at least one of: Mode 1: determining the data transmitted in the first TTI length and/or the data transmitted in the second TTI length that are processed by the terminal in the same sub-frame based on carrier aggregation capability and/or multiple-input multiple-output (MIMO) capability reported by the terminal; Mode 2: determining the data transmitted in the first TTI length and/or the data transmitted in the second TTI length that are processed by the terminal in the same sub-frame based on capability of an upper limit value of quantity of transport blocks (TB) that are simultaneously processed in the same sub-frame or the capability of an upper limit value of quantity of TTIs that are simultaneously processed in the same sub-frame, reported by the terminal; and Mode 3: determining the data transmitted in the first TTI length and/or the data transmitted in the second TTI length that are processed by the terminal in the same sub-frame based on capability of whether the data transmitted in the first TTI length and the data transmitted in the second TTI length are simultaneously processed in the same sub-frame, reported by the terminal.

In some embodiments, the determining the data transmitted in the first TTI length and/or the data transmitted in the second TTI length that are processed by the terminal in the same sub-frame based on the capability of whether the data transmitted in the first TTI length and data transmitted in the second TTI length are simultaneously processed in the same sub-frame, reported by the terminal includes: when the capability reported by the terminal indicates that the terminal supports the data transmitted in the first TTI length and the data transmitted in the second TTI length being simultaneously processed in the same sub-frame, if the data transmitted in the first TTI length and the data transmitted in the second TTI length are simultaneously scheduled in a current sub-frame, the data transmitted in the first TTI length and the data transmitted in the second TTI length being simultaneously processed by the terminal in the current sub-frame; or determining the data transmitted in the first TTI length and/or the data transmitted in the second TTI length that are processed by the terminal in the same sub-frame based on Mode 1 or Mode 2; when the capability reported by the terminal indicates that the terminal does not support the data transmitted in the first TTI length and the data transmitted in the second TTI length being simultaneously processed in the same sub-frame, if the data transmitted in the first TTI length and the data transmitted in the second TTI length are simultaneously scheduled in a current sub-frame, determining to process the data transmitted in the first TTI length or the data transmitted in the second TTI length by the terminal based on configuration signaling or the predefined rule; and/or when the capability reported by the terminal indicates that the terminal supports a control channel transmitted in the first TTI length and a control channel transmitted in the second TTI length being simultaneously detected in a same sub-frame, determining that the terminal simultaneously detects the control channel transmitted in the first TTI length and the control channel transmitted in the second TTI length in the current sub-frame; when the capability reported by the terminal indicates that the terminal does not support the control channel transmitted in the first TTI length and the control channel transmitted in the second TTI length being simultaneously detected in the same sub-frame, determining that the terminal detects the control channel transmitted in the first TTI length or the control channel transmitted in the second TTI length in the current sub-frame based on the configuration signaling or the predefined rule.

In some embodiments, the capability of whether the data transmitted in the first TTI length and the data transmitted in the second TTI length are simultaneously processed in the same sub-frame, reported by the terminal includes: for uplink transmission and downlink transmission, the capability being reported together or separately; and/or for the terminal supporting carrier aggregation, the capability being reported together for all aggregated carriers or being reported separately for each aggregated carrier.

In some embodiments, the determining the data transmitted in the first TTI length and/or the data transmitted in the second TTI length that are processed by the terminal in the same sub-frame based on an upper limit value of the quantity of transport blocks or an upper limit value of the quantity of TTIs that are simultaneously processed in the same sub-frame includes: if a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, determining the data transmitted in the first TTI length and the data transmitted in the second TTI length being simultaneously processed by the terminal in the current sub-frame, otherwise, determining that the terminal processes a part of the data transmitted in the first TTI length and the data transmitted in the second TTI length based on configuration signaling or the predefined rule.

In some embodiments, the capability of an upper limit value of quantity of transport blocks (TB) that are simultaneously processed in the same sub-frame or the capability of an upper limit value of quantity of TTIs that are simultaneously processed in the same sub-frame, reported by the terminal includes: for uplink transmission and downlink transmission, the capability being reported together or separately.

In some embodiments, the determining the data transmitted in the first TTI length and/or the data transmitted in the second TTI length that are processed by the terminal in the same sub-frame based on the carrier aggregation capability and/or the MIMO capability reported by the terminal includes: when the terminal does not support carrier aggregation, determining that the terminal does not support the data transmitted in the first TTI length and the data transmitted in the second TTI length being simultaneously processed in the same sub-frame; if the data transmitted in the first TTI length and the data transmitted in the second TTI length are simultaneously scheduled in a current sub-frame, determining that the terminal processes the data transmitted in the first TTI length or the data transmitted in the second TTI length based on configuration signaling or the predefined rule.

In some embodiments, the determining the data transmitted in the first TTI length and/or the data transmitted in the second TTI length that are processed by the terminal in the same sub-frame based on the carrier aggregation capability and/or the MIMO capability reported by the terminal includes: for uplink transmission, when the terminal does not support carrier aggregation and the data transmitted in the first TTI length and the data transmitted in the second TTI length are simultaneously scheduled in a current sub-frame: if the terminal has finished encoding of the data transmitted in the second TTI length before the data transmitted in the first TTI length has been processed, determining the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining that the terminal processes the data transmitted in the first TTI length or the data transmitted in the second TTI length based on configuration signaling or the predefined rule.

In some embodiments, the determining the data transmitted in the first TTI length and/or the data transmitted in the second TTI length that are processed by the terminal in the same sub-frame based on the carrier aggregation capability and/or the MIMO capability reported by the terminal includes: if the terminal does not support carrier aggregation but supports MIMO, obtaining a total number of TBs supported by the terminal based on the MIMO capability reported by the terminal; if a total number of the TBs of the data transmitted in the first TTI length that have an aligned start position in a time domain or overlap in the time domain and the data transmitted in the second TTI length in a current sub-frame is less than or equal to total number of TBs supported by the terminal, determining the data transmitted in the first TTI length and the data transmitted in the second TTI length being simultaneously processed by the terminal in the current sub-frame; otherwise, Mode A: determining that the terminal does not support the data transmitted in the first TTI length and the data transmitted in the second TTI length being simultaneously processed in the current sub-frame, and determining the data transmitted in the first TTI length or the data transmitted in the second TTI length being processed by the terminal based on configuration signaling or the predefined rule; and/or Mode B: for uplink transmission, if the terminal has finished the encoding of the data transmitted in the second TTI length before the data transmitted in the first TTI length has been processed, determining the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determining that the terminal does not to support the data transmitted in the first TTI length and the data transmitted in the second TTI length being simultaneously processed in the current sub-frame, and determining that the terminal processes the data transmitted in the first TTI length or the data transmitted in the second TTI length based on the configuration signaling or the predefined rule.

In some embodiments, the determining the data transmitted in the first TTI length and/or the data transmitted in the second TTI length that are processed by the terminal in the same sub-frame based on the carrier aggregation capability and/or the MIMO capability reported by the terminal includes: if the terminal supports carrier aggregation, determining an upper limit value of quantity of TBs or an upper limit value of the quantity of TTIs that are simultaneously processed by the terminal in the same sub-frame based on an upper limit value of the aggregated carriers supported by the terminal; or if the terminal supports carrier aggregation, determining the upper limit value of quantity of TBs that are simultaneously processed by the terminal in the same sub-frame based on the upper limit value of the aggregated carriers supported by the terminal and the MIMO capability of each aggregated carrier; or determining the upper limit value of the quantity of TBs that are simultaneously processed by the terminal in the same sub-frame based on the carrier aggregation capability and the MIMO capability of the terminal; if a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTIs, determining the data transmitted in the first TTI length and the data transmitted in the second TTI length being simultaneously processed by the terminal in the current sub-frame; otherwise, Mode A: determining a part of the data transmitted in the first TTI length and the data transmitted in the second TTI length being processed by the terminal based on configuration signaling or the predefined rule; and/or Mode B: for uplink transmission, if the terminal has finished the encoding of the data transmitted in the second TTI length before the data transmitted in the first TTI length has been processed, determining the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determining that the terminal processes the data transmitted in the first TTI length or the data transmitted in the second TTI length based on the configuration signaling or the predefined rule, or if the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determining that the terminal processes a part of the data transmitted in the first TTI length and the data transmitted in the second TTI length based on the configuration signaling or the predefined rule.

In some embodiments, the determining data transmitted in the first TTI length and/or data transmitted in the second TTI length that are processed by the terminal in a same sub-frame based on a predefined rule includes: for uplink transmission, when the data transmitted in the first TTI length and the data transmitted in the second TTI length are simultaneously scheduled in a current sub-frame: if the terminal has finished the encoding of the data transmitted in the second TTI length before the data transmitted in the first TTI length has been processed, determining the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determining that the terminal processes the data transmitted in the first TTI length or the data transmitted in the second TTI length based on configuration signaling or the predefined rule; or for uplink transmission and for each carrier, when the data transmitted in the first TTI length and the data transmitted in the second TTI length are simultaneously scheduled in the current sub-frame: if the terminal has finished the encoding of the data transmitted in the second TTI length before the data transmitted in the first TTI length has been processed, determining the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determining that the terminal processes the data transmitted in the first TTI length or the data transmitted in the second TTI length based on a configuration signaling or a predefined rule; or for uplink transmission and/or downlink transmission, determining that the terminal does not support the data transmitted in the first TTI length and the data transmitted in the second TTI length being simultaneously processed in a same sub-frame and in a same carrier, when the data transmitted in the first TTI length and the data transmitted in the second TTI length are simultaneously scheduled in the current sub-frame and in a same carrier, determining that the terminal processes the data transmitted in the first TTI length or the data transmitted in the second TTI length in the same carrier based on the configuration signaling or the predefined rule; or for uplink transmission and/or downlink transmission, determining that the terminal does not support the data transmitted in the first TTI length and the data transmitted in the second TTI length simultaneously existing in a same sub-frame, when the data transmitted in the first TTI length and the data transmitted in the second TTI length are simultaneously scheduled in a current sub-frame, determining that the terminal processes the data transmitted in the first TTI length or the data transmitted in the second TTI length based on the configuration signaling or the predefined rule; or determining that the terminal does not support the control channel transmitted in the first TTI length and the control channel transmitted in the second TTI length being simultaneously detected in a same sub-frame and in a same carrier, determining that the terminal detects the control channel transmitted in the first TTI length or the control channel transmitted in the second TTI length in the current sub-frame and in the same carrier based on the configuration signaling or the predefined rule; or determining that the terminal does not support the control channel transmitted in the first TTI length and the control channel transmitted in the second TTI length being simultaneously detected in a same sub-frame, determining that the terminal detects the control channel transmitted in the first TTI length or the control channel transmitted in the second TTI length in the current sub-frame based on the configuration signaling or the predefined rule; or determining that the terminal supports the control channel transmitted in the first TTI length and the control channel transmitted in the second TTI length being simultaneously detected in a same sub-frame and in a same carrier, determining that the terminal detects the control channel transmitted in the first TTI length and the control channel transmitted in the second TTI length in the current sub-frame and in the same carrier; or determining that the terminal supports the control channel transmitted in the first TTI length and the control channel transmitted in the second TTI length being simultaneously detected in a same sub-frame, determining that the terminal detects the control channel transmitted in the first TTI length and the control channel transmitted in the second TTI length in the current sub-frame simultaneously.

In some embodiments, the determining that the terminal processes the data transmitted in the first TTI length or the data transmitted in the second TTI length based on the configuration signaling or the predefined rule includes: the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule defining that for downlink transmission, before a sub-frame where the data transmitted in the second TTI length belongs to, if the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or the predefined rule defining that for downlink transmission, in a sub-frame where the data transmitted in the second TTI length belongs to, if the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length; or the predefined rule defining that for uplink transmission, before a sub-frame where the data transmitted in the second TTI length belongs to, if the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or the predefined rule defining that for uplink transmission, in a sub-frame where the data transmitted in the second TTI length belongs to, if the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length.

In some embodiments, the determining that the terminal processes a part of the data transmitted in the first TTI length and the data transmitted in the second TTI length based on configuration signaling or the predefined rule includes: the configuration signaling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if a total number of the TBs included in the determined data in a current sub-frame based on the configuration signaling exceeds an upper limit value of quantity of TBs or the total number of the TTIs included in the determined data in the current sub-frame based on the configuration signaling exceeds the upper limit value of the quantity of TTIs, the carrier index is further used for selection; or the configuration singling indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the configuration signaling indicating a ratio to allocate the upper limit value of quantity of TBs or the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the predefined rule exceeds the upper limit value of the quantity of TBs or the total number of the TTIs included in the determined data in the current sub-frame based on the predefined rule exceeds the upper limit value of the quantity of TTIs, the carrier index is further used for selection; or the predefined rule defining that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the predefined rule defining a ratio to allocate the upper limit value of the quantity of TBs or the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection.

In some embodiments, the determining that the terminal detects the control channel transmitted in the first TTI length or the control channel transmitted in the second TTI length based on the configuration signaling or the predefined rule includes: the configuration singling indicating that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that for downlink transmission, before a sub-frame where the control channel transmitted in the second TTI length belongs to, if the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for downlink transmission, in a sub-frame where the control channel transmitted in the second TTI length belongs to, if the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length; or the predefined rule defining that for uplink transmission, before a sub-frame where the control channel transmitted in the second TTI length belongs to, if the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for uplink transmission, in a sub-frame where the control channel transmitted in the second TTI length belongs to, if the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length.

In some embodiments, the method further includes: scheduling the terminal to receive or transmit the data transmitted in the first TTI length and the data transmitted in the second TTI length in a same carrier, in a same sub-frame and in different frequency resources; or when the frequency resource used by the data transmitted in the first TTI length and the frequency resource used by the data transmitted in the second TTI length in a same carrier and in a same sub-frame overlap, for downlink transmission, replacing, by the base station, the data transmitted in the second TTI length by the data transmitted in the first TTI length at the overlapped frequency resource, and for uplink transmission, determining, by the base station, that the terminal overwrites the data transmitted in the second TTI length by the data transmitted in the first TTI length at the overlapped frequency resource; or for uplink transmission, determining the terminal to punch data on symbols corresponding to the data transmitted in the first TTI length from the data transmitted in the second TTI length in the same carrier and in the same sub-frame.

In some embodiments, the first TTI length is less than 1 ms, the second TTI length is equal to 1 ms; and/or a plurality of TTIs that has an aligned start position in a time domain or overlap in the time domain has a same TTI length or different TTI lengths.

In another aspect, a terminal includes: a first determination module, configured to determine data transmitted in a first Transmission Time Interval (TTI) length and/or data transmitted in a second TTI length that are processed in a same sub-frame based on capability reported by the terminal or a predefined rule, the data including a shared channel and/or a control channel; wherein the first TTI length is less than the second TTI length.

In some embodiments, the first determination module includes: a first determination sub-module, configured to determine the data transmitted in the first TTI length and/or the data transmitted in the second TTI length that are processed in the same sub-frame based on carrier aggregation capability and/or multiple-input multiple-output (MIMO) capability reported by the terminal; a second determination sub-module, configured to determine the data transmitted in the first TTI length and/or the data transmitted in the second TTI length that are processed in the same sub-frame based on the capability of an upper limit value of quantity of transport blocks (TB) that are simultaneously processed in the same sub-frame or the capability of an upper limit value of quantity of TTIs that are simultaneously processed in the same sub-frame, reported by the terminal; and a third determination sub-module, configured to determine the data transmitted in the first TTI length and/or the data transmitted in the second TTI length that are processed in the same sub-frame based on a capability of whether the data transmitted in the first TTI length and the data transmitted in the second TTI length are simultaneously processed in the same sub-frame reported by the terminal.

In some embodiments, the third determination sub-module includes: a first processing unit, configured to, when the capability reported by the terminal indicates that the terminal supports the data transmitted in the first TTI length and the data transmitted in the second TTI length being simultaneously processed in the same sub-frame, if the data transmitted in the first TTI length and the data transmitted in the second TTI length are simultaneously scheduled in a current sub-frame, simultaneously process the data transmitted in the first TTI length and the data transmitted in the second TTI length in the current sub-frame; or determine the data transmitted in the first TTI length and/or the data transmitted in the second TTI length that are processed in the same sub-frame by using the second determination sub-module or the third determination sub-module; a second processing unit, configured to, when the capability reported by the terminal indicates that the terminal does not support the data transmitted in the first TTI length and the data transmitted in the second TTI length being simultaneously processed in the same sub-frame, if the data transmitted in the first TTI length and the data transmitted in the second TTI length are simultaneously scheduled in a current sub-frame, determine to process the data transmitted in the first TTI length or the data transmitted in the second TTI length based on configuration signaling or the predefined rule; and/or a fifteenth processing unit, configured to, when the capability reported by the terminal indicates that the terminal supports a control channel transmitted in the first TTI length and a control channel transmitted in the second TTI length being simultaneously detected in a same sub-frame, simultaneously detect the control channel transmitted in the first TTI length and the control channel transmitted in the second TTI length in the current sub-frame; a sixteenth processing unit, configured to, when the capability reported by the terminal indicates that the terminal does not support the control channel transmitted in the first TTI length and the control channel transmitted in the second TTI length being simultaneously detected in the same sub-frame, determine to detect the control channel transmitted in the first TTI length or the control channel transmitted in the second TTI length in the current sub-frame based on the configuration signaling or the predefined rule.

In some embodiments, the capability of whether the data transmitted in the first TTI length and the data transmitted in the second TTI length are simultaneously processed in the same sub-frame, reported by the terminal includes: for uplink transmission and downlink transmission, the capability being reported together or separately; and/or for the terminal supporting carrier aggregation, the capability being reported together for all aggregated carriers or being reported separately for each aggregated carrier.

In some embodiments, the second determination sub-module includes: a third processing unit, configured to, if a total number of the TBs of the data transmitted in the first TTI length that have an aligned start position in a time domain or overlap in the time domain and the data transmitted in the second TTI length in a current sub-frame is less than or equal to an upper limit value of quantity of TBs, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, simultaneously process the data transmitted in the first TTI length and the data transmitted in the second TTI length in the current sub-frame, a second processing unit, configured to otherwise, determine to process a part of the data transmitted in the first TTI length and the data transmitted in the second TTI length based on configuration signaling or the predefined rule.

In some embodiments, the capability of an upper limit value of quantity of transport blocks (TB) that are simultaneously processed in the same sub-frame or the capability of an upper limit value of quantity of TTIs that are simultaneously processed in the same sub-frame, reported by the terminal includes: for uplink transmission and downlink transmission, the capability being reported together or separately.

In some embodiments, the first determination sub-module includes: a first determination unit, configured to, when the terminal does not support carrier aggregation, determine not to support the data transmitted in the first TTI length and the data transmitted in the second TTI length being simultaneously processed in the same sub-frame; a second processing unit, configured to, if the data transmitted in the first TTI length and the data transmitted in the second TTI length are simultaneously scheduled in a current sub-frame, determine to process the data transmitted in the first TTI length or the data transmitted in the second TTI length based on configuration signaling or the predefined rule.

In some embodiments, the first determination sub-module includes: a fourth processing unit, configured to, for uplink transmission, when the terminal does not support carrier aggregation and the data transmitted in the first TTI length and the data transmitted in the second TTI length are simultaneously scheduled in a current sub-frame: if the terminal has finished encoding of the data transmitted in the second TTI length before the data transmitted in the first TTI length has been processed, simultaneously process the data transmitted in the first TTI length and the data transmitted in the second TTI length in the current sub-frame; a second processing unit, configured to, if the terminal has not finished the encoding of the data transmitted in the second TTI length before the data transmitted in the first TTI length has been processed, determine not to support the data transmitted in the first TTI length and the data transmitted in the second TTI length being simultaneously processed in the current sub-frame, and determine to process the data transmitted in the first TTI length or the data transmitted in the second TTI length based on configuration signaling or the predefined rule.

In some embodiments, the first determination sub-module includes: a first obtainment unit, configured to, if the terminal does not support carrier aggregation but supports MIMO, obtain a total number of TBs based on the MIMO capability reported by the terminal: a fifth processing unit, configured to, if a total number of the TBs of the data transmitted in the first TTI length that have an aligned start position in a time domain or overlap in the time domain and the data transmitted in the second TTI length in a current sub-frame is less than or equal to total number of TBs supported by the terminal, simultaneously process the data transmitted in the first TTI length and the data transmitted in the second TTI length in the current sub-frame; a second processing unit, configured to, otherwise, Mode A: determine not to support the data transmitted in the first TTI length and the data transmitted in the second TTI length being simultaneously processed in the current sub-frame, and process the data transmitted in the first TTI length or the data transmitted in the second TTI length based on configuration signaling or the predefined rule; and/or Mode B: for uplink transmission, if encoding of the data transmitted in the second TTI length has finished before the data transmitted in the first TTI length has been processed, simultaneously process the data transmitted in the first TTI length and the data transmitted in the second TTI length in the current sub-frame; if the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and determine to process the data transmitted in the first TTI length or the data transmitted in the second TTI length based on the configuration signaling or the predefined rule.

In some embodiments, the first determination module includes: a second determination unit, configured to, if the terminal supports carrier aggregation, determine an upper limit value of quantity of TBs or an upper limit value of the quantity of TTIs that are simultaneously processed by the terminal in the same sub-frame based on an upper limit value of the aggregated carriers supported by the terminal; or if the terminal supports carrier aggregation, determine the upper limit value of quantity of TBs that are simultaneously processed by the terminal in the same sub-frame based on the upper limit value of the aggregated carriers supported by the terminal and the MIMO capability of each aggregated carrier; or determine the upper limit value of the quantity of TBs that are simultaneously processed by the terminal in the same sub-frame based on the carrier aggregation capability and the MIMO capability of the terminal; a sixth processing unit, configured to, if a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTIs, simultaneously process the data transmitted in the first TTI length and the data transmitted in the second TTI length in the current sub-frame; a second processing unit, configured to, otherwise, Mode A: process a part of the data transmitted in the first TTI length and the data transmitted in the second TTI length based on configuration signaling or the predefined rule; and/or Mode B: for uplink transmission, if encoding of the data transmitted in the second TTI length has finished before the data transmitted in the first TTI length has been processed, simultaneously process the data transmitted in the first TTI length and the data transmitted in the second TTI length in the current sub-frame; if the terminal has not finished the encoding of the data transmitted in the second TTI length before the data transmitted in the first TTI length has been processed, determine not to support the data transmitted in the first TTI length and the data transmitted in the second TTI length being simultaneously processed in the current sub-frame, and determine to process the data transmitted in the first TTI length or the data transmitted in the second TTI length based on the configuration signaling or the predefined rule, or if the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and determine to process a part of the data transmitted in the first TTI length and the data transmitted in the second TTI length based on the configuration signaling or the predefined rule.

In some embodiments, the first determination module includes: a seventh processing unit, configured to, for uplink transmission, when the data transmitted in the first TTI length and the data transmitted in the second TTI length are simultaneously scheduled in a current sub-frame: if encoding of the data transmitted in the second TTI length has finished before the data transmitted in the first TTI length has been processed, simultaneously process the data transmitted in the first TTI length and the data transmitted in the second TTI length in the current sub-frame; a second processing unit, configured to, if the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and determine to process the data transmitted in the first TTI length or the data transmitted in the second TTI length based on configuration signaling or the predefined rule; or an eighth processing unit, configured to, for uplink transmission and for each carrier, when the data transmitted in the first TTI length and the data transmitted in the second TTI length are simultaneously scheduled in the current sub-frame: if the encoding of the data transmitted in the second TTI length has finished before the data transmitted in the first TTI length has been processed, simultaneously process the data transmitted in the first TTI length and the data transmitted in the second TTI length in the current sub-frame; a second processing unit, configured to, if the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and determine to process the data transmitted in the first TTI length or the data transmitted in the second TTI length based on a configuration signaling or a predefined rule; or a ninth processing unit, configured to, for uplink transmission and/or downlink transmission, determine not to support the data transmitted in the first TTI length and the data transmitted in the second TTI length being simultaneously processed in a same sub-frame and in a same carrier; the second processing unit, configured to, when the data transmitted in the first TTI length and the data transmitted in the second TTI length are simultaneously scheduled in the current sub-frame and in a same carrier, determine to process the data transmitted in the first TTI length or the data transmitted in the second TTI length in the same carrier based on the configuration signaling or the predefined rule; or a tenth processing unit, configured to, for uplink transmission and/or downlink transmission, determine not to support the data transmitted in the first TTI length and the data transmitted in the second TTI length being simultaneously processed in a same sub-frame; the second processing unit, configured to, when the data transmitted in the first TTI length and the data transmitted in the second TTI length simultaneously exists in a current sub-frame, determine to process the data transmitted in the first TTI length or the data transmitted in the second TTI length based on the configuration signaling or the predefined rule; or an eleventh processing unit, configured to determine not to support the control channel transmitted in the first TTI length and the control channel transmitted in the second TTI length being simultaneously detected in a same sub-frame and in a same carrier; a sixteenth processing unit, configured to determine to detect the control channel transmitted in the first TTI length or the control channel transmitted in the second TTI length in the current sub-frame and in the same carrier based on the configuration signaling or the predefined rule; or a twelfth processing unit, configured to determine not to support the control channel transmitted in the first TTI length and the control channel transmitted in the second TTI length being simultaneously detected in a same sub-frame; the sixteenth processing unit, configured to determine to detect the control channel transmitted in the first TTI length or the control channel transmitted in the second TTI length in the current sub-frame based on the configuration signaling or the predefined rule; or a thirteenth processing unit, configured to determine to support the control channel transmitted in the first TTI length and the control channel transmitted in the second TTI length being simultaneously detected in a same sub-frame and in a same carrier; the sixteenth processing unit, configured to determine to detect the control channel transmitted in the first TTI length and the control channel transmitted in the second TTI length in the current sub-frame and in the same carrier; or a fourteenth processing unit, configured to determine to support the control channel transmitted in the first TTI length and the control channel transmitted in the second TTI length being simultaneously detected in a same sub-frame; the sixteenth processing unit, configured to determine to detect the control channel transmitted in the first TTI length and the control channel transmitted in the second TTI length in the current sub-frame simultaneously.

In some embodiments, the second processing unit includes: the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule defining that for downlink transmission, before a sub-frame where the data transmitted in the second TTI length belongs to, if the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or the predefined rule defining that for downlink transmission, in a sub-frame where the data transmitted in the second TTI length belongs to, if the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length; or the predefined rule defining that for uplink transmission, before a sub-frame where the data transmitted in the second TTI length belongs to, if the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or the predefined rule defining that for uplink transmission, in a sub-frame where the data transmitted in the second TTI length belongs to, if the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length.

In some embodiments, the second processing unit includes: the configuration signaling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if a total number of the TBs included in the determined data in a current sub-frame based on the configuration signaling exceeds an upper limit value of quantity of TBs or the total number of the TTIs included in the determined data in the current sub-frame based on the configuration signaling exceeds the upper limit value of the quantity of TTIs, the carrier index is further used for selection; or the configuration singling indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the configuration signaling indicating a ratio to allocate the upper limit value of quantity of TBs or the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the predefined rule exceeds the upper limit value of the quantity of TBs or the total number of the TTIs included in the determined data in the current sub-frame based on the predefined rule exceeds the upper limit value of the quantity of TTIs, the carrier index is further used for selection; or the predefined rule defining that terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used selection; or the predefined rule defining a ratio to allocate the upper limit value of the quantity of TBs or the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection.

In some embodiments, the sixteenth processing unit includes: the configuration singling indicating that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that for downlink transmission, before a sub-frame where the control channel transmitted in the second TTI length belongs to, if the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for downlink transmission, in a sub-frame where the control channel transmitted in the second TTI length belongs to, if the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length; or the predefined rule defining that for uplink transmission, before a sub-frame where the control channel transmitted in the second TTI length belongs to, if the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for uplink transmission, in a sub-frame where the control channel transmitted in the second TTI length belongs to, if the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length.

In some embodiments, the terminal further includes: a first processing module, configured to receive or transmit the data transmitted in the first TTI length and the data transmitted in the second TTI length in a same carrier, in a same sub-frame and in different frequency resources; or the first processing module is configured to, when the frequency resource used by the data transmitted in the first TTI length and the frequency resource used by the data transmitted in the second TTI length in a same carrier and in a same sub-frame overlap, for downlink transmission, determine that a base station overwrites the data transmitted in the second TTI length by the data transmitted in the first TTI length at the overlapped frequency resource, and for uplink transmission, replace the data transmitted in the second TTI length by the data transmitted in the first TTI length at the overlapped frequency resource; or the first processing module is configured to, for uplink transmission, punch data of the data transmitted in the second TTI length on symbols overlapping with the data transmitted in the first TTI length when data transmitted in the first TTI length and the data transmitted in the second TTI length in the same carrier and in the same sub-frame.

In some embodiments, the first TTI length is less than 1 ms, the second TTI length is equal to 1 ms; and/or a plurality of TTIs that has an aligned start position in a time domain or overlap in the time domain has a same TTI length or different TTI lengths.

In another aspect, a base station includes: a second determination module, configured to determine data transmitted in a first Transmission Time Interval (TTI) length and/or data transmitted in a second TTI length that are processed by a terminal in a same sub-frame based on capability reported by the terminal or a predefined rule, the data including a shared channel and/or a control channel; wherein the first TTI length is less than the second TTI length.

In some embodiments, the second determination module includes: a fourth determination sub-module, configured to determine the data transmitted in the first TTI length and/or the data transmitted in the second TTI length that are processed by the terminal in the same sub-frame based on carrier aggregation capability and/or multiple-input multiple-output (MIMO) capability reported by the terminal; a fifth determination sub-module, configured to determine the data transmitted in the first TTI length and/or the data transmitted in the second TTI length that are processed by the terminal in the same sub-frame based on the capability of an upper limit value of quantity of transport blocks (TB) that are simultaneously processed in the same sub-frame or the capability of an upper limit value of quantity of TTIs that are simultaneously processed in the same sub-frame, reported by the terminal; and a sixth determination sub-module, configured to determine the data transmitted in the first TTI length and/or the data transmitted in the second TTI length that are processed by the terminal in the same sub-frame based on capability of whether the data transmitted in the first TTI length and the data transmitted in the second TTI length are simultaneously processed in the same sub-frame, reported by the terminal.

In some embodiments, the sixth determination sub-module includes: a third determination unit, configured to, when the capability reported by the terminal indicates that the terminal supports the data transmitted in the first TTI length and the data transmitted in the second TTI length being simultaneously processed in the same sub-frame, if the data transmitted in the first TTI length and the data transmitted in the second TTI length are simultaneously scheduled in a current sub-frame, simultaneously process the data transmitted in the first TTI length and the data transmitted in the second TTI length in the current sub-frame; or determine the data transmitted in the first TTI length and/or the data transmitted in the second TTI length that are processed by the terminal in the same sub-frame by using the fifth determination sub-module and the sixth determination sub-module; a fourth determination unit, configured to, when the capability reported by the terminal indicates that the terminal does not support the data transmitted in the first TTI length and the data transmitted in the second TTI length being simultaneously processed in the same sub-frame, if the data transmitted in the first TTI length and the data transmitted in the second TTI length are simultaneously scheduled in a current sub-frame, determine to process the data transmitted in the first TTI length or the data transmitted in the second TTI length by the terminal based on configuration signaling or the predefined rule; and/or a nineteenth determination unit, configured to, when the capability reported by the terminal indicates that the terminal supports a control channel transmitted in the first TTI length and a control channel transmitted in the second TTI length being simultaneously detected in a same sub-frame, determine that the terminal simultaneously detects the control channel transmitted in the first TTI length and the control channel transmitted in the second TTI length in the current sub-frame; a twentieth determination unit, configured to, when the capability reported by the terminal indicates that the terminal does not support the control channel transmitted in the first TTI length and the control channel transmitted in the second TTI length being simultaneously detected in the same sub-frame, determine that the terminal detects the control channel transmitted in the first TTI length or the control channel transmitted in the second TTI length in the current sub-frame based on the configuration signaling or the predefined rule.

In some embodiments, the capability of whether the data transmitted in the first TTI length and the data transmitted in the second TTI length are simultaneously processed in the same sub-frame, reported by the terminal includes: for uplink transmission and downlink transmission, the capability being reported together or separately; and/or for the terminal supporting carrier aggregation, the capability being reported together for all aggregated carriers or being reported separately for each aggregated carrier.

In some embodiments, the fifth determination sub-module includes: a fifth determination unit, configured to, if a total number of the TBs of the data transmitted in the first TTI length that have an aligned start position in a time domain or overlap in the time domain and the data transmitted in the second TTI length in a current sub-frame is less than or equal to an upper limit value of quantity of TBs, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, determine the data transmitted in the first TTI length and the data transmitted in the second TTI length being simultaneously processed by the terminal in the current sub-frame, a fourth determination unit, configured to, otherwise, determine that the terminal processes a part of the data transmitted in the first TTI length and the data transmitted in the second TTI length based on configuration signaling or the predefined rule.

In some embodiments, the capability of an upper limit value of quantity of transport blocks (TB) that are simultaneously processed in the same sub-frame or the capability of an upper limit value of quantity of TTIs that are simultaneously processed in the same sub-frame, reported by the terminal includes: for uplink transmission and downlink transmission, the capability being reported together or separately.

In some embodiments, the fourth determination sub-module includes: a sixth determination unit, configured to, when the terminal does not support carrier aggregation, determine that the terminal does not support the data transmitted in the first TTI length and the data transmitted in the second TTI length being simultaneously processed in the same sub-frame; a fourth determination unit, configured to, if the data transmitted in the first TTI length and the data transmitted in the second TTI length are simultaneously scheduled in a current sub-frame, determine that the terminal processes the data transmitted in the first TTI length or the data transmitted in the second TTI length based on configuration signaling or the predefined rule.

In some embodiments, the fourth determination sub-module includes: a seventh determination unit, configured to, for uplink transmission, when the terminal does not support carrier aggregation and the data transmitted in the first TTI length and the data transmitted in the second TTI length are simultaneously scheduled in a current sub-frame: if the terminal has finished encoding of the data transmitted in the second TTI length before the data transmitted in the first TTI length has been processed, determine the data transmitted in the first TTI length and the data transmitted in the second TTI length being simultaneously processed by the terminal in the current sub-frame; a fourth determination unit, configured to, if the terminal has not finished the encoding of the data transmitted in the second TTI length before the data transmitted in the first TTI length has been processed, determine that the terminal does not support the data transmitted in the first TTI length and the data transmitted in the second TTI length are simultaneously processed in the current sub-frame, and determine that the terminal processes the data transmitted in the first TTI length or the data transmitted in the second TTI length based on configuration signaling or the predefined rule.

In some embodiments, the fourth determination submodule includes: a second obtainment unit, configured to, if the terminal does not support carrier aggregation but supports MIMO, obtain a total number of TBs supported by the terminal based on the MIMO capability reported by the terminal; an eighth determination unit, configured to, if a total number of the TBs of the data transmitted in the first TTI length that have an aligned start position in a time domain or overlap in the time domain and the data transmitted in the second TTI length in a current sub-frame is less than or equal to total number of TBs supported by the terminal, determine the data transmitted in the first TTI length and the data transmitted in the second TTI length being simultaneously processed by the terminal in the current sub-frame; a fourth determination unit, configured to, otherwise, Mode A: determine that the terminal does not support the data transmitted in the first TTI length and the data transmitted in the second TTI length being simultaneously processed in the current sub-frame, and determine the data transmitted in the first TTI length or the data transmitted in the second TTI length being processed by the terminal based on configuration signaling or the predefined rule; and/or Mode B: for uplink transmission, if the terminal has finished the encoding of the data transmitted in the second TTI length before the data transmitted in the first TTI length has been processed, determine the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determine that the terminal does not to support the data transmitted in the first TTI length and the data transmitted in the second TTI length being simultaneously processed in the current sub-frame, and determine that the terminal processes the data transmitted in the first TTI length or the data transmitted in the second TTI length based on the configuration signaling or the predefined rule.

In some embodiments, the fourth determination module includes: a ninth determination unit, configured to, if the terminal supports carrier aggregation, determine an upper limit value of quantity of TBs or an upper limit value of the quantity of TTIs that are simultaneously processed by the terminal in the same sub-frame based on an upper limit value of the aggregated carriers supported by the terminal; or if the terminal supports carrier aggregation, determine the upper limit value of quantity of TBs that are simultaneously processed by the terminal in the same sub-frame based on the upper limit value of the aggregated carriers supported by the terminal and the MIMO capability of each aggregated carrier; or determine the upper limit value of the quantity of TBs that are simultaneously processed by the terminal in the same sub-frame based on the carrier aggregation capability and the MIMO capability of the terminal; a tenth determination unit, configured to, if a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTIs, determine the data transmitted in the first TTI length and the data transmitted in the second TTI length being simultaneously processed by the terminal in the current sub-frame; a fourth determination unit, configured to, otherwise, Mode A: determine a part of the data transmitted in the first TTI length and the data transmitted in the second TTI length being processed by the terminal based on configuration signaling or the predefined rule; and/or Mode B: for uplink transmission, if the terminal has finished the encoding of the data transmitted in the second TTI length before the data transmitted in the first TTI length has been processed, determine the data transmitted in the first TTI length and the data transmitted in the second TTI length being simultaneously processed by the terminal in the current sub-frame; if the terminal has not finished the encoding of the data transmitted in the second TTI length before the data transmitted in the first TTI length has been processed, determine that the terminal does not support the data transmitted in the first TTI length and the data transmitted in the second TTI length being simultaneously processed in the current sub-frame, and determine that the terminal processes the data transmitted in the first TTI length or the data transmitted in the second TTI length based on the configuration signaling or the predefined rule, or if the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determine that the terminal processes a part of the data transmitted in the first TTI length and the data transmitted in the second TTI length based on the configuration signaling or the predefined rule.

In some embodiments, the second determination module includes: an eleventh determination unit, configured to, for uplink transmission, when the data transmitted in the first TTI length and the data transmitted in the second TTI length are simultaneously scheduled in a current sub-frame: if the terminal has finished the encoding of the data transmitted in the second TTI length before the data transmitted in the first TTI length has been processed, determine the data transmitted in the first TTI length and the data transmitted in the second TTI length being simultaneously processed by the terminal in the current sub-frame; a fourth determination unit, configured to, if the terminal has not finished the encoding of the data transmitted in the second TTI length before the data transmitted in the first TTI length has been processed, determine that the terminal does not support the data transmitted in the first TTI length and the data transmitted in the second TTI length being simultaneously processed in the current sub-frame, and determine that the terminal processes the data transmitted in the first TTI length or the data transmitted in the second TTI length based on configuration signaling or the predefined rule; or a twelfth determination unit, configured to, for uplink transmission and for each carrier, when the data transmitted in the first TTI length and the data transmitted in the second TTI length are simultaneously scheduled in the current sub-frame: if the terminal has finished the encoding of the data transmitted in the second TTI length before the data transmitted in the first TTI length has been processed, determine the data transmitted in the first TTI length and the data transmitted in the second TTI length being simultaneously processed by the terminal in the current sub-frame; the fourth determination unit, configured to, if the terminal has not finished the encoding of the data transmitted in the second TTI length before the data transmitted in the first TTI length has been processed, determine that the terminal does not support the data transmitted in the first TTI length and the data transmitted in the second TTI length being simultaneously processed in the current sub-frame, and determine that the terminal processes the data transmitted in the first TTI length or the data transmitted in the second TTI length based on a configuration signaling or a predefined rule; or a thirteenth determination unit, configured to, for uplink transmission and/or downlink transmission, determine that the terminal does not support the data transmitted in the first TTI length and the data transmitted in the second TTI length being simultaneously processed in a same sub-frame and in a same carrier, the fourth determination unit, configured to, when the data transmitted in the first TTI length and the data transmitted in the second TTI length are simultaneously scheduled in the current sub-frame and in a same carrier, determine that the terminal processes the data transmitted in the first TTI length or the data transmitted in the second TTI length in the same carrier based on the configuration signaling or the predefined rule; or a fourteenth determination unit, configured to, for uplink transmission and/or downlink transmission, determine that the terminal does not support the data transmitted in the first TTI length and the data transmitted in the second TTI length simultaneously existing in a same sub-frame; the fourth determination unit, configured to, when the data transmitted in the first TTI length and the data transmitted in the second TTI length are simultaneously scheduled in a current sub-frame, determine that the terminal processes the data transmitted in the first TTI length or the data transmitted in the second TTI length based on the configuration signaling or the predefined rule; or a fifteenth determination unit, configured to, determine that the terminal does not support the control channel transmitted in the first TTI length and the control channel transmitted in the second TTI length being simultaneously detected in a same sub-frame and in a same carrier, a twentieth determination unit, configured to determine that the terminal detects the control channel transmitted in the first TTI length or the control channel transmitted in the second TTI length in the current sub-frame and in the same carrier based on the configuration signaling or the predefined rule; or a sixteenth determination unit, configured to, determine that the terminal does not support the control channel transmitted in the first TTI length and the control channel transmitted in the second TTI length being simultaneously detected in a same sub-frame, the twentieth determination unit, configured to, determine that the terminal detects the control channel transmitted in the first TTI length or the control channel transmitted in the second TTI length in the current sub-frame based on the configuration signaling or the predefined rule; or a seventeenth determination unit, configured to determine that the terminal supports the control channel transmitted in the first TTI length and the control channel transmitted in the second TTI length being simultaneously detected in a same sub-frame and in a same carrier, the twentieth determination unit, configured to determine that the terminal detects the control channel transmitted in the first TTI length and the control channel transmitted in the second TTI length in the current sub-frame and in the same carrier; or an eighteenth determination unit, configured to determine that the terminal supports the control channel transmitted in the first TTI length and the control channel transmitted in the second TTI length being simultaneously detected in a same sub-frame, the twentieth determination unit, configured to determine that the terminal detects the control channel transmitted in the first TTI length and the control channel transmitted in the second TTI length in the current sub-frame simultaneously.

In some embodiments, the fourth determination unit includes: the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule defining that for downlink transmission, before a sub-frame where the data transmitted in the second TTI length belongs to, if the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or the predefined rule defining that for downlink transmission, in a sub-frame where the data transmitted in the second TTI length belongs to, if the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length; or the predefined rule defining that for uplink transmission, before a sub-frame where the data transmitted in the second TTI length belongs to, if the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or the predefined rule defining that for uplink transmission, in a sub-frame where the data transmitted in the second TTI length belongs to, if the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length.

In some embodiments, the fourth determination unit includes: the configuration signaling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if a total number of the TBs included in the determined data in a current sub-frame based on the configuration signaling exceeds an upper limit value of quantity of TBs or the total number of the TTIs included in the determined data in the current sub-frame based on the configuration signaling exceeds the upper limit value of the quantity of TTIs, the carrier index is further used for selection; or the configuration singling indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the configuration signaling indicating a ratio to allocate the upper limit value of quantity of TBs or the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the predefined rule exceeds the upper limit value of the quantity of TBs or the total number of the TTIs included in the determined data in the current sub-frame based on the predefined rule exceeds the upper limit value of the quantity of TTIs, the carrier index is further used for selection; or the predefined rule defining that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the predefined rule defining a ratio to allocate the upper limit value of the quantity of TBs or the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection.

In some embodiments, the twentieth determination unit includes: the configuration singling indicating that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that for downlink transmission, before a sub-frame where the control channel transmitted in the second TTI length belongs to, if the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for downlink transmission, in a sub-frame where the control channel transmitted in the second TTI length belongs to, if the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length; or the predefined rule defining that for uplink transmission, before a sub-frame where the control channel transmitted in the second TTI length belongs to, if the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for uplink transmission, in a sub-frame where the control channel transmitted in the second TTI length belongs to, if the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length.

In some embodiments, the base station further includes: a second processing module, configured to schedule the terminal to receive or transmit the data transmitted in the first TTI length and the data transmitted in the second TTI length in a same carrier, in a same sub-frame and in different frequency resources; or a second processing unit, configured to, when the frequency resource used by the data transmitted in the first TTI length and the frequency resource used by the data transmitted in the second TTI length in a same carrier and in a same sub-frame overlap, for downlink transmission, replace the data transmitted in the second TTI length by the data transmitted in the first TTI length at the overlapped frequency resource, and for uplink transmission, determine that the terminal overwrites the data transmitted in the second TTI length by the data transmitted in the first TTI length at the overlapped frequency resource; or the second processing module, configured to, for uplink transmission, punch data of the data transmitted in the second TTI length on symbols overlapping with the data transmitted in the first TTI length when data transmitted in the first TTI length and the data transmitted in the second TTI length are in the same carrier and in the same sub-frame.

In some embodiments, the first TTI length is less than 1 ms, the second TTI length is equal to 1 ms; and/or a plurality of TTIs that has an aligned start position in a time domain or overlap in the time domain has a same TTI length or different TTI lengths.

The beneficial effects of the above technical solution of the present disclosure are as follows.

In the foregoing solution, the data transmission method determines whether the data transmitted in different TTI lengths can be simultaneously processed according to the capability reported by the terminal or the predefined rule, so as to ensure that data in different TTI lengths may be properly transmitted by a terminal within its processing capability. The problem in the related art that a same terminal cannot correctly process the data transmitted in different TTI lengths is solved.

BRIEF DESCRIPTION OF THE DRAWINGS

FIG. 1 is a flow chart showing a data transmission method according to some embodiments of the present disclosure;

FIG. 2 is another flow chart showing a data transmission method according to some embodiments of the present disclosure;

DETAILED DESCRIPTION OF THE EMBODIMENTS

Figure 3:
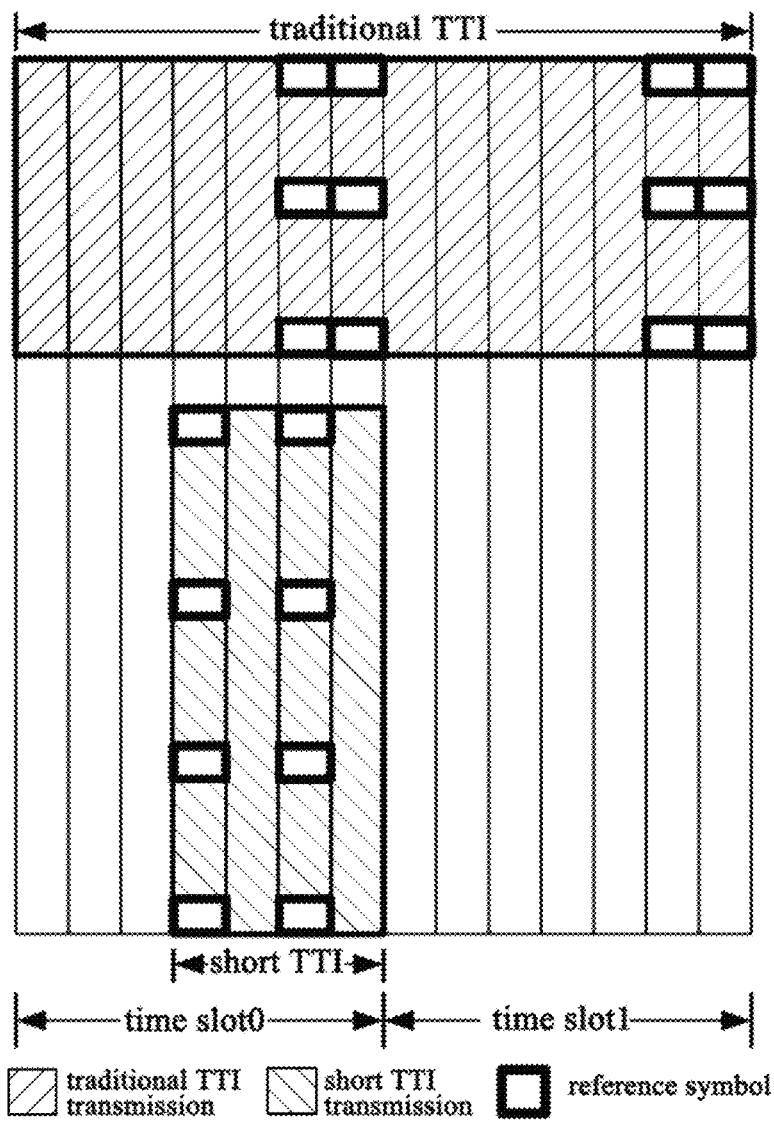
FIG. 3 is a schematic view showing a traditional TTI downlink transmission and a short TTI downlink transmission being simultaneously implemented according to some embodiments of the present disclosure.

In order to make the objects, the technical solutions and the advantages of the present disclosure more apparent, the present disclosure will be described hereinafter in a clear and complete manner in conjunction with the drawings and embodiments.

In order to solve the problem in the related art that a same terminal cannot correctly process the data transmitted in different TTI lengths, the present disclosure provides a plurality of solutions as following.

As shown in FIG. 1, the present disclosure provides in some embodiments a data transmission method including: Step 11: determining, by a terminal, data transmitted in the first TTI length and/or data transmitted in the second TTI length that are processed in a same sub-frame based on capability reported by the terminal or a predefined rule, the data including a shared channel and/or a control channel; wherein the first TTI length is less than the second TTI length.

Step 11 specifically includes determining whether the terminal may simultaneously process the data transmitted in the first TTI length and the data transmitted in the second TTI length in a same sub-frame and in a same carrier; and/or whether the terminal may simultaneously process the data transmitted in the first TTI length and the data transmitted in the second TTI length in a same s b-frame and in different carriers, if no, selecting a part of data transmitted in TTI to be processed.

In a possible embodiment of the present disclosure, the determining, by a terminal, data transmitted in the first TTI length and/or data transmitted in the second TTI length that are processed in a same sub-frame based on capability reported by the terminal includes: Mode 1, determining data transmitted in the first TTI length and/or data transmitted in the second TTI length that are processed in a same sub-frame based on the carrier aggregation capability and/or the multiple-input multiple-output MIMO capability reported by the terminal; and/or Mode 2, determining, by a terminal, data transmitted in the first TTI length and/or data transmitted in the second TTI length that are processed in a same sub-frame based on the capability of an upper limit value of quantity of transport blocks (TB) that are simultaneously processed in the same sub-frame or the capability of an upper limit value of quantity of TTIs that are simultaneously processed in the same sub-frame, reported by the terminal; and/or Mode 3, determining, by a terminal, data transmitted in the first TTI length and/or data transmitted in the second TTI length that are processed in a same sub-frame based on a capability of that whether data transmitted in the first TTI length and data transmitted in the second TTI length are simultaneously processed in a same sub-frame, reported by the terminal.

For Mode 3, the determining, by a terminal, data transmitted in the first TTI length and/or data transmitted in the second TTI length that are processed in a same sub-frame based on a capability of whether data transmitted in the first TTI length and data transmitted in the second TTI length are simultaneously processed in a same sub-frame, reported by the terminal includes: when the capability reported by the terminal indicates that the terminal supports data transmitted in the first TTI length and data transmitted in the second TTI length being simultaneously processed in a same sub-frame, if the data transmitted in the first TTI length and the data transmitted in the second TTI length are simultaneously scheduled in a current sub-frame, the data transmitted in the first TTI length and the data transmitted in the second TTI length being simultaneously processed by the terminal in the current sub-frame; or when the capability reported by the terminal indicates that the terminal does not support data transmitted in the first TTI length and data transmitted in the second TTI length being simultaneously processed in a same sub-frame, if the data transmitted in the first TTI length and the data transmitted in the second TTI length are simultaneously scheduled in a current sub-frame, determining, by the terminal, to process the data transmitted in the first TTI length or the data transmitted in the second TTI length base on a configuration signaling or a predefined rule.

Specifically, the capability of whether data transmitted in the first TTI length and data transmitted in the second TTI length are simultaneously processed in a same sub-frame, reported by the terminal includes: for uplink transmission and downlink transmission, the capability is reported together or separately; and/or for a terminal supporting carrier aggregation, the capability is reported together for all aggregated carriers or reported separately for each aggregated carrier.

If the capability is reported together for uplink transmission and downlink transmission, Mode 3 is adopted. If the capability is reported separately for uplink transmission and downlink transmission, Mode 3 is adopted for uplink transmission or downlink transmission respectively according the capability reported for the uplink transmission or downlink transmission. If the capability is reported together for all aggregated carriers, Mode 3 is adopted for each carrier. If the capability is reported separately for each aggregated carrier, Mode 3 is adopted for each carrier based on the capability reported for each carrier.

Furthermore, Mode 3 may be combined with Mode 1 or Mode 2. For example, when the capability reported by the terminal indicates that the terminal supports data transmitted in the first TTI length and data transmitted in the second TTI length being simultaneously processed in a same sub-frame, if the data transmitted in the first TTI length and the data transmitted in the second TTI length are simultaneously scheduled in a current sub-frame, the data transmitted in the first TTI length and the data transmitted in the second TTI length that are processed by the terminal in the same sub-frame are further determined based on Mode 1 or Mode 2, that is, Mode 1 or Mode 2 may be adopted to determine the data to be processed based on an upper limit value of the quantity of transport blocks or an upper limit value of the quantity of TTIs.

For Mode 2, the determining, by a terminal, data transmitted in the first TTI length and/or data transmitted in the second TTI length that are processed in a same sub-frame based on an upper limit value of the quantity of transport blocks or an upper limit value of the quantity of TTIs that are simultaneously processed in a same sub-frame includes: if the total number of the TBs of the data transmitted in the first TTI length that have an aligned start position in a time domain or overlap in the time domain and the data transmitted in the second TTI length in the current sub-frame is less than or equal to the upper limit value of the quantity of transport blocks, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, the data transmitted in the first TTI length and the data transmitted in the second TTI length are simultaneously processed by the terminal in the current sub-frame, otherwise, the terminal determines to process a part of the data transmitted in the first TTI length and the data transmitted in the second TTI length based on a configuration signaling or a predefined rule.

"The data transmitted in the first TTI length have an aligned start position in a time domain or overlap in the time domain" refers to "the data transmitted in the first TTI length is located in the time period in which the data transmitted in the first TTI length is located". That is, in a same sub-frame, different first TTI transmission in a same carrier and/or multiple carriers overlap in time domain, for example, different first TTI transmission in a same carrier and/or multiple carriers have a same or aligned start symbol. For example, when N carriers are aggregated in the terminal, one first TTI transmission exists in a same symbol position of each carrier (for example, one data transmission exists in the third to the sixth OFDM symbols), one second TTI (transitional TTI) transmission also exists in each carrier. At this time, N first TTI transmission exits in N carriers totally in the current first TTI (the third to the sixth OFDM). Certainly, the quantity of the symbols of the first TTI transmission in different carriers may be different, for example, the third to the sixth symbols are occupied by the first TTI transmission in A carriers from the N carriers, the third to the eighth symbols are occupied by the first TTI transmission in N-A carriers from the N carriers. Then in the current sub-frame, the total number of the first TTIs having start symbols at a same position equals to N-A+A=N. At this time, since one second TTI transmission exists in each carrier, the total number of the first TTI transmission and the second TTI transmission in the time period where the first TTI transmission currently being scheduled in the current sub-frame is located is 2N.

If in the current sub-frame, another first TTI transmission exists in the ninth to the twelfth symbols of each carrier, the other first TTI transmission is not counted in the first TTI transmission which occupies the third symbol. When the first TTI transmitted in the third to the sixth symbols is processed, the first TTI transmitted in the ninth to the twelfth symbols are processed in a same way as the first TTI transmitted in the third to the sixth symbols. The similar description hereinafter refers to the above explanation.

Specifically, the capability of an upper limit value of quantity of transport blocks (TB) that are simultaneously processed in the same sub-frame or the capability of an upper limit value of quantity of TTIs that are simultaneously processed in the same sub-frame, reported by the terminal includes: for uplink transmission and downlink transmission, the capability being reported together or separately.

If the capability is reported together for the uplink transmission and the downlink transmission, Mode 2 is adapted. If the capability is reported separately for the uplink transmission and the downlink transmission, Mode 2 is adapted for the uplink transmission or the downlink transmission based on the capability reported by the uplink transmission or the downlink transmission.

For Mode 1, the determining, by the terminal, data transmitted in the first TTI length and/or data transmitted in the second TTI length that are processed in a same sub-frame based on the carrier aggregation capability and/or the multiple-input multiple-output MIMO capability reported by the terminal includes: when the terminal does not support carrier aggregation, the terminal does not support the data transmitted in the first TTI length and the data transmitted in the second TTI length being simultaneously processed in a same sub-frame; if the data transmitted in the first TTI length and the data transmitted in the second TTI length are simultaneously scheduled in the current sub-frame, the terminal determines to process the data transmitted in the first TTI length or the data transmitted in the second TTI length based on a configuration signaling or a predefined rule.

For Mode 1, the determining, by the terminal, data transmitted in the first TTI length and/or data transmitted in the second TTI length that are processed in a same subframe based on the carrier aggregation capability and/or the multiple-input multiple-output MIMO capability reported by the terminal includes: for uplink transmission, when the terminal does not support carrier aggregation and the data transmitted in the first TTI length and the data transmitted in the second TTI length are simultaneously scheduled in the current sub-frame: if the terminal has finished the encoding of the data transmitted in the second TTI length before the data transmitted in the first TTI length has been processed, the data transmitted in the first TTI length and the data transmitted in the second TTI length are simultaneously processed by the terminal in the current sub-frame (the processing includes transmitting the data transmitted in the second TTI length, and encoding the data transmitted in the second TTI length, and so on);

If the terminal has not finished the encoding of the data transmitted in the second TTI length before the data transmitted in the first TTI length has been processed, the terminal does not support the data transmitted in the first TTI length and the data transmitted in the second TTI length being simultaneously processed in the current sub-frame (i.e. an encoder can only encode data transmitted in one TTI length, and cannot encode data transmitted in two different TTI lengths at the same time), and the terminal determines to process the data transmitted in the first TTI length or the data transmitted in the second TTI length based on a configuration signaling or a predefined rule.

For Mode 1, the determining, by the terminal, data transmitted in the first TTI length and/or data transmitted in the second TTI length that are processed in a same subframe based on the carrier aggregation capability and/or the multiple-input multiple-output MIMO capability reported by the terminal includes: if the terminal does not support carrier aggregation but supports MIMO, the total number of TBs is obtained based on the MIMO capability reported by the terminal, if the total number of the TBs of the data transmitted in the first TTI length that have an aligned start position in a time domain or overlap in the time domain and the data transmitted in the second TTI length in the current sub-frame is less than or equal to total number of TBs supported by the terminal, the data transmitted in the first TTI length and the data transmitted in the second TTI length are simultaneously processed by the terminal in the current sub-frame; otherwise, Mode A: the terminal does not support the data transmitted in the first TTI length and the data transmitted in the second TTI length being simultaneously processed in the current sub-frame, and the data transmitted in the first TTI length or the data transmitted in the second TTI length are processed based on a configuration signaling or a predefined rule; and/or Mode B: for uplink transmission, if the terminal has finished the encoding of the data transmitted in the second TTI length before the data transmitted in the first TTI length has been processed, the data transmitted in the first TTI length and the data transmitted in the second TTI length are simultaneously processed by the terminal in the current sub-frame.

If the terminal has not finished the encoding of the data transmitted in the second TTI length before the data transmitted in the first TTI length has been processed, the terminal does not support the data transmitted in the first TTI length and the data transmitted in the second TTI length being simultaneously processed in the current sub-frame, and the terminal determines to process the data transmitted in the first TTI length or the data transmitted in the second TTI length based on a configuration signaling or a predefined rule.

For Mode 1, the determining, by the terminal, data transmitted in the first TTI length and/or data transmitted in the second TTI length that are processed in a same subframe based on the carrier aggregation capability and/or the multiple-input multiple-output MIMO capability reported by the terminal includes: if the terminal supports carrier aggregation, determining an upper limit value of the quantity of transport blocks or an upper limit value of the quantity of TTIs that are simultaneously processed by the terminal in a same sub-frame based on the an upper limit value of the aggregated carriers supported by the terminal; or if the terminal supports carrier aggregation, determining an upper limit value of the quantity of transport blocks that is simultaneously processed by the terminal in a same sub-frame based on the an upper limit value of the aggregated carriers supported by the terminal and the MIMO capability of each aggregated carrier; or an upper limit value of the quantity of transport blocks that is simultaneously processed by the terminal in a same sub-frame based on the carrier aggregation capability and the MIMO capability of the terminal.

If the total number of the TBs of the data transmitted in the first TTI length that have an aligned start position in a time domain or overlap in the time domain and the data transmitted in the second TTI length in the current sub-frame is less than or equal to the upper limit value of the quantity of transport blocks, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, the data transmitted in the first TTI length and the data transmitted in the second TTI length are simultaneously processed by the terminal in the current sub-frame, otherwise, Mode A: a part of the data transmitted in the first TTI length and the data transmitted in the second TTI length are processed by the terminal based on a configuration signaling or a predefined rule; and/or Mode B: for uplink transmission, if the terminal has finished the encoding of the data transmitted in the second TTI length before the data transmitted in the first TTI length has been processed, the data transmitted in the first TTI length and the data transmitted in the second TTI length are simultaneously processed by the terminal in the current sub-frame.

If the terminal has not finished the encoding of the data transmitted in the second TTI length before the data transmitted in the first TTI length has been processed, the terminal does not support the data transmitted in the first TTI length and the data transmitted in the second TTI length being simultaneously processed in the current sub-frame, and the terminal determines to process the data transmitted in the first TTI length or the data transmitted in the second TTI length based on a configuration signaling or a predefined rule, or if the terminal has not finished the encoding of the data transmitted in the second TTI length before the data transmitted in the first TTI length has been processed, the terminal does not support the data transmitted in the first TTI length and the data transmitted in the second TTI length being simultaneously processed in the current sub-frame, and the terminal determines to process a part of the data transmitted in the first TTI length and the data transmitted in the second TTI length based on a configuration signaling or a predefined rule.

The determining, by a terminal, data transmitted in the first TTI length and/or data transmitted in the second TTI length that are processed in a same sub-frame based on a predefined rule includes: for uplink transmission, when the data transmitted in the first TTI length and the data transmitted in the second TTI length are simultaneously scheduled in a current sub-frame: if the terminal has finished the encoding of the data transmitted in the second TTI length before the data transmitted in the first TTI length has been processed, the data transmitted in the first TTI length and the data transmitted in the second TTI length are simultaneously processed by the terminal in the current sub-frame; if the terminal has not finished the encoding of the data transmitted in the second TTI length before the data transmitted in the first TTI length has been processed, the terminal does not support the data transmitted in the first TTI length and the data transmitted in the second TTI length being simultaneously processed in the current sub-frame, and the terminal determines to process the data transmitted in the first TTI length or the data transmitted in the second TTI length based on a configuration signaling or a predefined rule; or for uplink transmission and for each carrier, when the data transmitted in the first TTI length and the data transmitted in the second TTI length are simultaneously scheduled in a current sub-frame: if the terminal has finished the encoding of the data transmitted in the second TTI length before the data transmitted in the first TTI length has been processed, the data transmitted in the first TTI length and the data transmitted in the second TTI length are simultaneously processed by the terminal in the current sub-frame; if the terminal has not finished the encoding of the data transmitted in the second TTI length before the data transmitted in the first TTI length has been processed, the terminal does not support the data transmitted in the first TTI length and the data transmitted in the second TTI length being simultaneously processed in the current sub-frame, and the terminal determines to process the data transmitted in the first TTI length or the data transmitted in the second TTI length based on a configuration signaling or a predefined rule.

Or for uplink transmission, the terminal does not support the data transmitted in the first TTI length and the data transmitted in the second TTI length being simultaneously processed in a same sub-frame and in a same carrier, when the data transmitted in the first TTI length and the data transmitted in the second TTI length are simultaneously scheduled in a current sub-frame and in a same carrier, the terminal determines to process the data transmitted in the first TTI length or the data transmitted in the second TTI length based on a configuration signaling or a predefined rule.

Or for downlink transmission, the terminal does not support the data transmitted in the first TTI length and the data transmitted in the second TTI length being simultaneously processed in a same sub-frame, when the data transmitted in the first TTI length and the data transmitted in the second TTI length are simultaneously scheduled in a current sub-frame, the terminal determines to process the data transmitted in the first TTI length or the data transmitted in the second TTI length based on a configuration signaling or a predefined rule.

That is for uplink transmission, the data transmitted in the first TTI length and/or the data transmitted in the second TTI length are determined to be processed in a same sub-frame based on the capability reported by the terminal or a predefined rule.

In a possible embodiment of the present disclosure, determining, by the terminal, to process the data transmitted in the first TTI length or the data transmitted in the second TTI length based on a configuration signaling or a predefined rule includes: the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule indicating that for downlink transmission, before a sub-frame where the data transmitted in the second TTI length belongs to, if the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or the predefined rule indicating that for downlink transmission, in a sub-frame where the data transmitted in the second TTI length belongs to, if the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length; or the predefined rule indicating that for uplink transmission, before a sub-frame where the data transmitted in the second TTI length belongs to, if the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or the predefined rule indicating that for uplink transmission, in a sub-frame where the data transmitted in the second TTI length belongs to, if the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length.

In a possible embodiment of the present disclosure, determining, by the terminal, to process a part of the data transmitted in the first TTI length or the data transmitted in the second TTI length based on a configuration signaling or a predefined rule includes: the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the configuration signaling exceeds the upper limit value of the quantity of TBs or the total number of the TTIs included in the determined data in the current sub-frame based on the configuration signaling exceeds the upper limit value of the quantity of TTIs, the carrier index is further used (if the data transmitted in the first TTI length is used, the total number of the TBs included in the determined data in the current sub-frame based on the configuration signaling is the total number of the TBs included in the data transmitted in the first TTI length in the time period where the data transmitted in the first TTI length scheduled in the current sub-frame is located); or the configuration singling indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used; or the configuration signaling indicating the ratio of the upper limit value of the quantity of TBs and the upper limit value of the quantity of TTIs distributed in the data transmitted in the first TTI length and the data transmitted in the second TTI length (the upper limit value of the quantity of the TBs is N, the configuration signaling indicating the ratio distributed for the data transmitted in the first TTI length, for example a, the terminal may determine floor (N×a) TBs in the data transmitted in the first TTI length and floor N−(N×a) TBs in the data transmitted in the second TTI length being simultaneously processed in the current sub-frame, floor means round down); if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used; or the predefined rule indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the predefined rule exceeds the upper limit value of the quantity of TBs, or the total number of the TTIs included in the determined data in the current sub-frame based on the predefined rule exceeds the upper limit value of the quantity of TTIs, the carrier index is further used.

Or the predefined rule indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used; or the predefined rule indicating a ratio to allocate the upper limit value of the quantity of TBs and the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used.

The above procedure for select to use the data transmitted in the first TTI length and/or the data transmitted in the second TTI length also applied for the selection of control channel, which will not repeated herein.

In a possible embodiment of the present disclosure, the data transmission method further includes receiving or transmitting the data transmitted in the first TTI length and the data transmitted in the second TTI length in a same carrier, in a same sub-frame and in different frequency resources, that is according to the method, the base station should avoid to schedule overlapped frequency resources to the data transmitted in the first TTI length and the data transmitted in the second TTI length in a same carrier and in a same sub-frame; or when the frequency resource used by the data transmitted in the first TTI length and the frequency resource used by the data transmitted in the second TTI length in a same carrier and in a same sub-frame overlap, for downlink transmission, the terminal determines that a base station overwrites the data transmitted in the second TTI length by the data transmitted in the first TTI length at the overlapped frequency resource, at this time, when the terminal receives the data transmitted in the second TTI length, the terminal always assumes that a part of the data transmitted in the second TTI length having overlapped frequency resource with the symbols of the data transmitted in the first TTI length are zero, that is at the overlapped frequency resource, the base station only transmits the data transmitted in the first TTI length, not the data transmitted in the second TTI length; and for uplink transmission, the terminal overwrites the data transmitted in the second TTI length by the data transmitted in the first TTI length at the overlapped frequency resource; or for uplink transmission, punching data on symbols corresponding to the data transmitted in the first TTI length from the data transmitted in the second TTI length in the same carrier and in the same sub-frame. For the punching process, if the DMRS (Demodulation Reference Signal) symbol in the data transmitted in the second TTI length is also included in SC-FDMA (Single-carrier Frequency-Division Multiple Access) symbol corresponding to the data transmitted in the first TTI length, then the DMRS needs to be punched, which will affect the channel estimation for the uplink data by the base station side; or the DMRS may not be punched, only the data transmission part is punched, the DMS transmission for the data transmitted in the first TTI length and the data transmitted in the second TTI length are achieved by generating DMRS having a same length for the two kinds of data on common DMRS symbol of data transmitted in a first and second TTI length. For example, the frequency resource for the data transmitted in the first TTI length is RB1-5, and the frequency resource for the data transmitted in the second TTI length is RB6-10, and the DMRS having a same length are transmitted in RB1-10 on the fourth SC-FDMA in one sub-frame. Different cyclic shifts are used to guarantee the orthogonality of the respective DMRSs on the same time-frequency domain resources.

In a possible embodiment of the present disclosure, the first TTI length is less than 1 ms, the second TTI length is equal to 1 ms; and/or a plurality of TTIs that has an aligned start position in a time domain or overlap in the time domain has a same TTI length or different TTI lengths.

The symbol may be a Single-carrier Frequency-Division Multiple Access (SC-FDMA) symbol.

When the data transmitted in the first TTI length and the data transmitted in the second TTI length refers to a shared channel transmitted in the first TTI length and a shared channel transmitted in the second TTI length, or a control channel transmitted in the first TTI length and a control channel transmitted in the second TTI length, different modes may be combined. For example, Mode 3 may be adopted for the control channel transmitted in the first TTI length and the control channel transmitted in the second TTI length, Mode 3, another mode, or a predefined rule may be adopted for the shared channel transmitted in the first TTI length and the shared channel transmitted in the second TTI length (which are applicable for the base station side and the terminal side).

For example, when the capability reported by the terminal indicates that the terminal supports a control channel transmitted in the first TTI length and a control channel transmitted in the second TTI length being simultaneously detected in a same sub-frame, the terminal simultaneously detects the control channel transmitted in the first TTI length and the control channel transmitted in the second TTI length in the current sub-frame.

When the capability reported by the terminal indicates that the terminal does not support a control channel transmitted in the first TTI length and a control channel transmitted in the second TTI length being simultaneously detected in a same sub-frame, the terminal determines to detect the control channel transmitted in the first TTI length or the control channel transmitted in the second TTI length in the current sub-frame based on a configuration signaling or a predefined rule.

For uplink/downlink transmission, it is determined that the terminal does not support the data transmitted in the first TTI length and the data transmitted in the second TTI length being simultaneously processed in a same sub-frame, when the data transmitted in the first TTI length and the data transmitted in the second TTI length are simultaneously scheduled in a current sub-frame, the terminal determines to process the data transmitted in the first TTI length or the data transmitted in the second TTI length based on a configuration signaling or a predefined rule; or when the capability reported by the terminal indicates that the terminal supports the control channel transmitted in the first TTI length and the control channel transmitted in the second TTI length being simultaneously detected in a same sub-frame, for uplink and/or downlink transmission, the terminal determines to process the data transmitted in the first TTI length and/or the data transmitted in the second TTI length based on Mode 1, Mode 2, Mode 3 or a predefined rule.

For example, it is determined that the terminal does not support the control channel transmitted in the first TTI length and the control channel transmitted in the second TTI length being simultaneously detected in a same sub-frame, the terminal determines to detect the control channel transmitted in the first TTI length or the control channel transmitted in the second TTI length in the current sub-frame based on a configuration signaling or a predefined rule; for uplink and/or downlink shared channel transmission, it is determined that the terminal does not support the data transmitted in the first TTI length and the data transmitted in the second TTI length being simultaneously processed in a same sub-frame, when the data transmitted in the first TTI length and the data transmitted in the second TTI length being simultaneously scheduled in a same sub-frame, the terminal determines to process the data transmitted in the first TTI length or the data transmitted in the second TTI length in the carrier based on a configuration signaling or a predefined rule.

For example, it is determined that the terminal supports the control channel transmitted in the first TTI length and the control channel transmitted in the second TTI length being simultaneously detected in a same sub-frame, the terminal simultaneously detects the control channel transmitted in the first TTI length and the control channel transmitted in the second TTI length in a same sub-frame. For uplink and/or downlink shared channel transmission, it is determined that the data transmitted in the first TTI length and the data transmitted in the second TTI length being simultaneously processed in a same sub-frame, when the data transmitted in the first TTI length and the data transmitted in the second TTI length are simultaneously scheduled in a current sub-frame, the terminal determines to process the data transmitted in the first TTI length or the data transmitted in the second TTI length in the carrier based on a configuration signaling or a predefined rule; or the terminal determines to process the data transmitted in the first TTI length and/or the data transmitted in the second TTI length based on Mode 1, Mode 2, Mode 3 or a predefined rule.

For each carrier, the above procedure is applicable. For example, when the capability reported by the terminal indicates that the terminal supports a control channel transmitted in the first TTI length and a control channel transmitted in the second TTI length being simultaneously detected in a same sub-frame in a same carrier, the terminal simultaneously detects the control channel transmitted in the first TTI length and the control channel transmitted in the second TTI length in the current sub-frame in the current carrier.

When the capability reported by the terminal indicates that the terminal does not support the control channel transmitted in the first TTI length and the control channel transmitted in the second TTI length being simultaneously detected in a same sub-frame in a same carrier, the terminal determines to detect the control channel transmitted in the first TTI length or the control channel transmitted in the second TTI length based on the configuration signaling or the predefined rule. For uplink and/or downlink shared channel transmission, it is determined that the terminal does not support the data transmitted in the first TTI length and the data transmitted in the second TTI length being simultaneously processed in a same sub-frame in a same carrier, when the data transmitted in the first TTI length and the data transmitted in the second TTI length are simultaneously scheduled in a current sub-frame in a current carrier, the terminal determines to process the data transmitted in the first TTI length or the data transmitted in the second TTI length in the carrier based on a configuration signaling or a predefined rule; or when the capability reported by the terminal indicates that the terminal supports the control channel transmitted in the first TTI length and the control channel transmitted in the second TTI length being simultaneously detected in a same sub-frame in a same carrier, for uplink and/or down link shared channel transmission, the terminal determines to process the data transmitted in the first TTI length and/or the data transmitted in the second TTI length based on Mode 1, Mode 2, Mode 3 or a predefined rule.

For example, it is determined that the terminal does not support the control channel transmitted in the first TTI length and the control channel transmitted in the second TTI length being simultaneously detected in a same sub-frame in a same carrier, the terminal determines to detect the control channel transmitted in the first TTI length or the control channel transmitted in the second TTI length based on the configuration signaling or the predefined rule. For uplink and/or downlink shared channel transmission, it is determined that the terminal does not support the data transmitted in the first TTI length and the data transmitted in the second TTI length being simultaneously processed in a same sub-frame in a same carrier, when the data transmitted in the first TTI length and the data transmitted in the second TTI length are simultaneously scheduled in a current sub-frame in a current carrier, the terminal determines to process the data transmitted in the first TTI length or the data transmitted in the second TTI length in the carrier based on a configuration signaling or a predefined rule.

For example, when it is determined that the terminal supports the control channel transmitted in the first TTI length and the control channel transmitted in the second TTI length being simultaneously detected in a same sub-frame in a same carrier, the terminal simultaneously detects the control channel transmitted in the first TTI length and the control channel transmitted in the second TTI length being simultaneously detected in a same sub-frame in a same carrier. For uplink and/or down link shared channel transmission, it is determined that the terminal supports the data transmitted in the first TTI length and the data transmitted in the second TTI length being simultaneously processed in the same carrier in the same sub-frame, when the data transmitted in the first TTI length and the data transmitted in the second TTI length are simultaneously scheduled in the same carrier in the same sub-frame, the terminal determines to process the data transmitted in the first TTI length or the data transmitted in the second TTI length based the configuration signaling and the predefined rule, or the terminal determines to process the data transmitted in the first TTI length and/or the data transmitted in the second TTI length based on Mode 1, Mode 2, Mode 3 or a predefined rule.

From the above data transmission method, it is determined whether the data transmitted in different TTI lengths may be processed simultaneously based on the capability of the terminal or a predefined rule so as to ensure a proper transmission within the capacity of the terminal supporting data transmission in different TTI lengths, and solve a problem in the related art that one terminal cannot properly process data transmitted in different TTI lengths.

As shown in FIG. 2, the present disclosure provides in some embodiments a data transmission method including: Step 21: determining, by a base station, data transmitted in the first TTI length and/or data transmitted in the second TTI length that are processed by a terminal in a same sub-frame based on capability reported by the terminal or a predefined rule, the data including a shared channel and/or a control channel; wherein the first TTI length is less than the second TTI length.

Step 21 specifically includes determining whether the terminal may simultaneously process the data transmitted in the first TTI length and the data transmitted in the second TTI length in a same sub-frame and in a same carrier; and/or whether the terminal may simultaneously process the data transmitted in the first TTI length and the data transmitted in the second TTI length in a same sub-frame and in different carriers, if no, selecting a part of data transmitted in TTI to be processed.

In a possible embodiment of the present disclosure, the determining, by a base station, data transmitted in the first TTI length and/or data transmitted in the second TTI length that are processed by a terminal in a same sub-frame based on capability reported by the terminal includes: Mode 1, determining data transmitted in the first TTI length and/or data transmitted in the second TTI length that are processed by the terminal in a same sub-frame based on the carrier aggregation capability and/or the multiple-input multiple-output MIMO capability reported by the terminal; and/or Mode 2, determining data transmitted in the first TTI length and/or data transmitted in the second TTI length that are processed by the terminal in a same sub-frame based on the capability of an upper limit value of quantity of transport blocks (TB) (including data transmitted in the first TTI length and data transmitted in the second TTI length) that are simultaneously processed in the same sub-frame or the capability of an upper limit value of quantity of TTIs that are simultaneously processed in the same sub-frame, reported by the terminal; and/or Mode 3, determining data transmitted in the first TTI length and/or data transmitted in the second TTI length that are processed by the terminal in a same sub-frame based on a capability of whether data transmitted in the first TTI length and data transmitted in the second TTI length are simultaneously processed in a same sub-frame, reported by the terminal.

For Mode 3, the determining data transmitted in the first TTI length and/or data transmitted in the second TTI length that are processed by the terminal in a same sub-frame based on a capability of whether data transmitted in the first TTI length and data transmitted in the second TTI length are simultaneously processed in a same sub-frame, reported by the terminal includes: when the capability reported by the terminal indicates that the terminal supports data transmitted in the first TTI length and data transmitted in the second TTI length being simultaneously processed in a same sub-frame, if the data transmitted in the first TTI length and the data transmitted in the second TTI length are simultaneously scheduled in a current sub-frame, it is determined that the data transmitted in the first TTI length and the data transmitted in the second TTI length are simultaneously processed by the terminal in the current sub-frame; or when the capability reported by the terminal indicates that the terminal does not support data transmitted in the first TTI length and data transmitted in the second TTI length being simultaneously processed in a same sub-frame, if the data transmitted in the first TTI length and the data transmitted in the second TTI length are simultaneously scheduled in a current sub-frame, determining that the terminal processes the data transmitted in the first TTI length or the data transmitted in the second TTI length base on a configuration signaling or a predefined rule.

Specifically, the capability of whether data transmitted in the first TTI length and data transmitted in the second TTI length are simultaneously processed in a same sub-frame, reported by the terminal includes: for uplink transmission and downlink transmission, the capability is reported together or separately; and/or for a terminal supporting carrier aggregation, the capability is reported together for all aggregated carriers or reported separately for each aggregated carrier.

If the capability is reported together for uplink transmission and downlink transmission, Mode 3 is adopted. If the capability is reported separately for uplink transmission and downlink transmission, Mode 3 is adopted for uplink transmission or downlink transmission respectively according the capability reported for the uplink transmission or downlink transmission. If the capability is reported together for all aggregated carriers, Mode 3 is adopted for each carrier. If the capability is reported separately for each aggregated carrier, Mode 3 is adopted for each carrier based on the capability reported for each carrier.

Furthermore, Mode 3 may be combined with Mode 1 or Mode 2. For example, when the capability reported by the terminal indicates that the terminal supports data transmitted in the first TTI length and data transmitted in the second TTI length being simultaneously processed in a same sub-frame, if the data transmitted in the first TTI length and the data transmitted in the second TTI length are simultaneously scheduled in a current sub-frame, the data transmitted in the first TTI length and the data transmitted in the second TTI length that are processed by the terminal in the same sub-frame are further determined based on Mode 1 or Mode 2, that is, Mode 1 or Mode 2 may be adopted to determine the data to be processed based on an upper limit value of the quantity of transport blocks or an upper limit value of the quantity of TTIs.

For Mode 2, the determining data transmitted in the first TTI length and/or data transmitted in the second TTI length that are processed by the terminal in a same sub-frame based on the capability of an upper limit value of quantity of transport blocks (TB) that are simultaneously processed in the same sub-frame or the capability of an upper limit value of quantity of TTIs that are simultaneously processed in the same sub-frame, reported by the terminal includes: if the total number of the TBs of the data transmitted in the first TTI length that have an aligned start position in a time domain or overlap in the time domain and the data transmitted in the second TTI length in the current sub-frame is less than or equal to the upper limit value of the quantity of transport blocks, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, it is determined that the data transmitted in the first TTI length and the data transmitted in the second TTI length are simultaneously processed by the terminal in the current sub-frame, otherwise, it is determined that the terminal processes a part of the data transmitted in the first TTI length and the data transmitted in the second TTI length based on a configuration signaling or a pre-defined rule.

"The data transmitted in the first TTI length have an aligned start position in a time domain or overlap in the time domain" refers to "the data transmitted in the first TTI length is located in the time period in which data transmitted in the first TTI length is located", That is, in a same sub-frame, different first TTI (short TTI) transmission in a same carrier and/or multiple carriers overlap in time domain, for example, different first TTI transmission in a same carrier and/or multiple carriers have a same or aligned start symbol. For example, when N carriers (N being a positive integer) are aggregated in the terminal, one first TTI transmission exists in a same symbol position of each carrier (for example, one data transmission exists in the third to the sixth OFDM symbols), one second TTI (transitional TTI) transmission also exists in each carrier. At this time, N first TTI transmission exits in N carriers totally in the current first TTI (the third to the sixth OFDM). Certainly, the quantity of the symbols of the first TTI transmission in different carriers may be different, for example, the third to the sixth symbols are occupied by the first TTI transmission in A carriers from the N carriers, the third to the eighth symbols are occupied by the first TTI transmission in N-A carriers from the N carriers. Then in the current sub-frame, the total number of the first TTIs having start symbols at a same position equals to N-A+A=N, where A is a positive integer. At this time, since one second TTI transmission exists in each carrier the total number of the first TTI transmission and the second TTI transmission in the time period where the first TTI transmission currently being scheduled in the current sub-frame is located is 2N.

If in the current sub-frame, another first TTI transmission exists in the ninth to the twelfth symbols of each carrier, the other first TTI transmission is not counted in the first TTI transmission which occupies the third symbol. When the first TTI transmitted in the third to the sixth symbols is processed, the first TTI transmitted in the ninth to the twelfth symbols are processed in a same way as the first TTI transmitted in the third to the sixth symbols. The similar description hereinafter refers to the above explanation.

Specifically, the capability of an upper limit value of quantity of transport blocks (TB) that are simultaneously processed in the same sub-frame or the capability of an upper limit value of quantity of TTIs that are simultaneously processed in the same sub-frame, reported by the terminal includes: for uplink transmission and downlink transmission, the capability being reported together or separately.

If the capability is reported together for the uplink transmission and the downlink transmission, Mode 2 is adapted. If the capability is reported separately for the uplink transmission and the downlink transmission, Mode 2 is adapted for the uplink transmission or the downlink transmission based on the capability reported by the uplink transmission or the downlink transmission.

For Mode 1, the determining data transmitted in the first TTI length and/or data transmitted in the second TTI length that are processed by the terminal in a same sub-frame based on the carrier aggregation capability and/or the multiple-input multiple-output MIMO capability reported by the terminal includes: when the terminal does not support carrier aggregation, it is determined that the terminal does not support the data transmitted in the first TTI length and the data transmitted in the second TTI length being simultaneously processed in a same sub-frame; if the data transmitted in the first TTI length and the data transmitted in the second TTI length are simultaneously scheduled in the current sub-frame, it is determined that the terminal processes the data transmitted in the first TTI length or the data transmitted in the second TTI length based on a configuration signaling or a predefined rule.

For Mode 1, the determining data transmitted in the first TTI length and/or data transmitted in the second TTI length that are processed by the terminal in a same sub-frame based on the carrier aggregation capability and/or the multiple-input multiple-output MIMO capability reported by the terminal includes: for uplink transmission, when the terminal does not support carrier aggregation and the data transmitted in the first TTI length and the data transmitted in the second TTI length are simultaneously scheduled in the current sub-frame: if it is determined that the terminal has finished the encoding of the data transmitted in the second TTI length before the data transmitted in the first TTI length has been processed, the data transmitted in the first TTI length and the data transmitted in the second TTI length are simultaneously processed by the terminal in the current sub-frame (the processing includes transmitting the data transmitted in the second TTI length, and encoding the data transmitted in the second TTI length, and so on). If it is determined that the terminal has not finished the encoding of the data transmitted in the second TTI length before the data transmitted in the first TTI length has been processed, the terminal does not support the data transmitted in the first TTI length and the data transmitted in the second TTI length being simultaneously processed in the current sub-frame (i.e. an encoder can only encode data transmitted in one TTI length, and cannot encode data transmitted in two different TTI lengths at the same time), and it is determined that the terminal processes the data transmitted in the first TTI length or the data transmitted in the second TTI length based on a configuration signaling or a predefined rule.

At this time, since the base station cannot determine whether the terminal has finished the encoding of the data transmitted in the second TTI length before the data transmitted in the first TTI length has been processed, blind detection should be implemented for the two transmission ways, that is, the base station assumes that the data transmitted in the first TTI length and the data transmitted in the second TTI length are simultaneously transmitted (two kinds of data are received simultaneously). If both the two kinds of data are correctly received (a Cyclic Redundancy Check is passed), it is determined that the data transmitted in the first TTI length and the data transmitted in the second TTI length are simultaneously transmitted by the terminal, if the data transmitted in the second TTI length is not correctly received (a Cyclic Redundancy Check is not passed, or DTX-CRC fails), it is determined that only the data transmitted in a first TTI is transmitted by the terminal. The base station will implement blind detection under the following similar procedure.

For Mode 1, the determining data transmitted in the first TTI length and/or data transmitted in the second TTI length that are processed by the terminal in a same sub-frame based on the carrier aggregation capability and/or the multiple-input multiple-output MIMO capability reported by the terminal includes: if the terminal does not support carrier aggregation but supports MIMO, the total number of TBs is obtained based on the MIMO capability reported by the terminal, if the total number of the TBs of the data transmitted in the first TTI length that have an aligned start position in a time domain or overlap in the time domain and the data transmitted in the second TTI length in the current sub-frame is less than or equal to total number of TBs supported by the terminal, the data transmitted in the first TTI length and the data transmitted in the second TTI length are simultaneously processed by the terminal in the current sub-frame; otherwise, Mode A: it is determined that the terminal does not support the data transmitted in the first TTI length and the data transmitted in the second TTI length being simultaneously processed in the current sub-frame, and the data transmitted in the first TTI length or the data transmitted in the second TTI length are processed based on a configuration signaling or a predefined rule; and/or Mode B: for uplink transmission, if the terminal has finished the encoding of the data transmitted in the second TTI length before the data transmitted in the first TTI length has been processed, it is determined that the data transmitted in the first TTI length and the data transmitted in the second TTI length are simultaneously processed by the terminal in the current sub-frame. If the terminal has not finished the encoding of the data transmitted in the second TTI length before the data transmitted in the first TTI length has been processed, it is determined the terminal does not support the data transmitted in the first TTI length and the data transmitted in the second TTI length being simultaneously processed in the current sub-frame, and the terminal processes the data transmitted in the first TTI length or the data transmitted in the second TTI length based on a configuration signaling or a predefined rule.

For Mode 1, the determining data transmitted in the first TTI length and/or data transmitted in the second TTI length that are processed by the terminal in a same sub-frame based on the carrier aggregation capability and/or the multiple-input multiple-output MIMO capability reported by the terminal includes: if the terminal supports carrier aggregation, determining an upper limit value of the quantity of transport blocks or an upper limit value of the quantity of TTIs that are simultaneously processed by the terminal in a same sub-frame based on the an upper limit value of the aggregated carriers supported by the terminal; or if the terminal supports carrier aggregation, determining an upper limit value of the quantity of transport blocks that is simultaneously processed by the terminal in a same sub-frame based on the an upper limit value of the aggregated carriers supported by the terminal and the MIMO capability of each aggregated carrier; or determining an upper limit value of the quantity of transport blocks that is simultaneously processed by the terminal in a same sub-frame based on the carrier aggregation capability and the MIMO capability of the terminal.

If the total number of the TBs of the data transmitted in the first TTI length that have an aligned start position in a time domain or overlap in the time domain and the data transmitted in the second TTI length in the current sub-frame is less than or equal to the upper limit value of the quantity of transport blocks, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, it is determined that the data transmitted in the first TTI length and the data transmitted in the second TTI length are simultaneously processed by the terminal in the current sub-frame, otherwise, Mode A: it is determined a part of the data transmitted in the first TTI length and the data transmitted in the second TTI length are processed by the terminal based on a configuration signaling or a predefined rule; and/or Mode B: for uplink transmission, if the terminal has finished the encoding of the data transmitted in the second TTI length before the data transmitted in the first TTI length has been processed, it is determined the data transmitted in the first TTI length and the data transmitted in the second TTI length are simultaneously processed by the terminal in the current sub-frame.

If the terminal has not finished the encoding of the data transmitted in the second TTI length before the data transmitted in the first TTI length has been processed, it is determined the terminal does not support the data transmitted in the first TTI length and the data transmitted in the second TTI length being simultaneously processed in the current sub-frame, and the terminal processes the data transmitted in the first TTI length or the data transmitted in the second TTI length based on a configuration signaling or a predefined rule, or if the terminal has not finished the encoding of the data transmitted in the second TTI length before the data transmitted in the first TTI length has been processed, it is determined the terminal does not support the data transmitted in the first TTI length and the data transmitted in the second TTI length being simultaneously processed in the current sub-frame, and the terminal processes a part of the data transmitted in the first TTI length and the data transmitted in the second TTI length based on a configuration signaling or a predefined rule.

The determining data transmitted in the first TTI length and/or data transmitted in the second TTI length that are processed by the terminal in a same sub-frame based on a predefined rule includes: for uplink transmission, when the data transmitted in the first TTI length and the data transmitted in the second TTI length are simultaneously scheduled in a current sub-frame: if the terminal has finished the encoding of the data transmitted in the second TTI length before the data transmitted in the first TTI length has been processed, it is determined the data transmitted in the first TTI length and the data transmitted in the second TTI length are simultaneously processed by the terminal in the current sub-frame; if the terminal has not finished the encoding of the data transmitted in the second TTI length before the data transmitted in the first TTI length has been processed, it is determined the terminal does not support the data transmitted in the first TTI length and the data transmitted in the second TTI length being simultaneously processed in the current sub-frame, and the terminal processes the data transmitted in the first TTI length or the data transmitted in the second TTI length based on a configuration signaling or a predefined rule; or for uplink transmission and for each carrier, when the data transmitted in the first TTI length and the data transmitted in the second TTI length are simultaneously scheduled in a current sub-frame: if the terminal has finished the encoding of the data transmitted in the second TTI length before the data transmitted in the first TTI length has been processed, it is determined the data transmitted in the first TTI length and the data transmitted in the second TTI length are simultaneously processed by the terminal in the current sub-frame; if the terminal has not finished the encoding of the data transmitted in the second TTI length before the data transmitted in the first TTI length has been processed, it is determined the terminal does not support the data transmitted in the first TTI length and the data transmitted in the second TTI length being simultaneously processed in the current sub-frame, and the terminal processes the data transmitted in the first TTI length or the data transmitted in the second TTI length based on a configuration signaling or a predefined rule.

That is for uplink transmission, the data transmitted in the first TTI length and/or the data transmitted in the second TTI length are determined to be processed in a same sub-frame based on the capability reported by the terminal or a predefined rule.

In a possible embodiment of the present disclosure, determining, by the terminal, to process the data transmitted in the first TTI length or the data transmitted in the second TTI length based on a configuration signaling or a predefined rule includes: the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule indicating that the terminal determines to process one of the data transmitted in the first TTI length and the data transmitted in the second TTI length, or the terminal determines to process data with one TB or two TBs from the data transmitted in the first TTI length and the data transmitted in the second TTI length.

Or the predefined rule indicating that for downlink transmission, before a sub-frame where the data transmitted in the second TTI length belongs to, if the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or the predefined rule indicating that for downlink transmission, in a sub-frame where the data transmitted in the second TTI length belongs to, if the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length.

Or the predefined rule indicating that for uplink transmission, before a sub-frame where the data transmitted in the second TTI length belongs to, if the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or the predefined rule indicating that for uplink transmission, in a sub-frame where the data transmitted in the second TTI length belongs to, if the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length.

In a possible embodiment of the present disclosure, determining, by the terminal, to process a part of the data transmitted in the first TTI length or the data transmitted in the second TTI length based on a configuration signaling or a predefined rule includes: the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the configuration signaling exceeds the upper limit value of the quantity of TBs or the total number of the TTIs included in the determined data in the current sub-frame based on the configuration signaling exceeds the upper limit value of the quantity of TTIs, the carrier index is further used (if the data transmitted in the first TTI length is used, the total number of the TBs included in the determined data in the current sub-frame based on the configuration signaling is the total number of the TBs included in the data transmitted in the first TTI length in the time period where the data transmitted in the first TTI length scheduled in the current sub-frame is located).

Or the configuration singling indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used; or the configuration signaling indicating the ratio of the upper limit value of the quantity of TBs and the upper limit value of the quantity of TTIs distributed in the data transmitted in the first TTI length and the data transmitted in the second TTI length (the upper limit value of the quantity of the TBs is N, the configuration signaling indicating the ratio distributed for the data transmitted in the first TTI length, for example a, the terminal may determine floor (N×a) TBs in the data transmitted in the first TTI length and floor N−(N×a) TBs in the data transmitted in the second TTI length being simultaneously processed in the current sub-frame, floor means round down); if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used.

Or the predefined rule indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the predefined rule exceeds the upper limit value of the quantity of TBs, or the total number of the TTIs included in the determined data in the current sub-frame based on the predefined rule exceeds the upper limit value of the quantity of TTIs, the carrier index is further used. Or the predefined rule indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used; or the predefined rule indicating a ratio to allocate the upper limit value of the quantity of TBs and the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used.

The above procedure for select to use the data transmitted in the first TTI length and/or the data transmitted in the second TTI length also applied for the selection of control channel, which will not repeated herein.

In a possible embodiment of the present disclosure, the data transmission method further includes scheduling, by the base station, the terminal to receive or transmit the data transmitted in the first TTI length and the data transmitted in the second TTI length in a same carrier, in a same sub-frame and in different frequency resources, that is according to the method, the base station should avoid to schedule overlapped frequency resources to the data transmitted in the first TTI length and the data transmitted in the second TTI length in a same carrier and in a same sub-frame; or when the frequency resource used by the data transmitted in the first TTI length and the frequency resource used by the data transmitted in the second TTI length in a same carrier and in a same sub-frame overlap, for downlink transmission, the base station overwrites the data transmitted in the second TTI length by the data transmitted in the first TTI length at the overlapped frequency resource, for uplink transmission, the base station overwrites the data transmitted in the second TTI length by the data transmitted in the first TTI length at the overlapped frequency resource, at this time, when the terminal receives the data transmitted in the second TTI length, the terminal always assumes that a part of the data transmitted in the second TTI length having overlapped frequency resource with the symbols of the data transmitted in the first TTI length are zero, that is at the overlapped frequency resource, the base station only transmits the data transmitted in the first TTI length, not the data transmitted in the second TTI length; or for uplink transmission, in the same carrier and in the same sub-frame, it is determined that data on symbols corresponding to the data transmitted in the first TTI length from the data transmitted in the second TTI length are punched by the terminal, that is, when the base station receives the data transmitted in the second TTI length, it always assumes that that data on symbols corresponding to the data transmitted in the first TTI length are zero, that is, the data transmitted in the second TTI length is not transmitted actually.

In a possible embodiment of the present disclosure, the first TTI length is less than 1 ms, the second TTI length is equal to 1 ms; and/or a plurality of TTIs that has an aligned start position in a time domain or overlap in the time domain has a same TTI length or different TTI lengths. The symbol may be a Single-carrier Frequency-Division Multiple Access (SC-FDMA) symbol.

From the above data transmission method, it is determined whether the data transmitted in different TTI lengths may be processed simultaneously based on the capability of the terminal or a predefined rule so as to ensure a proper transmission within the capacity of the terminal supporting data transmission in different TTI lengths, and solve a problem in the related art that one terminal cannot properly process data transmitted in different TTI lengths.

The data transmission method according to some embodiments of the present disclosure is further described as follows.

The short TTI and/or the traditional TII (second TII) that are processed by the terminal in one sub-frame are determined based on the capability of the terminal supporting short TII (first TII) transmission. The specific method includes Mode 1: the terminal determines the short TTI and/or the traditional TII that are processed in one sub-frame based on the carrier aggregation capability and/or Multiple-Input Multiple-Out-put (MIMO) capability of the terminal by one or more of Modes 1-1, 1-2, 1-3, 1-4 and 1-5. Modes 1-1, 1-2, 1-3 are applied for a terminal without carrier aggregation capability, and modes 1-4 and 1-5 are applied for a terminal having carrier aggregation capability.

Mode 1-1: for a terminal not supporting the carrier aggregation (no matter whether to support MIMO), it is determined that the terminal does not support a short TTI and a traditional TTI being processed simultaneously in a same sub-frame.

If the short TTI transmission and the traditional TTI transmission are scheduled simultaneously in the current sub-frame, the terminal determines to process one TTI transmission based on the configuration signaling or the predefined rule.

The configuration signaling may indicate to select the short TTI transmission or the traditional TTI transmission, or select 1 TB transmission or 2 TB transmission. The predefined rule may indicate one of the short TTI transmission and the traditional TTI transmission, or one of 1 TB transmission and 2 TB transmission.

For example, for downlink transmission, the terminal only decodes the short TTI transmission, and does not decode the traditional TTI transmission.

For example, for uplink transmission, if the terminal receives scheduling information for short TTI transmitted in a traditional TTI transmission sub-frame before the traditional TTI transmission sub-frame, the terminal does not transmit the traditional TTI in the traditional TTI transmission sub-frame, only transmit the short TTI. If the terminal receives scheduling information for short TTI transmitted in a traditional TTI transmission sub-frame or a next sub-frame during the traditional TTI transmission sub-frame (that is the terminal does not receive scheduling information for short TTI transmitted in a traditional TTI transmission sub-frame before the traditional TTI transmission sub-frame, the terminal will transmit uplink data of the traditional TTI in the sub-frame for each SC-FDMA symbol), the terminal does not transmit the traditional TTI, and encode the short TTI transmission and transmit the short TTI in a corresponding scheduled resource.

Mode 1-2: for uplink transmission, for a terminal not supporting carrier aggregation (no matter whether to support MIMO), when the short TTI transmission and the traditional TTI transmission are scheduled simultaneously in the current sub-frame, if the terminal has finished the encoding of the traditional TTI before the encoding of the short TTI, and the terminal receives scheduling information for short TTI during the traditional TTI transmission sub-frame, the terminal may transmit the short TTI and the traditional TTI in the sub-frame; otherwise (the terminal has not finished the encoding of the traditional TTI before the encoding of the short TTI, or the terminal receives scheduling information for short TTI transmitted in the traditional TTI transmission sub-frame before the traditional TTI transmission sub-frame), Mode 1-1 is adopted.

Mode 1-3: for a terminal not supporting carrier aggregation, if it supports MIMO (that is the terminal has MIMO capability, for example, it is reported that not less than 2 layers are supported, at least 2 TBs may be encoded/decoded simultaneously), if the total number of the quantity of short TTI and the quantity of traditional TTI scheduled in the current sub-frame does not exceed the total number of TBs supported by MIMO (for example, 2 TBs), the terminal simultaneously process the short TTI transmission and the traditional TTI transmission in the current sub-frame; otherwise (that is the terminal does not support MIMO, has no MIMO capability, for example, it is reported one layer is supported), the terminal adopts Mode 1-1 and/or Mode 1-2.

For example, for downlink transmission, when the terminal supports MIMO transmission, two TBs may be simultaneously decoded. When the short TTI and the traditional TTI scheduled in the current sub-frame are both 1 TB transmission, the terminal may receive and decode the short TTI and the traditional TTI simultaneously in the current sub-frame; otherwise, if the short TTI and the traditional TTI scheduled in the current sub-frame are both 2 TBs transmission or one of them is 2 TBs transmission, the terminal decodes the short TTI transmission based on the configuration signaling or the predefined rule, does not decode the traditional TTI transmission, or the terminal decodes the TTI transmission using 2 TBs transmission mode based on the configuration signaling or the predefined rule, does not decode the TTI transmission using 1 TB transmission mode; or Mode 1-1 is adopted.

For example, for uplink transmission, if the terminal supports MIMO transmission, two TBs may be simultaneously decoded. If the short TTI and the traditional TTI scheduled in the current sub-frame are both 1 TB transmission, the terminal may encode and transmit the short TTI and the traditional TTI simultaneously in the current sub-frame; otherwise, if the short TTI and the traditional TTI scheduled in the current sub-frame are both 2 TBs transmission or one of them is 2 TBs transmission, Mode A: the terminal encodes and transmits the short TTI transmission based on the configuration signaling or the predefined rule, does not encode and transmit the traditional TTI transmission, or Mode B: the terminal encodes and transmits the TTI transmission using 2 TBs transmission mode based on the configuration signaling or the predefined rule, does not encode and transmit the TTI transmission using 1 TB transmission mode; or Mode C: Mode 1-1 or 1-2 is adopted.

Mode 1-4: for the terminal supporting carrier aggregation (no matter whether to support MIMO), the total number of TTI or TB being simultaneously processed (i.e. encoding/decoding) is determined based on the maximum quantity of aggregated carriers supported by the terminal, if the total number of short TTI transmission and traditional TTI transmission within a time period where the short TTI transmission currently scheduled in the current sub-frame is located does not exceed the total number of TTI being simultaneously processed, or if the total number of TBs of short TTI transmission and traditional TTI transmission within a time period where the short TTI transmission currently scheduled in the current sub-frame is located does not exceed the total number of TBs being simultaneously processed, the terminal processes the short TTI and the traditional TTI in the current sub-frame; otherwise (exceed the total number of TBs), the terminal determines to process a part of data transmission based on the configuration signaling or the predefined rule.

In some embodiments of the present disclosure, the total number of TTI being simultaneously processed is the maximum quantity of aggregated carriers N1 or $\lfloor N1/2 \rfloor$, the total number of TBs being simultaneously processed is the maximum quantity of aggregated carriers N1; for example, for downlink transmission, the maximum quantity of aggregated carriers supported by the terminal is N1, N1 TTI or $\lfloor N1/2 \rfloor$ TTI may be simultaneously decoded. When the total number of short TTI transmission and traditional TTI transmission within a time period where the short TTI transmission currently scheduled in the current sub-frame is located does not exceed N1 or $\lfloor N1/2 \rfloor$ the terminal receives and decodes the short TTI and the traditional TTI simultaneously in the current sub-frame; otherwise (the total number of short TTI transmission and traditional TTI transmission exceeds N1 or $\lfloor N1/2 \rfloor$), the terminal determines to decode the short TTI first based on the configuration signaling or the predefined rule. For example, if the total number of short TTI transmission does not exceed N1 or $\lfloor N1/2 \rfloor$ the serial number of the carriers is further used (for example from minimum to maximum) to select the traditional TTI transmission to be decoded, if the terminal supports to transmit a plurality of short TTI by FDM in a same carrier and in a same time period, the total number of short TTI transmission may exceed N1 or $\lfloor N1/2 \rfloor$, it does exceed, the serial number of the carriers is further used (for example from minimum to maximum) to select traditional TTI transmission whose quantity does not exceed N1 or $\lfloor N1/2 \rfloor$ to be decoded; or Mode 1-1 is adopted.

For example, for downlink transmission, the maximum quantity of aggregated carriers supported by the terminal is N1, N1 TBs may be simultaneously decoded. When the total number of TBs of short TTI transmission and traditional TTI transmission within a time period where the short TTI transmission currently scheduled in the current sub-frame is located does not exceed N1, the terminal receives and decodes the short TTI and the traditional TTI simultaneously in the current sub-frame; otherwise (the total number of TBs of short TTI transmission and traditional TTI transmission exceeds N1), the terminal determines to decode the short TTI first based on the configuration signaling or the predefined rule. For example, if the total number of TBs of short TTI transmission does not exceed N1, the serial number of the carriers is further used (for example from minimum to maximum) to select the traditional TTI transmission to be decoded, if the terminal supports to transmit a plurality of short TTI by FDM in a same carrier and in a same time period, the total number of TBs of short TTI transmission may exceed N1, it does exceed, the serial number of the carriers is further used (for example from minimum to maximum) to select TBs of traditional TTI transmission whose quantity does not exceed N1 to be decoded; or Mode 1-1 is adopted.

For example, for uplink transmission, the maximum quantity of aggregated carriers supported by the terminal is N2, N2 TTI or $\lfloor 2/2 \rfloor$ TTI may be simultaneously encoded. When the total number of short TTI transmission and traditional TTI transmission within a time period where the short TTI transmission currently scheduled in the current sub-frame is located does not exceed N2 or $\lfloor N2/2 \rfloor$, the terminal encodes and transmits the short TTI and the traditional TTI simultaneously in the current sub-frame; otherwise (the total number of short TTI transmission and traditional TTI transmission exceeds N2 or $\lfloor N2/2 \rfloor$), Mode A: the terminal determines to encode the short TTI first based on the configuration signaling or the predefined rule. For example, if the total number of short TTI transmission does not exceed N2 or $\lfloor N2/2 \rfloor$, the serial number of the carriers is further used (for example from minimum to maximum) to select the traditional TTI transmission to be encoded, if the terminal supports to transmit a plurality of short TTI by FDM in a same carrier and in a same time period, the total number of short TTI transmission may exceed N2 or $\lfloor N2/2 \rfloor$, it does exceed, the serial number of the carriers is further used (for example from minimum to maximum) to select short TTI transmission whose quantity does not exceed N2 or $\lfloor N2/2 \rfloor$ to be encoded; or Mode B: Mode 1-1 or 1-2 is adopted.

For example, for uplink transmission, the maximum quantity of aggregated carriers supported by the terminal is N2, at least N2 TBs may be simultaneously encoded. When the total number of TBs of short TTI transmission and traditional TTI transmission within a time period where the short TTI transmission currently scheduled in the current sub-frame is located does not exceed N2, the terminal encodes and transmits the short TTI and the traditional TTI simultaneously in the current sub-frame; otherwise (the total number of TBs of short TTI transmission and traditional TTI transmission exceeds N2), Mode A: the terminal determines to encode the short TTI first based on the configuration signaling or the predefined rule. For example, if the total number of TBs of short TTI transmission does not exceed N2, the serial number of the carriers is further used (for example from minimum to maximum) to select the traditional TTI transmission to be encoded, if the terminal supports to transmit a plurality of short TTI by FDM in a same carrier and in a same time period, the total number of TBs of short TTI transmission may exceed N2, it does exceed, the serial number of the carriers is further used (for example from minimum to maximum) to select TBs of short TTI transmission whose quantity does not exceed N1 to be encoded; or Mode B: Mode 1-1 or 1-2 is adopted.

Mode 1-5: for a terminal supporting carrier aggregation, the total number of TBs being simultaneously processed (the quantity of TBs being simultaneously encoding and decoding) in a same sub-frame is determined based on the maximum quantity of aggregated carriers supported by the terminal and the quantity of TBs supported in each aggregated carrier (that is MIMO capability, whether multiple TBs transmission is supported). If the total number of TBs of short TTI transmission and traditional TTI transmission within a time period where the short TTI transmission currently scheduled in the current sub-frame is located does not exceed the total number of TBs being simultaneously processed, the terminal may process the short TTI and the traditional TTI simultaneously in the current sub-frame: otherwise (the total number of TBs of short TTI transmission and traditional TTI transmission exceeds the total number of TBs being simultaneously processed), the terminal determines to process a part of data transmission based on the predefined rule.

The total number of TBs being simultaneously processed is $$\sum_{i=0}^{N-1} C_i,$$

where N is the maximum number of supported aggregated carriers, $C_i$ is the maximum number TBs supported in each aggregated carrier. For example, if 1 TB transmission is supported, then $C_i=1$, if 2 TB transmission is supported, then $C_i=2$.

For example, for downlink transmission, the maximum quantity of aggregated carriers supported by the terminal in a plurality of bands is N1 based on carrier aggregation capability reported by the terminal. The maximum number of TBs supported in each aggregated carrier may be determined based on MIMP capability reported by the terminal, and $$\sum_{i=0}^{N_1-1} C_i$$

TBs may be decoded simultaneously decoded. When the total number of TBs of short TTI transmission and traditional TTI transmission within a time period where the short TTI transmission currently scheduled in the current sub-frame is located does not exceed $$\sum_{i=0}^{N_1-1} C_i,$$

the terminal receives and decodes the short TTI and the traditional TTI simultaneously in the current sub-frame; otherwise (the total number of TBs of short TTI transmission and traditional TTI transmission exceeds $$\left.\sum_{i=0}^{N_1-1} C_i\right),$$

the terminal determines to decode the short TTI first based on the configuration signaling or the predefined rule. For example, if the total number of TBs of short TTI transmission does not exceed $$\sum_{i=0}^{N_1-1} C_i,$$

the serial number of the carriers is further used (for example from minimum to maximum) to select the traditional TTI transmission to be decoded, if the terminal supports to transmit a plurality of short TTI by FDM in a same carrier and in a same time period, the total number of TBs of short TTI transmission may exceed $$\sum_{i=0}^{N_1-1} C_i,$$

it does exceed, the serial number of the carriers is further used (for example from minimum to maximum) to select TBs of traditional TTI transmission whose quantity does not exceed $$\sum_{i=0}^{N_1-1} C_i$$

to be decoded; or Mode 1-1 is adopted.

For example, for uplink transmission, the maximum quantity of aggregated carriers supported by the terminal is N2, at least $$\sum_{i=0}^{N_2-1} C_i$$

TBs may be simultaneously encoded. When the total number of TBs of short TTI transmission and traditional TTI transmission within a time period where the short TTI transmission currently scheduled in the current sub-frame is located does not exceed $$\sum_{i=0}^{N_2-1} C_i,$$

the terminal encodes and transmits the short TTI and the traditional TTI simultaneously in the current sub-frame; otherwise (the total number of TBs of short TTI transmission and traditional TTI transmission exceeds N1), Mode A: the terminal determines to encode the short TTI first based on the configuration signaling or the predefined rule. For example, if the total number of TBs of short TTI transmission does not exceed $$\sum_{i=0}^{N_2-1} C_i,$$

the serial number of the carriers is further used (for example from minimum to maximum) to select the traditional TTI transmission to be encoded, if the terminal supports to transmit a plurality of short TTI by FDM in a same carrier and in a same time period, the total number of TBs of short TTI transmission may exceed $$\sum_{i=0}^{N_2-1} C_i,$$

it does exceed, the serial number of the carriers is further used (for example from minimum to maximum) to select TBs of short TTI transmission whose quantity does not exceed $$\sum_{i=0}^{N_2-1} C_i$$

to be encoded; or Mode B: Mode 1-1 or 1-2 is adopted.

The Modes 1-1 to 1-5 are applied to both the uplink transmission and the downlink transmission, or applied to the uplink transmission or the downlink transmission. When the modes are applied to both the uplink transmission and the downlink transmission, the processing are implemented based on uplink and downlink carrier aggregation/MIMO capability, or maximum/minimum/average carrier aggregation/MIMO capability in the downlink and uplink transmission.

Mode 2: the terminal reports the total number of TBs or TTIs being simultaneously processed in a same sub-frame, and determines short TTI and/or traditional TTI being processed in the same sub-frame.

If the total number of TBs of short TTI transmission and traditional TTI transmission within a time period where the short TTI transmission currently scheduled in the current sub-frame is located does not exceed the total number of TBs being simultaneously processed, or if the total number of TTIs of short TTI transmission and traditional TTI transmission within a time period where the short TTI transmission currently scheduled in the current sub-frame is located does not exceed the total number of TTIs being simultaneously processed, the terminal may process the short TTI and the traditional TTI simultaneously in the current sub-frame; otherwise (exceeding the total number of TBs or TTIs being simultaneously processed), the terminal determines to process a part of data transmission based on the predefined rule.

If K total numbers of TBs are predefined, one total number of TBs supported by the terminal is reported by using $\lceil \log_2 K \rceil$ bit information.

For uplink transmission and downlink transmission, one total number of TBs or TTIs may be reported together, that is the total number of TBs or TTIs are both supported for both uplink transmission and downlink transmission; or one total number of TBs or TTIs is reported for downlink transmission or uplink transmission separately.

For example, for uplink transmission and downlink transmission, the procedure to select short TTI transmission and/or traditional TTI transmission based on the total number of TBs or TTIs is similar with mode 1-5, the only difference is to use the reported total number TBs or TTIs.

Mode 3: the terminal reports a capability indicating whether to support the short TTI and the traditional TTI being simultaneously processed, and determines to process the short TTI and/or the traditional TTI in the same sub-frame.

For uplink transmission and downlink transmission, the capability is reported together by using one bit information. That is, if it is supported, it is supported for both uplink transmission and downlink transmission, and if it is not supported, it is not supported by either uplink transmission or downlink transmission. Or for uplink transmission and downlink transmission, the capability is reported separately by using one bit information. That is, it may be supported for both uplink transmission and downlink transmission, or supported by neither uplink transmission nor downlink transmission, or supported by either uplink transmission or downlink transmission.

For the terminal supporting the carrier aggregation, the capability may be indicated together for all carriers. That is, if it is supported, it is supported for each carrier. Or the capability may be indicated separately for each carrier. For example, 0 indicates not supporting, 1 indicates supporting, and vice versa.

If the terminal supports to simultaneously process the Short TTI and the transitional TTI, the terminal may simultaneously process the Short TTI and the transitional TTI in a same carrier (if the scheduling exists at the same time). If the terminal does not support to simultaneously process the Short TTI and the transitional TTI, if the Short TTI and the transitional TTI are simultaneously scheduled in the current sub-frame in the same carrier, the terminal determines to process one of the short TTI and the traditional TTI based on the configuration signaling or the predefined rule.

The configuration signaling may indicate to select the short TTI or the traditional TTI, or select 1 TB transmission or 2 TB transmission.

For the above Modes 1, 2 and 3, the terminal selecting to process a part of data transmission based on the predefined rule specifically includes: the configuration signaling indicting to select the short TTI or the traditional TTI; or the configuration signaling indicating to select A1 short TTIs, or A2 traditional TTIs; the predefined rule being one or combination of selecting short TTI transmission in each aggregated carrier first; and selecting in the order of serial number of the carriers (for example from the maximum to the minimum, or from the minimum to the maximum) until the total number of TBs being simultaneously processed is meet.

For Modes 1, 2 and 3, the configuration signaling may be high level signaling or in a physical downlink control channel.

The physical downlink control channel includes one or both of a physical downlink control channel corresponding to the short TTI transmission and a physical downlink control channel corresponding to the traditional TTI transmission.

When the configuration signaling is carried in both the physical downlink control channel corresponding to the short TTI transmission and the physical downlink control channel corresponding to the traditional TTI transmission, the configuration signaling in the physical downlink control channel indicates a same content. If the configuration signaling in the physical downlink control channel corresponding to the short TTI transmission and the configuration signaling in the physical downlink control channel corresponding to the traditional TTI transmission indicate different contents, it is regard that wrong scheduling is happened and not proceeding is implemented, or the configuration signaling in the physical downlink control channel corresponding to the short TTI transmission is used.

In some embodiments, it is predefined to process the short TTI.

The data of traditional TTI may be discarded, or the data in the time period where the short TTI is located is punched, and data other than the punched one is processed (received/decoded for the downlink transmission, and encoded/transmitted for the uplink transmission) if the data may be self-decoded.

The short TTI and the traditional TTI are transmitted in the same carrier in the same sub-frame and in different frequency resources. Or when the frequency resource of short TTI and the frequency resource of traditional TTI (partially or wholly) overlap in the same carrier in the same sub-frame, a part of the traditional TTI overlapping the short TTI is punched (that is the short TTI data will replace the traditional TTI data at the overlapped part). Or, for uplink transmission, a part of traditional TTI data corresponding SC-FDMA symbols of the short TTI transmission is punched in the same carrier in the same sub-frame, so as to ensure the single carrier characteristic, that is no matter whether the frequency resource of the short TTI and the frequency resource of the traditional TTI overlap, the traditional TTI data is not transmitted at the symbol of the short TTI transmission in the sub-frame.

In some embodiments, short TTI transmission in the time period where the short TTI transmission being scheduled in the current sub-frame is located is short TTI transmission overlapping in the time period of a plurality of aggregated carriers and/or a same carrier. If a plurality of short TTIs is transmitted by TDM in the current sub-frame, each short TTI is separately processed by the above mentioned method.

The above data transmission method may be implemented by the terminal to determine the short TTI and/or the traditional TTI being processed in the same sub-frame, or the terminal transmits the related information to a base station, the base station determine the short TTI and/or the traditional TTI being processed in the same sub-frame, and generates a command based on the determination result and transmits the command to the terminal, the terminal implements operations based on the command.

When the base station receives the capacity reported by the terminal, the base station determines the transmitting and receiving condition (the short TTI and/or the traditional TTI being processed in the same sub-frame) based on the capacity by the above mentioned method. Optionally, the base station implements scheduling so as to avoid discarding a part of TTI transmission by the terminal. That is, it is ensured that the total number of TBs being scheduled does not exceed the quantity of TBs being supported by the terminal, or the scheduling is implemented based on the supporting condition reported in Mode 3. If the terminal that the short TTI and the traditional TTI are simultaneously processed by the terminal in a carrier, the short TTI transmission and the traditional TTI transmission (including one or both of uplink transmission and downlink transmission depending on the capability indicates the uplink transmission and the downlink transmission are reported together or separately) are scheduled simultaneously in the same sub-frame in the carrier. If the terminal reports that the short TTI and the traditional cannot be simultaneously processed in the carrier, the base station should avoid scheduling the short TTI transmission and the traditional transmission simultaneously in the carrier in the same sub-frame.

The data transmission method in some embodiments of the present disclosure is described by the following examples.

Example 1 (corresponding to Mode 1): the terminal reports the carrier aggregation capability, determines the aggregated carriers in each band supported by the terminal based on carrier aggregation bandwidth classes corresponding to each band in the supported band combination, so that the maximum number of aggregated carriers supported by the terminal in a plurality of bands is N1. The maximum quantities of TBs supported in each carrier in the carrier aggregation bandwidth classes may be determined based on the MIMO capability corresponding to the carrier aggregation bandwidth classes of each band in the supported band combination. MOMO capabilities of different bands are reported separately, MIMP capabilities of a plurality of carriers in the same band are the same, so that it is determined the terminal may simultaneously decode $$\sum_{i=0}^{N_1-1} C_i$$

TBs. Assume that it is determined that the terminal may support a maximum quantity of 10 aggregated carriers, each aggregated carrier supports MIMO transmission (2 TB transmission). It is determined based on the capacity reported by the terminal that the total number of TBs being simultaneously processed in the same sub-frame is 10×2=20. When the terminal is allocated 6 carriers (carrier 1 to carrier 6) for carrier aggregation and in the sub-frame, there are following conditions.

Condition 1: assume that 2 TB transmission is configured for the terminal in carrier 1 to carrier 6, one short TTI transmission is scheduled for the terminal in each of carriers 1-6, each short TTI transmission is a 2 TB transmission. One traditional TTI transmission is scheduled for the terminal in each of carriers 1-6, each traditional TTI transmission is a 2 TB transmission. The total number of TBs scheduled in the current sub-frame for the terminal is 6×2+6×2=24, which exceeds the total number (20) of TBs being capable of being simultaneously processed. Therefore, the terminal needs to select 20 TBs from the 24 TBs to be processed. For example, the short TTI transmission is firstly selected, that is the short TTI transmission in carriers 1-6 are all processed, the remaining number of TBs to be processed is 20−12=8. The traditional TTI transmission is further selected, since there are totally 12 TBs for the 6 traditional TTI transmissions, the traditional TTI transmission is selected based on the priority of the carriers. For example, the traditional TTI transmission in carriers 1 to 4 is selected to be processed by the order of serial numbers of carriers from minimum to maximum. Therefore, the traditional TTI transmission and the short TTI transmission are simultaneously processed in carriers 1-4, the short TTI transmission is processed in carriers 5-6. For the uplink transmission, the data is encoded, and for the downlink transmission, the data is decoded.

Condition 2: assume that 1 TB transmission is configured for the terminal in carrier 1 to carrier 6, one short TTI transmission is scheduled for the terminal in each of carriers 1-6, each short TTI transmission is a 1 TB transmission. One traditional TTI transmission is scheduled for the terminal in each of carriers 1-6, each traditional TTI transmission is a 1 TB transmission. The total number of TBs scheduled in the current sub-frame for the terminal is 6+6=12, which does not exceed the total number (20) of TBs being capable of being simultaneously processed. Therefore, all of the traditional TTI transmission and the short TTI transmission are simultaneously processed by the terminal in the current sub-frame in carriers 1-6. For the uplink transmission, the data is encoded, and for the downlink transmission, the data is decoded.

In the above example, 2 TB transmission capability is supported in all carriers. Optionally, 2 TB transmission is supported by a part of aggregated carriers and not supported by another part of aggregated carriers, A part of the short TTI transmission and traditional TTI transmission being scheduled are 2 TB transmission, and a part of them are 1 TB transmission, the procedure is similar and will be not repeated herein.

Example 2 (corresponding to mode 2): the total number of TBs being simultaneously processed by the terminal in a same sub-frame is 20. When 6 carriers (carrier 1 to carrier 6) are configured for the terminal and carrier aggregation is implemented in the current sub-frame, the processing procedure is similar to that in Example 1.

Figure 4:
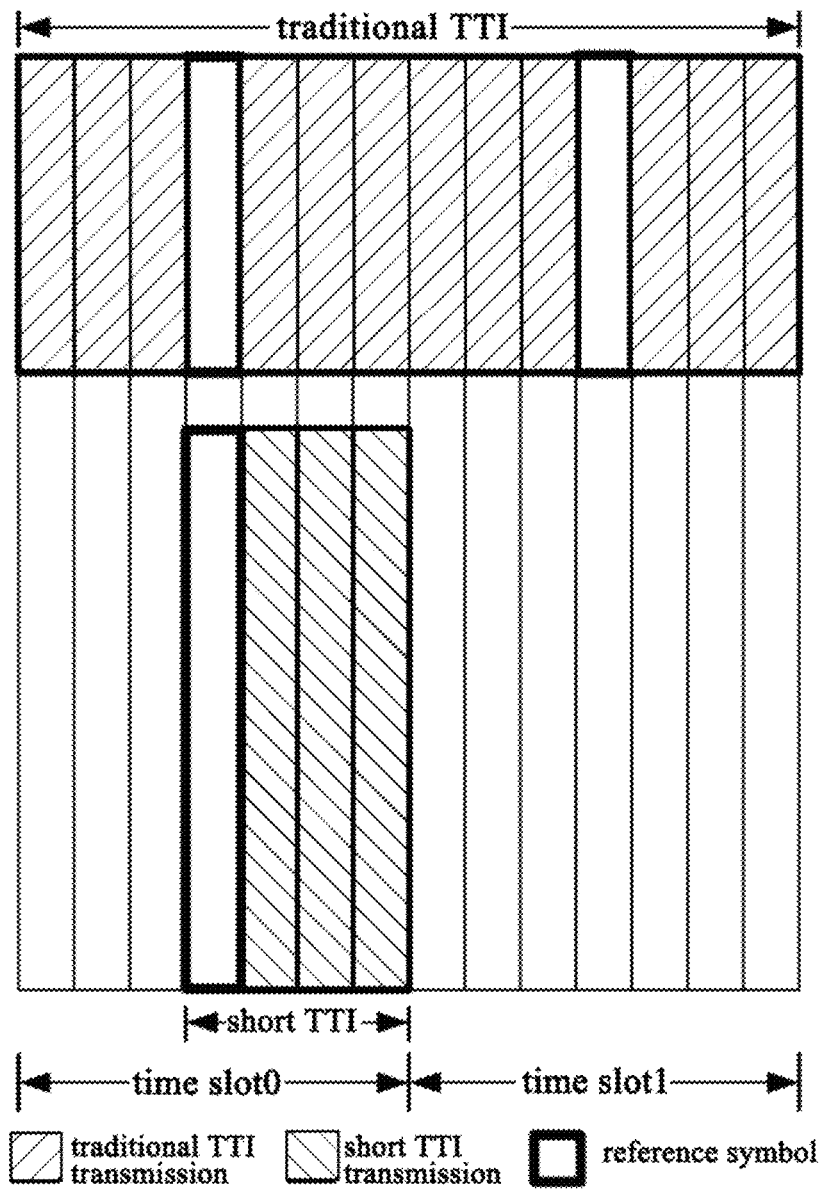
FIG. 4 is a schematic view showing a traditional TTI uplink transmission and a short TTI uplink transmission being simultaneously implemented according to some embodiments of the present disclosure.

Example 3 (corresponding to mode 3): the terminal reports with one bit to support the short TTI and the traditional TTI being simultaneously processed (applied for uplink transmission and downlink transmission). The base station scheduled the terminal to receive downlink data of short TTI transmission and traditional TTI transmission simultaneously in a same downlink sub-frame. As shown in FIG. 3, the terminal simultaneously detects a downlink scheduling permission for scheduling the traditional TTI transmission and the short TTI transmission in the downlink sub-frame, and receives the traditional TTI transmission and the short TTI transmission in the corresponding resources simultaneously based on the downlink scheduling permission. The base station may schedule the terminal to transmit uplink data of the traditional TTI transmission and the short TTI transmission simultaneously in a same uplink sub-frame. As shown in FIG. 4, the terminal detects the uplink scheduling permission for scheduling the traditional TTI transmission and the short TTI transmission simultaneously in the uplink sub-frame, and transmits the traditional TTI downlink transmission and the short TTI uplink transmission simultaneously in corresponding resources based on the uplink scheduling permission. Of course, the base station may only schedule the short TTI transmission or the traditional TTI transmission in one sub-frame.

Figure 5:
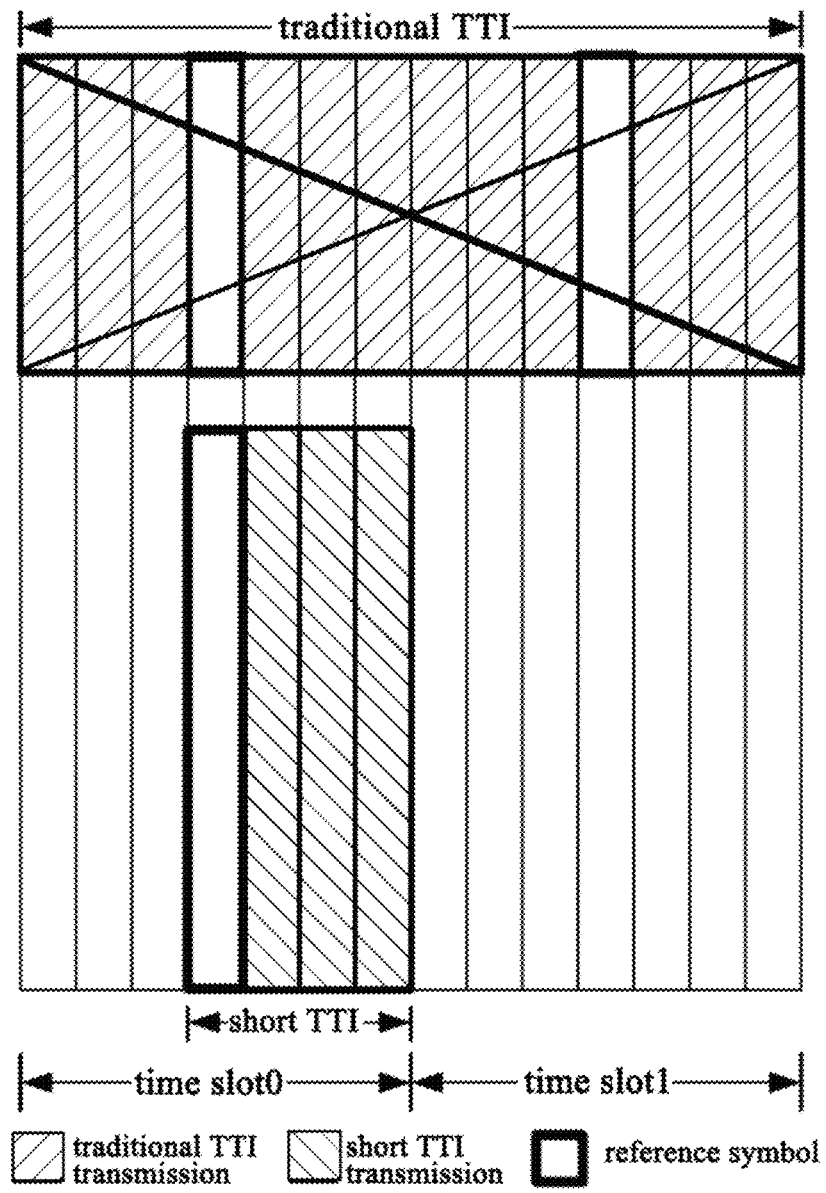
FIG. 5 a schematic view showing a terminal determining to transmit short TTI for data transmission according to some embodiments of the present disclosure.
Figure 6:
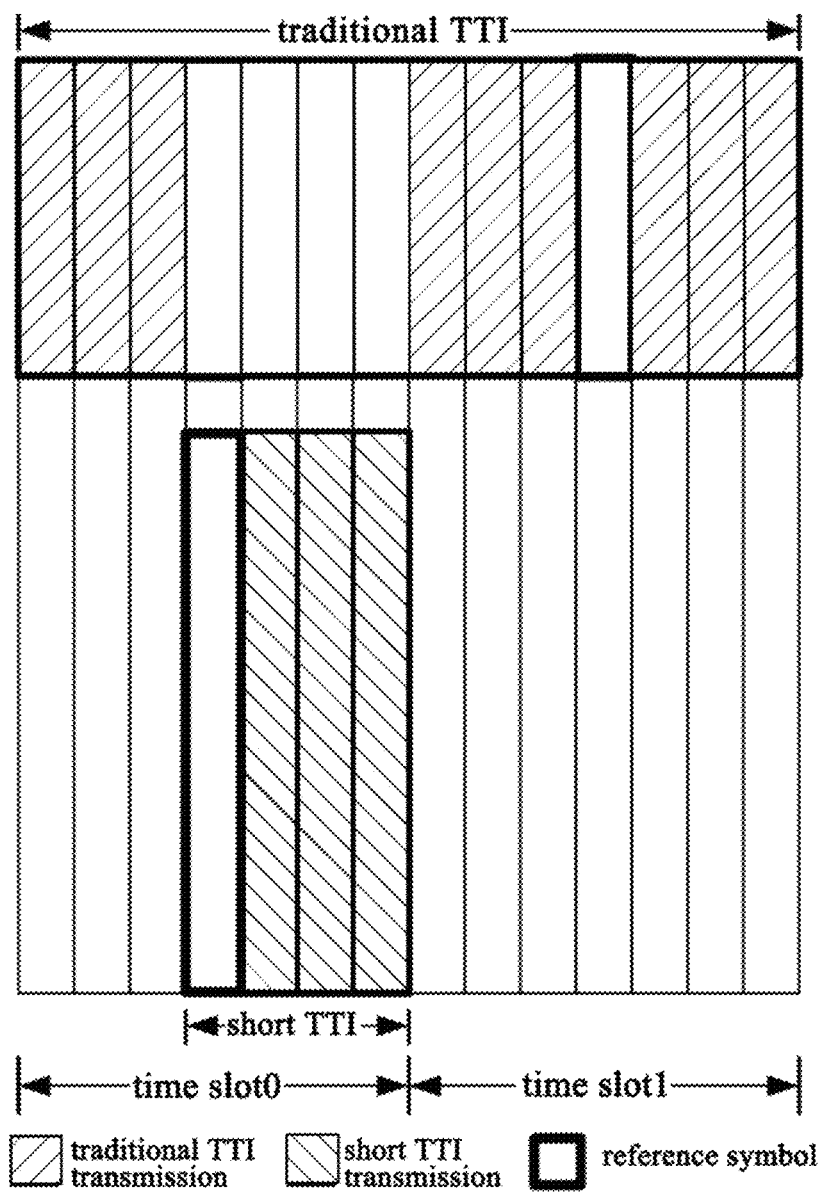
FIG. 6 a schematic view showing a terminal scheduling a part of the traditional TTI corresponding to the short TTI according to some embodiments of the present disclosure.

Example 4 (corresponding to mode 3): the terminal reports with one bit that it is not supported for uplink transmission that the short TTI and the traditional TTI are simultaneously processed, and the terminal reports with another bit that it is supported for downlink transmission that the short TTI and the traditional TTI are simultaneously processed. The base station schedules the terminal to receive downlink data of short TTI transmission and traditional TTI transmission simultaneously in a same downlink sub-frame. As shown in FIG. 3, the base station may only schedule short TTI transmission or the traditional TTI transmission in one sub-frame. The base station may schedule the terminal to only transmit uplink data of short TTI transmission or traditional TTI transmission in an uplink sub-frame. If the base station schedules the terminal to transmit the uplink data of the short TTI transmission and the traditional TTI transmission simultaneously in a same uplink sub-frame, the terminal selects one of them and transmits the same, for example, the terminal only transmits the uplink data of the short TTI transmission. As shown in FIG. 5, the terminal transmits the uplink data of the short TTI transmission in the resource of the short TTI, and transmits the uplink data of the traditional TTI transmission in the frequency resource scheduled for TTI transmission on symbols other than the symbol of short TTI in the sub-frame, as shown in FIG. 6.

As shown in FIG. 5, if the terminal reports with one bit that it is supported for uplink transmission that the short TTI and the traditional TTI are simultaneously processed, the processing is similar to that of the downlink transmission. The terminal reports with another bit that it is not supported for downlink transmission that the short TTI and the traditional TTI are simultaneously processed. The base station schedules the terminal to receive downlink data of short TTI transmission and traditional TTI transmission simultaneously in a same downlink sub-frame, the processing is similar to that of the uplink transmission, and will not be repeated herein.

Furthermore, the above examples are described based on only one short TTI transmission in one sub-frame. There may be more than one short TTI transmission in one sub-frame. A plurality of short TTI transmission may be implemented by FDM and/or TDM in a same carrier. The plurality of short TTI transmission may be implemented in different carriers during carrier aggregation, the length of the plurality of short TTI transmission may be the same or different. When calculating the short TTI to be transmitted simultaneously with the traditional TTI, only short TTI in the sub-frame overlapping the current short TTI in the time domain is considered, that is because the scheduling information of the short TTI transmission on symbols subsequent to a current symbol is not acquired on the current symbol of the short TTI transmission. In the above example, the mapping of the reference symbol (pilot frequency) of the uplink transmission and the downlink transmission is only used for illustration, which is not to limit the solution of the present disclosure. The present disclosure may use other mapping ways of pilot frequency.

In the data transmission method provided in some embodiments of the present disclosure, it is determined whether the short TTI and the traditional TTI are simultaneously processed in the same carrier based on the capacity of the terminal. That is, it is determined whether the short TTI and the traditional TTI are simultaneously encoded or decoded in the same carrier, so as to ensure proper transmission under the capacity of the terminal supporting the short TTI transmission.

Figure 7:
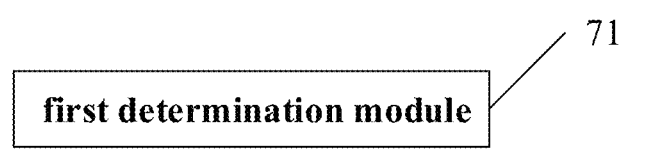
FIG. 7 is a structure schematic view showing a terminal according to some embodiments of the present disclosure.

As shown in FIG. 7, the present disclosure provides in some embodiments a terminal including a first determination module 71. The first determination module 71 is configured to determine data transmitted in the first TTI length and/or data transmitted in the second TTI length that are processed in a same sub-frame based on capability reported by the terminal or a predefined rule, the data including a shared channel and/or a control channel; wherein the first TTI length is less than the second TTI length.

The first determination module 71 is specifically configured to determine whether the terminal may simultaneously process the data transmitted in the first TTI length and the data transmitted in the second TTI length in a same sub-frame and in a same carrier; and/or whether the terminal may simultaneously process the data transmitted in the first TTI length and the data transmitted in the second TTI length in a same sub-frame and in different carriers, if no, selecting a part of data transmitted in TTI to be processed.

In a possible embodiment of the present disclosure, the first determination module 71 further includes a first determination sub-module, configured to determine whether data transmitted in the first TTI length and/or data transmitted in the second TTI length that are processed in a same sub-frame based on the carrier aggregation capability and/or the multiple-input multiple-output MIMO capability reported by the terminal; and/or a second determination sub-module, configured to determine data transmitted in the first TTI length and/or data transmitted in the second TTI length that are processed in a same sub-frame based on the capability of an upper limit value of quantity of transport blocks (TB) that are simultaneously processed in the same sub-frame or the capability of an upper limit value of quantity of TTIs that are simultaneously processed in the same sub-frame, reported by the terminal; and/or a third determination sub-module, configured to determine data transmitted in the first TTI length and/or data transmitted in the second TTI length that are processed in a same sub-frame based on a capability of whether data transmitted in the first TTI length and data transmitted in the second TTI length are simultaneously processed in a same sub-frame, reported by the terminal.

The third determination sub-module further includes: a first processing unit, configured to, when the capability reported by the terminal indicates that the terminal supports data transmitted in the first TTI length and data transmitted in the second TTI length being simultaneously processed in a same sub-frame, if the data transmitted in the first TTI length and the data transmitted in the second TTI length are simultaneously scheduled in a current sub-frame, determine that the data transmitted in the first TTI length and the data transmitted in the second TTI length being simultaneously processed by the terminal in the current sub-frame; a second processing unit, configured to, when the capability reported by the terminal indicates that the terminal does not support data transmitted in the first TTI length and data transmitted in the second TTI length being simultaneously processed in a same sub-frame, if the data transmitted in the first TTI length and the data transmitted in the second TTI length are simultaneously scheduled in a current sub-frame, process the data transmitted in the first TTI length or the data transmitted in the second TTI length base on a configuration signaling or a predefined rule.

Specifically, the capability of whether data transmitted in the first TTI length and data transmitted in the second TTI length are simultaneously processed in a same sub-frame, reported by the terminal includes: for uplink transmission and downlink transmission, the capability is reported together or separately; and/or for a terminal supporting carrier aggregation, the capability is reported together for all aggregated carriers or reported separately for each aggregated carrier.

If the capability is reported together for uplink transmission and downlink transmission, the third determination sub-module is adopted. If the capability is reported separately for uplink transmission and downlink transmission, the third determination sub-module is adopted for uplink transmission or downlink transmission respectively according the capability reported for the uplink transmission or downlink transmission.

If the capability is reported together for all aggregated carriers, the third determination sub-module is adopted for each carrier. If the capability is reported separately for each aggregated carrier, the third determination sub-module is adopted for each carrier based on the capability reported for each carrier.

Furthermore, the third determination sub-module may be combined with the first determination sub-module or the second determination sub-module. For example, when the capability reported by the terminal indicates that the terminal supports data transmitted in the first TTI length and data transmitted in the second TTI length being simultaneously processed in a same sub-frame, if the data transmitted in the first TTI length and the data transmitted in the second TTI length are simultaneously scheduled in a current sub-frame, the data transmitted in the first TTI length and the data transmitted in the second TTI length that are processed by the terminal in the same sub-frame are further determined by using based on the first determination sub-module or the second determination sub-module, that is, the first determination sub-module or the second determination sub-module may be adopted to determine the data to be processed based on an upper limit value of the quantity of transport blocks or an upper limit value of the quantity of TTIs.

The second determination sub-module further includes: a third processing unit, configured to, if the total number of the TBs of the data transmitted in the first TTI length that have an aligned start position in a time domain or overlap in the time domain and the data transmitted in the second TTI length in the current sub-frame is less than or equal to the upper limit value of the quantity of transport blocks, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, simultaneously process the data transmitted in the first TTI length and the data transmitted in a second TTI in the current sub-frame; and the second processing unit, configured to, otherwise, process a part of the data transmitted in the first TTI length and the data transmitted in the second TTI length based on a configuration signaling or a predefined rule.

"The data transmitted in the first TTI length have an aligned start position in a time domain or overlap in the time domain" refers to "the data transmitted in the first TTI length is located in the time period in which the data transmitted in the first TTI length is located". That is, in a same sub-frame, different first TTI transmission in a same carrier and/or multiple carriers overlap in time domain, for example, different first TTI transmission in a same carrier and/or multiple carriers have a same or aligned start symbol. For example, when N carriers are aggregated in the terminal, one first TTI transmission exists in a same symbol position of each carrier (for example, one data transmission exists in the third to the sixth OFDM symbols), one second TTI (transitional TTI) transmission also exists in each carrier. At this time, N first TTI transmission exits in N carriers totally in the current first TTI (the third to the sixth OFDM). Certainly, the quantity of the symbols of the first TTI transmission in different carriers may be different, for example, the third to the sixth symbols are occupied by the first TTI transmission in A carriers from the N carriers, the third to the eighth symbols are occupied by the first TTI transmission in N-A carriers from the N carriers. Then in the current sub-frame, the total number of the first TTIs having start symbols at a same position equals to N-A+A=N.

At this time, since one second TTI transmission exists in each carrier, the total number of the first TTI transmission and the second TTI transmission in the time period where the first TTI transmission currently being scheduled in the current sub-frame is located is 2N.

If in the current sub-frame, another first TTI transmission exists in the ninth to the twelfth symbols of each carrier, the other first TTI transmission is not counted in the first TTI transmission which occupies the third symbol. When the first TTI transmitted in the third to the sixth symbols is processed, the first TTI transmitted in the ninth to the twelfth symbols are processed in a same way as the first TTI transmitted in the third to the sixth symbols. The similar description hereinafter refers to the above explanation.

1 Specifically, the capability of an upper limit value of quantity of transport blocks (TB) that are simultaneously processed in the same sub-frame or the capability of an upper limit value of quantity of TTIs that are simultaneously processed in the same sub-frame, reported by the terminal includes: for uplink transmission and downlink transmission, the capability being reported together or separately.

If the capability is reported together for the uplink transmission and the downlink transmission, the second determination sub-module is adapted. If the capability is reported separately for the uplink transmission and the downlink transmission, the second determination sub-module is adapted for the uplink transmission or the downlink transmission based on the capability reported by the uplink transmission or the downlink transmission.

The first determination sub-module has multiple kinds of processing procedure. For the first kind of processing procedure, the first determination sub-module includes a first determination unit, configured to, when the terminal does not support carrier aggregation, determine not to support the data transmitted in the first TTI length and the data transmitted in the second TTI length being simultaneously processed in a same sub-frame; a second determination unit, configured to, if the data transmitted in the first TTI length and the data transmitted in the second TTI length are simultaneously scheduled in the current sub-frame, process the data transmitted in the first TTI length or the data transmitted in the second TTI length based on a configuration signaling or a predefined rule.

For the second kind of processing procedure, the first determination sub-module further includes a fourth determination unit, configured to, for uplink transmission, when the terminal does not support carrier aggregation and the data transmitted in the first TTI length and the data transmitted in the second TTI length are simultaneously scheduled in the current sub-frame: if the encoding of the data transmitted in the second TTI length has finished before the data transmitted in the first TTI length has been processed, simultaneously process the data transmitted in the first TTI length and the data transmitted in the second TTI length in the current sub-frame (the processing includes transmitting the data transmitted in the second TTI length, and encoding the data transmitted in the second TTI length, and so on). The second processing unit is configured to, if the encoding of the data transmitted in the second TTI length has not finished before the data transmitted in the first TTI length has been processed, determine not to support the data transmitted in the first TTI length and the data transmitted in the second TTI length being simultaneously processed in the current sub-frame and process the data transmitted in the first TTI length or the data transmitted in the second TTI length based on a configuration signaling or a predefined rule.

For the third kind of processing procedure, the first determination sub-module further includes a first obtainment unit, configured to, if the terminal does not support carrier aggregation but supports MIMO, obtain the total number of TBs based on the MIMO capability reported by the terminal; a fifth processing unit, configured to, if the total number of the TBs of the data transmitted in the first TTI length that have an aligned start position in a time domain or overlap in the time domain and the data transmitted in the second TTI length in the current sub-frame is less than or equal to total number of TBs supported by the terminal, simultaneously process the data transmitted in the first TTI length and the data transmitted in the second TTI length in the current sub-frame; the second processing unit configured to, otherwise, Mode A: determine not to support the data transmitted in the first TTI length and the data transmitted in the second TTI length being simultaneously processed in the current sub-frame, and process the data transmitted in the first TTI length or the data transmitted in the second TTI length based on a configuration signaling or a predefined rule; and/or Mode B: for uplink transmission, if the encoding of the data transmitted in the second TTI length has finished before the data transmitted in the first TTI length has been processed, simultaneously process the data transmitted in the first TTI length and the data transmitted in the second TTI length in the current sub-frame; if the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and process the data transmitted in the first TTI length or the data transmitted in the second TTI length based on a configuration signaling or a predefined rule.

For the fourth kind of processing procedure, the first determination sub-module further includes the second processing unit, configured to, if the terminal supports carrier aggregation, determine an upper limit value of the quantity of transport blocks or an upper limit value of the quantity of TTIs that are simultaneously processed in a same sub-frame based on the an upper limit value of the aggregated carriers supported by the terminal; or if the terminal supports carrier aggregation, determine an upper limit value of the quantity of transport blocks that is simultaneously processed by the terminal in a same sub-frame based on the an upper limit value of the aggregated carriers supported by the terminal and the MIMO capability of each aggregated carrier; or an upper limit value of the quantity of transport blocks that is simultaneously processed by the terminal in a same sub-frame based on the carrier aggregation capability and the MIMO capability of the terminal; a sixth processing unit, configured to, if the total number of the TBs of the data transmitted in the first TTI length that have an aligned start position in a time domain or overlap in the time domain and the data transmitted in the second TTI length in the current sub-frame is less than or equal to the upper limit value of the quantity of transport blocks, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, simultaneously process the data transmitted in the first TTI length and the data transmitted in the second TTI length in the current sub-frame; a second processing unit, configured to otherwise, Mode A: process a part of the data transmitted in the first TTI length and the data transmitted in the second TTI length based on a configuration signaling or a predefined rule; and/or Mode B: for uplink transmission, if the encoding of the data transmitted in the second TTI length has finished before the data transmitted in the first TTI length has been processed, simultaneously process the data transmitted in the first TTI length and the data transmitted in the second TTI length in the current sub-frame; if the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and process the data transmitted in the first TTI length or the data transmitted in the second TTI length based on a configuration signaling or a predefined rule, or if the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and process a part of the data transmitted in the first TTI length and the data transmitted in the second TTI length based on a configuration signaling or a predefined rule.

The first determination module further includes a seventh processing unit, configured to, for uplink transmission, when the data transmitted in the first TTI length and the data transmitted in the second TTI length are simultaneously scheduled in a current sub-frame: if the encoding of the data transmitted in the second TTI length has finished before the data transmitted in the first TTI length has been processed, simultaneously process the data transmitted in the first TTI length and the data transmitted in the second TTI length in the current sub-frame; the second processing unit, configured to, if the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and process the data transmitted in the first TTI length or the data transmitted in the second TTI length based on a configuration signaling or a predefined rule; or an eighth processing unit, configured to, for uplink transmission and for each carrier, when the data transmitted in the first TTI length and the data transmitted in the second TTI length are simultaneously scheduled in a current sub-frame: if the encoding of the data transmitted in the second TTI length has finished before the data transmitted in the first TTI length has been processed, simultaneously process the data transmitted in the first TTI length and the data transmitted in the second TTI length in the current sub-frame; the second processing unit, configured to, if the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and process the data transmitted in the first TTI length or the data transmitted in the second TTI length based on a configuration signaling or a predefined rule; a ninth processing unit, configured to, for uplink transmission, determine not to support the data transmitted in the first TTI length and the data transmitted in the second TTI length being simultaneously processed in a same sub-frame and in a same carrier; the second processing unit configured to, when the data transmitted in the first TTI length and the data transmitted in the second TTI length are simultaneously scheduled in a current sub-frame and in a same carrier, process the data transmitted in the first TTI length or the data transmitted in the second TTI length based on a configuration signaling or a predefined rule.

In a possible embodiment of the present disclosure, the second processing unit is further configured to, the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule indicating that for downlink transmission, before a sub-frame where the data transmitted in the second TTI length belongs to, if the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or the predefined rule indicating that for downlink transmission, in a sub-frame where the data transmitted in the second TTI length belongs to, if the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length; or the predefined rule indicating that for uplink transmission, before a sub-frame where the data transmitted in the second TTI length belongs to, if the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or the predefined rule indicating that for uplink transmission, in a sub-frame where the data transmitted in the second TTI length belongs to, if the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length.

In a possible embodiment of the present disclosure, the second processing unit is further configured to, the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the configuration signaling exceeds the upper limit value of the quantity of TBs or the total number of the TTIs included in the determined data in the current sub-frame based on the configuration signaling exceeds the upper limit value of the quantity of TTIs, further use the carrier index (if the data transmitted in the first TTI length is used, the total number of the TBs included in the determined data in the current sub-frame based on the configuration signaling is the total number of the TBs included in the data transmitted in the first TTI length in the time period where the data transmitted in the first TTI length scheduled in the current sub-frame is located); or the configuration singling indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, further use the carrier; or the configuration signaling indicating the ratio of the upper limit value of the quantity of TBs and the upper limit value of the quantity of TTIs distributed in the data transmitted in the first TTI length and the data transmitted in the second TTI length (the upper limit value of the quantity of the TBs is N, the configuration signaling indicating the ratio distributed for the data transmitted in the first TTI length, for example a, the terminal may determine floor (N×a) TBs in the data transmitted in the first TTI length and floor N−(N×a) TBs in the data transmitted in the second TTI length being simultaneously processed in the current sub-frame, floor means round down); if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, further use the carrier index; or the predefined rule indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the predefined rule exceeds the upper limit value of the quantity of TBs, or the total number of the TTIs included in the determined data in the current sub-frame based on the predefined rule exceeds the upper limit value of the quantity of TTIs, further use the carrier index; or the predefined rule indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, further use the carrier index; or the predefined rule indicating a ratio to allocate the upper limit value of the quantity of TBs and the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, further use the carrier.

In a possible embodiment of the present disclosure, the terminal further includes a first processing module, configured to receive or transmit the data transmitted in the first TTI length and the data transmitted in the second TTI length in a same carrier, in a same sub-frame and in different frequency resources; or the first processing module is configured to, when the frequency resource used by the data transmitted in the first TTI length and the frequency resource used by the data transmitted in the second TTI length in a same carrier and in a same sub-frame overlap, for downlink transmission, determine that a base station overwrites the data transmitted in the second TTI length by the data transmitted in the first TTI length at the overlapped frequency resource, at this time, when the terminal receives the data transmitted in the second TTI length, the terminal always assumes that a part of the data transmitted in the second TTI length having overlapped frequency resource with the symbols of the data transmitted in the first TTI length are zero, that is at the overlapped frequency resource, the base station only transmits the data transmitted in the first TTI length, not the data transmitted in the second TTI length; and for uplink transmission, replace the data transmitted in the second TTI length by the data transmitted in the first TTI length at the overlapped frequency resource; or the first processing unit, configured to, for uplink transmission, punch data of the data transmitted in the second TTI length on symbols overlapping with the data transmitted in the first TTI length when data transmitted in the first TTI length and the data transmitted in the second TTI length in the same carrier and in the same sub-frame. For the punching process, if the DMRS (Demodulation Reference Signal) symbol in the data transmitted in the second TTI length is also included in SC-FDMA (Single-carrier Frequency-Division Multiple Access) symbol corresponding to the data transmitted in the first TTI length, then the DMRS needs to be punched, which will affect the channel estimation for the uplink data by the base station side; or the DMRS may not be punched, only the data transmission part is punched, the DMS transmission for the data transmitted in the first TTI length and the data transmitted in the second TTI length are achieved by generating DMRS having a same length for the two kinds of data on common DMRS symbol of data transmitted in a first and second TTI length. For example, the frequency resource for the data transmitted in the first TTI length is RB1-5, and the frequency resource for the data transmitted in the second TTI length is RB6-10, and the DMRS having a same length are transmitted in RB1-10 on the fourth SC-FDMA in one sub-frame. Different cyclic shifts are used to guarantee the orthogonality of the respective DMRSs on the same time-frequency domain resources.

In a possible embodiment of the present disclosure, the first TTI length is less than 1 ms, the second TTI length is equal to 1 ms; and/or a plurality of TTIs that has an aligned start position in a time domain or overlap in the time domain has a same TTI length or different TTI lengths.

The symbol may be a Single-carrier Frequency-Division Multiple Access (SC-FDMA) symbol.

From the above terminal, it is determined whether the data transmitted in different TTI lengths may be processed simultaneously based on the capability of the terminal or a predefined rule so as to ensure a proper transmission within the capacity of the terminal supporting data transmission in different TTI lengths, and solve a problem in the related art that one terminal cannot properly process data transmitted in different TTI lengths.

It should be noted that, the terminal according some embodiments of the present disclosure is a terminal corresponding to the data transmission method in the terminal side provided by the foregoing embodiment, and all embodiments of the data transmission method are applicable to the terminal, and both can achieve the same or similar benefits.

Figure 8:
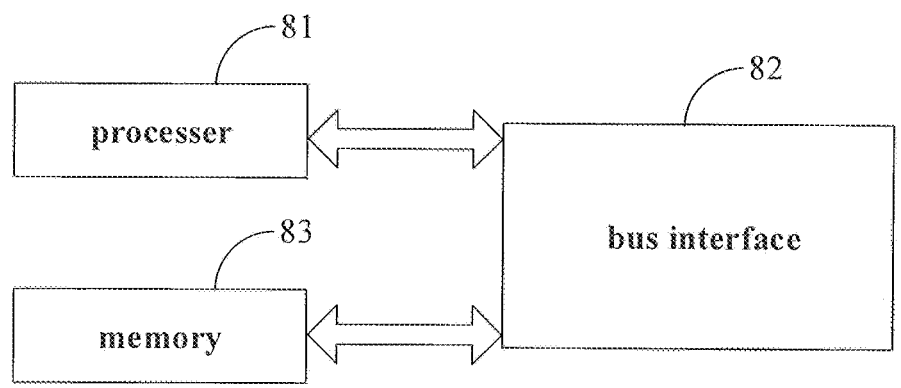
FIG. 8 is another structure schematic view showing a terminal according to some embodiments of the present disclosure.

In order to better achieve the above object, as shown in FIG. 8, an embodiment of the present disclosure further provides a terminal, including: a processor 81; and a memory 83 connected to the processor 81 through a bus interface 82, the memory 83 is used to store programs and data executed by the processor 81. When the processor 81 calls and executes the program and data stored in the memory 83, the following functional modules are implemented: a first determination module, configured to determine data transmitted in the first TTI length and/or data transmitted in the second TTI length that are processed in a same sub-frame based on capability reported by the terminal or a predefined rule, the data including a shared channel and/or a control channel; wherein the first TTI length is less than the second TTI length.

It should be noted that, the terminal according some embodiments of the present disclosure is a terminal corresponding to the data transmission method in the terminal side provided by the foregoing embodiment, and all embodiments of the data transmission method are applicable to the terminal, and both can achieve the same or similar benefits.

Figure 9:
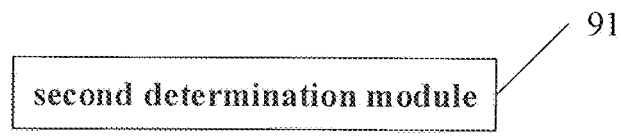
FIG. 9 is a structure schematic view showing a base station according to some embodiments of the present disclosure.

In order to achieve the above object, as shown in FIG. 9, the present disclosure provides in some embodiments a base station including a second determination module 91, configured to determine data transmitted in the first TTI length and/or data transmitted in the second TTI length that are processed by a terminal in a same sub-frame based on capability reported by the terminal or a predefined rule, the data including a shared channel and/or a control channel; wherein the first TTI length is less than the second TTI length.

The second determination module 91 is specifically configured to determine whether the terminal may simultaneously process the data transmitted in the first TTI length and the data transmitted in the second TTI length in a same sub-frame and in a same carrier; and/or whether the terminal may simultaneously process the data transmitted in the first TTI length and the data transmitted in the second TTI length in a same sub-frame and in different carriers, if no, select a part of data transmitted in TTI to be processed.

The second determination module 91 further includes a fourth determination sub-module, configured to determine data transmitted in the first TTI length and/or data transmitted in the second TTI length that are processed by the terminal in a same sub-frame based on the carrier aggregation capability and/or the multiple-input multiple-output MIMO capability reported by the terminal; and/or a fifth determination sub-module, configured to determine data transmitted in the first TTI length and/or data transmitted in the second TTI length that are processed by the terminal in a same sub-frame based on the capability of an upper limit value of quantity of transport blocks (TB) that are simultaneously processed in the same sub-frame or the capability of an upper limit value of quantity of TTIs that are simultaneously processed in the same sub-frame, reported by the terminal; and/or a sixth determination sub-module, configured to determine data transmitted in the first TTI length and/or data transmitted in the second TTI length that are processed by the terminal in a same sub-frame based on a capability of whether data transmitted in the first TTI length and data transmitted in the second TTI length are simultaneously processed in a same sub-frame, reported by the terminal.

The sixth determination sub-module includes a third determination unit, configured to, when the capability reported by the terminal indicates that the terminal supports data transmitted in the first TTI length and data transmitted in the second TTI length being simultaneously processed in a same sub-frame, if the data transmitted in the first TTI length and the data transmitted in the second TTI length are simultaneously scheduled in a current sub-frame, determine that the data transmitted in the first TTI length and the data transmitted in the second TTI length are simultaneously processed by the terminal in the current sub-frame; a fourth determination unit, configured to, when the capability reported by the terminal indicates that the terminal does not support data transmitted in the first TTI length and data transmitted in the second TTI length being simultaneously processed in a same sub-frame, if the data transmitted in the first TTI length and the data transmitted in the second TTI length are simultaneously scheduled in a current sub-frame, determine that the terminal processes the data transmitted in the first TTI length or the data transmitted in the second TTI length base on a configuration signaling or a predefined rule.

Specifically, the capability of whether data transmitted in the first TTI length and data transmitted in the second TTI length are simultaneously processed in a same sub-frame, reported by the terminal includes: for uplink transmission and downlink transmission, the capability is reported together or separately; and/or for a terminal supporting carrier aggregation, the capability is reported together for all aggregated carriers or reported separately for each aggregated carrier.

If the capability is reported together for uplink transmission and downlink transmission, the sixth determination sub-module is adopted. If the capability is reported separately for uplink transmission and downlink transmission, the sixth determination sub-module is adopted for uplink transmission or downlink transmission respectively according the capability reported for the uplink transmission or downlink transmission. If the capability is reported together for all aggregated carriers, Mode 3 is adopted for each carrier. If the capability is reported separately for each aggregated carrier, the sixth determination sub-module is adopted for each carrier based on the capability reported for each carrier.

Furthermore, the sixth determination sub-module may be combined with the fourth determination sub-module or the fifth determination sub-module. For example, when the capability reported by the terminal indicates that the terminal supports data transmitted in the first TTI length and data transmitted in the second TTI length being simultaneously processed in a same sub-frame, if the data transmitted in the first TTI length and the data transmitted in the second TTI length are simultaneously scheduled in a current sub-frame, the data transmitted in the first TTI length and the data transmitted in the second TTI length that are processed by the terminal in the same sub-frame are further determined by using based on the fourth determination sub-module or the fifth determination sub-module, that is, the fourth determination sub-module or the fifth determination sub-module may be adopted to determine the data to be processed based on an upper limit value of the quantity of transport blocks or an upper limit value of the quantity of TTIs.

The fifth determination sub-module includes a fifth determination unit, configured to, if the total number of the TBs of the data transmitted in the first TTI length that have an aligned start position in a time domain or overlap in the time domain and the data transmitted in the second TTI length in the current sub-frame is less than or equal to the upper limit value of the quantity of transport blocks, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, determine that the data transmitted in the first TTI length and the data transmitted in the second TTI length are simultaneously processed by the terminal in the current sub-frame: the fourth determination unit, configured to otherwise, determine that the terminal processes a part of the data transmitted in the first TTI length and the data transmitted in the second TTI length based on a configuration signaling or a predefined rule.

"The data transmitted in the first TTI length have an aligned start position in a time domain or overlap in the time domain" refers to "the data transmitted in the first TTI length is located in the time period in which data transmitted in the first TTI length is located". That is, in a same sub-frame, different first TTI (short TTI) transmission in a same carrier and/or multiple carriers overlap in time domain, for example, different first TTI transmission in a same carrier and/or multiple carriers have a same or aligned start symbol. For example, when N carriers (N being a positive integer) are aggregated in the terminal, one first TTI transmission exists in a same symbol position of each carrier (for example, one data transmission exists in the third to the sixth OFDM symbols), one second TTI (transitional TTI) transmission also exists in each carrier. At this time, N first TTI transmission exits in N carriers totally in the current first TTI (the third to the sixth OFDM). Certainly, the quantity of the symbols of the first TTI transmission in different carriers may be different, for example, the third to the sixth symbols are occupied by the first TTI transmission in A carriers from the N carriers, the third to the eighth symbols are occupied by the first TTI transmission in N-A carriers from the N carriers. Then in the current sub-frame, the total number of the first TTIs having start symbols at a same position equals to N−A+A=N, where A is a positive integer. At this time, since one second TTI transmission exists in each carrier, the total number of the first TTI transmission and the second TTI transmission in the time period where the first TTI transmission currently being scheduled in the current sub-frame is located is 2N. If in the current sub-frame, another first TTI transmission exists in the ninth to the twelfth symbols of each carrier, the other first TTI transmission is not counted in the first TTI transmission which occupies the third symbol. When the first TTI transmitted in the third to the sixth symbols is processed, the first TTI transmitted in the ninth to the twelfth symbols are processed in a same way as the first TTI transmitted in the third to the sixth symbols.

Specifically, the capability of an upper limit value of quantity of transport blocks (TB) that are simultaneously processed in the same sub-frame or the capability of an upper limit value of quantity of TTIs that are simultaneously processed in the same sub-frame, reported by the terminal includes: for uplink transmission and downlink transmission, the capability being reported together or separately.

If the capability is reported together for the uplink transmission and the downlink transmission, the fifth determination sub-module is adapted. If the capability is reported separately for the uplink transmission and the downlink transmission, the fifth determination sub-module is adapted for the uplink transmission or the downlink transmission based on the capability reported by the uplink transmission or the downlink transmission.

In some embodiments, the fourth determination sub-module implements multiple kinds of processing procedures.

For the first kind of processing procedure, the fourth determination sub-module includes a sixth determination unit, configured to, when the terminal does not support carrier aggregation, determine that the terminal does not support the data transmitted in the first TTI length and the data transmitted in the second TTI length being simultaneously processed in a same sub-frame; the fourth determination unit configured to, if the data transmitted in the first TTI length and the data transmitted in the second TTI length are simultaneously scheduled in the current sub-frame, determine that the terminal processes the data transmitted in the first TTI length or the data transmitted in the second TTI length based on a configuration signaling or a predefined rule.

For the second kind of processing procedure, the fourth determination sub-module includes a seventh determination unit, configured to, for uplink transmission, when the terminal does not support carrier aggregation and the data transmitted in the first TTI length and the data transmitted in the second TTI length are simultaneously scheduled in the current sub-frame: if the terminal has finished the encoding of the data transmitted in the second TTI length before the data transmitted in the first TTI length has been processed, determine that the data transmitted in the first TTI length and the data transmitted in the second TTI length are simultaneously processed by the terminal in the current sub-frame (the processing includes transmitting the data transmitted in the second TTI length, and encoding the data transmitted in the second TTI length, and so on); the fourth determination unit, configured to, if the terminal has not finished the encoding of the data transmitted in the second TTI length before the data transmitted in the first TTI length has been processed, determine that the terminal does not support the data transmitted in the first TTI length and the data transmitted in the second TTI length being simultaneously processed in the current sub-frame (i.e. an encoder can only encode data transmitted in one TTI length, and cannot encode data transmitted in two different TTI lengths at the same time), and determine that the terminal processes the data transmitted in the first TTI length or the data transmitted in the second TTI length based on a configuration signaling or a predefined rule.

At this time, since the base station cannot determine whether the terminal has finished the encoding of the data transmitted in the second TTI length before the data transmitted in the first TTI length has been processed, blind detection should be implemented for the two transmission ways, that is, the base station assumes that the data transmitted in the first TTI length and the data transmitted in the second TTI length are simultaneously transmitted (two kinds of data are received simultaneously). If both the two kinds of data are correctly received (a Cyclic Redundancy Check is passed), it is determined that the data transmitted in the first TTI length and the data transmitted in the second TTI length are simultaneously transmitted by the terminal, if the data transmitted in the second TTI length is not correctly received (a Cyclic Redundancy Check is not passed, or DTX-CRC fails), it is determined that only the data transmitted in a first TTI is transmitted by the terminal. The base station will implement blind detection under the following similar procedure.

For the third kind of processing procedure, the fourth determination sub-module includes a second obtainment unit, configured to, if the terminal does not support carrier aggregation but supports MIMO, obtain the total number of TBs based on the MIMO capability reported by the terminal; an eighth determination unit, configured to, if the total number of the TBs of the data transmitted in the first TTI length that have an aligned start position in a time domain or overlap in the time domain and the data transmitted in the second TTI length in the current sub-frame is less than or equal to total number of TBs supported by the terminal, determine that the data transmitted in the first TTI length and the data transmitted in the second TTI length are simultaneously processed by the terminal in the current sub-frame; the fourth determination unit, configured to, otherwise, Mode A: determine that the terminal does not support the data transmitted in the first TTI length and the data transmitted in the second TTI length being simultaneously processed in the current sub-frame, and the data transmitted in the first TTI length or the data transmitted in the second TTI length are processed based on a configuration signaling or a predefined rule; and/or Mode B: for uplink transmission, if the terminal has finished the encoding of the data transmitted in the second TTI length before the data transmitted in the first TTI length has been processed, determine that the data transmitted in the first TTI length and the data transmitted in the second TTI length are simultaneously processed by the terminal in the current sub-frame; if the terminal has not finished the encoding of the data transmitted in the second TTI length before the data transmitted in the first TTI length has been processed, determine the terminal does not support the data transmitted in the first TTI length and the data transmitted in the second TTI length being simultaneously processed in the current sub-frame, and the terminal processes the data transmitted in the first TTI length or the data transmitted in the second TTI length based on a configuration signaling or a predefined rule.

For the fourth kind of processing procedure, the fourth determination sub-module includes a ninth determination unit, configured to, if the terminal supports carrier aggregation, determine an upper limit value of the quantity of transport blocks or an upper limit value of the quantity of TTIs that are simultaneously processed by the terminal in a same sub-frame based on the an upper limit value of the aggregated carriers supported by the terminal; or if the terminal supports carrier aggregation, determine an upper limit value of the quantity of transport blocks that is simultaneously processed by the terminal in a same sub-frame based on the an upper limit value of the aggregated carriers supported by the terminal and the MIMO capability of each aggregated carrier; or determine an upper limit value of the quantity of transport blocks that is simultaneously processed by the terminal in a same sub-frame based on the carrier aggregation capability and the MIMO capability of the terminal; a tenth determination unit, configured to, if the total number of the TBs of the data transmitted in the first TTI length that have an aligned start position in a time domain or overlap in the time domain and the data transmitted in the second TTI length in the current sub-frame is less than or equal to the upper limit value of the quantity of transport blocks, or if the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, determine that the data transmitted in the first TTI length and the data transmitted in the second TTI length are simultaneously processed by the terminal in the current sub-frame; the fourth determination unit, configured to, otherwise, Mode A: determine that a part of the data transmitted in the first TTI length and the data transmitted in the second TTI length are processed by the terminal based on a configuration signaling or a predefined rule; and/or Mode B: for uplink transmission, if the terminal has finished the encoding of the data transmitted in the second TTI length before the data transmitted in the first TTI length has been processed, determine the data transmitted in the first TTI length and the data transmitted in the second TTI length are simultaneously processed by the terminal in the current sub-frame; if the terminal has not finished the encoding of the data transmitted in the second TTI length before the data transmitted in the first TTI length has been processed, determine that the terminal does not support the data transmitted in the first TTI length and the data transmitted in the second TTI length being simultaneously processed in the current sub-frame, and the terminal processes the data transmitted in the first TTI length or the data transmitted in the second TTI length based on a configuration signaling or a predefined rule, or if the terminal has not finished the encoding of the data transmitted in the second TTI length before the data transmitted in the first TTI length has been processed, determine that the terminal does not support the data transmitted in the first TTI length and the data transmitted in the second TTI length being simultaneously processed in the current sub-frame, and the terminal processes a part of the data transmitted in the first TTI length and the data transmitted in the second TTI length based on a configuration signaling or a predefined rule.

The second determination module includes an eleventh determination unit, configured to, for uplink transmission, when the data transmitted in the first TTI length and the data transmitted in the second TTI length are simultaneously scheduled in a current sub-frame: if the terminal has finished the encoding of the data transmitted in the second TTI length before the data transmitted in the first TTI length has been processed, determine that the data transmitted in the first TTI length and the data transmitted in the second TTI length are simultaneously processed by the terminal in the current sub-frame; if the terminal has not finished the encoding of the data transmitted in the second TTI length before the data transmitted in the first TTI length has been processed, determine that the terminal does not support the data transmitted in the first TTI length and the data transmitted in the second TTI length being simultaneously processed in the current sub-frame, and the terminal processes the data transmitted in the first TTI length or the data transmitted in the second TTI length based on a configuration signaling or a predefined rule; or a twelfth determination unit, configured to, for uplink transmission and for each carrier, when the data transmitted in the first TTI length and the data transmitted in the second TTI length are simultaneously scheduled in a current sub-frame: if the terminal has finished the encoding of the data transmitted in the second TTI length before the data transmitted in the first TTI length has been processed, determine that the data transmitted in the first TTI length and the data transmitted in the second TTI length are simultaneously processed by the terminal in the current sub-frame; the fourth determination unit, configured to, if the terminal has not finished the encoding of the data transmitted in the second TTI length before the data transmitted in the first TTI length has been processed, determine that the terminal does not support the data transmitted in the first TTI length and the data transmitted in the second TTI length being simultaneously processed in the current sub-frame, and the terminal processes the data transmitted in the first TTI length or the data transmitted in the second TTI length based on a configuration signaling or a predefined rule; or a thirteen determination unit, configured to, for uplink transmission, determine that the terminal does not support the data transmitted in the first TTI length and the data transmitted in the second TTI length being simultaneously processed in a same sub-frame in a same carrier; the fourth determination unit, configured to, when the data transmitted in the first TTI length and the data transmitted in the second TTI length are simultaneously scheduled in the current sub-frame, determine that the terminal processes the data transmitted in the first TTI length or the data transmitted in the second TTI length based on a configuration signaling or a predefined rule.

In a possible embodiment of the present disclosure, the fourth determination includes: the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule indicating that the terminal determines to process one of the data transmitted in the first TTI length and the data transmitted in the second TTI length, or the terminal determines to process data with one TB or two TBs from the data transmitted in the first TTI length and the data transmitted in the second TTI length, or the predefined rule indicating that for downlink transmission, before a sub-frame where the data transmitted in the second TTI length belongs to, if the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or the predefined rule indicating that for downlink transmission, in a sub-frame where the data transmitted in the second TTI length belongs to, if the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length, or the predefined rule indicating that for uplink transmission, before a sub-frame where the data transmitted in the second TTI length belongs to, if the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or the predefined rule indicating that for uplink transmission, in a sub-frame where the data transmitted in the second TTI length belongs to, if the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length.

In a possible embodiment of the present disclosure, the fourth determination unit includes: the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the configuration signaling exceeds the upper limit value of the quantity of TBs or the total number of the TTIs included in the determined data in the current sub-frame based on the configuration signaling exceeds the upper limit value of the quantity of TTIs, the carrier index is further used (if the data transmitted in the first TTI length is used, the total number of the TBs included in the determined data in the current sub-frame based on the configuration signaling is the total number of the TBs included in the data transmitted in the first TTI length in the time period where the data transmitted in the first TTI length scheduled in the current sub-frame is located); or the configuration singling indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used; or the configuration signaling indicating the ratio of the upper limit value of the quantity of TBs and the upper limit value of the quantity of TTIs distributed in the data transmitted in the first TTI length and the data transmitted in the second TTI length (the upper limit value of the quantity of the TBs is N, the configuration signaling indicating the ratio distributed for the data transmitted in the first TTI length, for example a, the terminal may determine floor (N×a) TBs in the data transmitted in the first TTI length and floor N−(N×a) TBs in the data transmitted in the second TTI length being simultaneously processed in the current sub-frame, floor means round down); if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used; or the predefined rule indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; if the total number of the TBs included in the determined data in the current sub-frame based on the predefined rule exceeds the upper limit value of the quantity of TBs, or the total number of the TTIs included in the determined data in the current sub-frame based on the predefined rule exceeds the upper limit value of the quantity of TTIs, the carrier index is further used. Or the predefined rule indicating that the terminal determines to using A1 data transmitted in the first TTI length and/or A2 data transmitted in the second TTI length, if the total number of the data transmitted in the first TTI length that has an aligned start position in a time domain or overlap in the time domain in the current sub-frame exceeds A1, and/or the total number of the data transmitted in the second TTI length exceeds A2, the carrier index is further used; or the predefined rule indicating a ratio to allocate the upper limit value of the quantity of TBs and the upper limit value of the quantity of TTIs between the data transmitted in the first TTI length and the data transmitted in the second TTI length; if the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or if the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used.

In a possible embodiment of the present disclosure, the base station further includes a second processing module, configured to schedule the terminal to receive or transmit the data transmitted in the first TTI length and the data transmitted in the second TTI length in a same carrier, in a same sub-frame and in different frequency resources, that is, the base station should avoid to schedule overlapped frequency resources to the data transmitted in the first TTI length and the data transmitted in the second TTI length in a same carrier and in a same sub-frame; or the second processing module, configured to, when the frequency resource used by the data transmitted in the first TTI length and the frequency resource used by the data transmitted in the second TTI length in a same carrier and in a same sub-frame overlap, for downlink transmission, replace the data transmitted in the second TTI length by the data transmitted in the first TTI length at the overlapped frequency resource, for uplink transmission, replace the data transmitted in the second TTI length by the data transmitted in the first TTI length at the overlapped frequency resource, at this time, when the terminal receives the data transmitted in the second TTI length, the terminal always assumes that a part of the data transmitted in the second TTI length having overlapped frequency resource with the symbols of the data transmitted in the first TTI length are zero, that is at the overlapped frequency resource, the base station only transmits the data transmitted in the first TTI length, not the data transmitted in the second TTI length; or the second processing module, configured to, for uplink transmission, in the same carrier and in the same sub-frame, determine that data on symbols corresponding to the data transmitted in the first TTI length from the data transmitted in the second TTI length are punched by the terminal, that is, when the base station receives the data transmitted in the second TTI length, it always assumes that that data on symbols corresponding to the data transmitted in the first TTI length are zero, that is, the data transmitted in the second TTI length is not transmitted actually.

In a possible embodiment of the present disclosure, the first TTI length is less than 1 ms, the second TTI length is equal to 1 ms; and/or a plurality of TTIs that has an aligned start position in a time domain or overlap in the time domain has a same TTI length or different TTI lengths.

The symbol may be a Single-carrier Frequency-Division Multiple Access (SC-FDMA) symbol.

From the above base station, it is determined whether the data transmitted in different TTI lengths may be processed simultaneously based on the capability of the terminal or a predefined rule so as to ensure a proper transmission within the capacity of the terminal supporting data transmission in different TTI lengths, and solve a problem in the related art that one terminal cannot properly process data transmitted in different TTI lengths.

It should be noted that, the base station according some embodiments of the present disclosure is a base station corresponding to the data transmission method in the base station side provided by the foregoing embodiment, and all embodiments of the data transmission method are applicable to the base station, and both can achieve the same or similar benefits.

Figure 10:
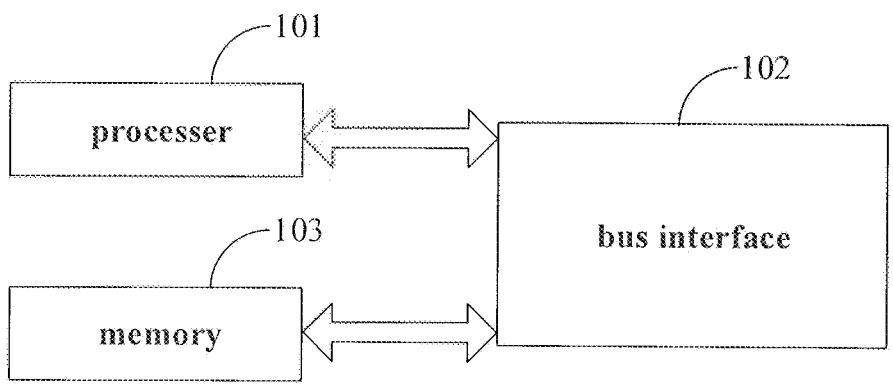
FIG. 10 is another structure schematic view showing a base station according to some embodiments of the present disclosure.

In order to better achieve the above object, as shown in FIG. 10, an embodiment of the present disclosure further provides a base station, including: a processor 101; and a memory 103 connected to the processor 101 through a bus interface 102, the memory 103 is used to store programs and data executed by the processor 101. When the processor 101 calls and executes the program and data stored in the memory 103, the following functional modules are implemented: a second determination module, configured to determine data transmitted in the first TTI length and/or data transmitted in the second TTI length that are processed by the terminal in a same sub-frame based on capability reported by the terminal or a predefined rule, the data including a shared channel and/or a control channel; wherein the first TTI length is less than the second TTI length.

It should be noted that, the base station according some embodiments of the present disclosure is a base station corresponding to the data transmission method in the base station side provided by the foregoing embodiment, and all embodiments of the data transmission method are applicable to the base station, and both can achieve the same or similar benefits.

It should be noted that, in the foregoing methods and embodiments, the data transmitted in the first TTI length and/or the data transmitted in the second TTI length may refer to only a unicast service, or may also include a broadcast service.

Many functional components described in this disclosure are referred to as modules/sub-modules to more particularly emphasize the independence of their implementation.

In embodiments of the present disclosure, modules/sub-modules may be implemented in software executed by various types of processors. For example, an identified executable code module may include one or more physical or logical blocks of computer instructions, which can be constructed, for example, as an object, procedure, or function. Nonetheless, the executable code of the identified modules need not be physically located together, but may include different instructions stored in different bits, and when these instructions are logically combined, they form a module and implement the purpose of the module.

In fact, the executable code module can be a single instruction or a plurality of instructions, and can even be distributed across multiple different code segments, distributed among different programs, and distributed across multiple memory devices. As such, operational data may be identified within the modules and may be implemented in any suitable form and organized within any suitable type of data structure. The operational data may be collected as a single data set, or may be distributed over different locations (or on different storage devices), and may at least partially exist in a system or network as an electronic signal.

When the module can be implemented by software, considering the level of the related hardware process, the module can be implemented in software, and the technician can construct a corresponding hardware circuit to implement the corresponding function without considering the cost. The hardware circuit includes conventional Very Large Scale Integration (VLSI) circuits or gate arrays and related semiconductors such as logic chips, transistors, or other discrete components. The module can also be implemented with programmable hardware devices such as field programmable gate arrays, programmable array logic, programmable logic devices, and the like.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A data transmission method, comprising:
   determining, by a terminal, whether to simultaneously process data transmitted in a first Transmission Time Interval (TTI) length and data transmitted in a second TTI length in a same sub-frame based on capability reported by the terminal or a predefined rule, the data including a shared channel and/or a control channel,
   wherein the first TTI length is less than the second TTI length,
   wherein the determining, by a terminal, data transmitted in the first TTI length and/or data transmitted in the second TTI length that are processed in a same sub-frame based on capability reported by the terminal or a predefined rule comprises at least one of:
   Mode 1: whether to simultaneously process data transmitted in the first TTI length and data transmitted in the second TTI length in the same sub-frame based on carrier aggregation capability and/or multiple-input multiple-output (MIMO) capability reported by the terminal;

Mode 2: whether to simultaneously process data transmitted in the first TTI length and data transmitted in the second TTI length in the same sub-frame based on capability of an upper limit value of quantity of transport blocks (TB) that are simultaneously processed in the same sub-frame or the capability of an upper limit value of quantity of TTIs that are simultaneously processed in the same sub-frame, reported by the terminal; and Mode 3: whether to simultaneously process data transmitted in the first TTI length and data transmitted in the second TTI length in the same sub-frame based on capability of whether the data transmitted in the first TTI length and the data transmitted in the second TTI length are simultaneously processed in the same sub-frame, reported by the terminal, or wherein the determining, by a terminal, data transmitted in the first TTI length and/or data transmitted in the second TTI length that are processed in a same sub-frame based on a predefined rule comprises:

for uplink transmission, when the data transmitted in the first TTI length and the data transmitted in the second TTI length are simultaneously scheduled in a current sub-frame: when the terminal has finished the encoding of the data transmitted in the second TTI length before the data transmitted in the first TTI length has been processed, simultaneously processing, by the terminal, the data transmitted in the first TTI length and the data transmitted in the second TTI length in the current sub-frame; when the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on configuration signaling or the predefined rule; or for uplink transmission and for each carrier, when the data transmitted in the first TTI length and the data transmitted in the second TTI length are simultaneously scheduled in the current sub-frame: when the terminal has finished the encoding of the data transmitted in the second TTI length before the data transmitted in the first TTI length has been processed, simultaneously processing, by the terminal, the data transmitted in the first TTI length and the data transmitted in the second TTI length in the current sub-frame; when the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on a configuration signaling or a predefined rule; or for uplink transmission and/or downlink transmission, determining not to support the data transmitted in the first TTI length and the data transmitted in the second TTI length being simultaneously processed in a same sub-frame and in a same carrier, when the data transmitted in the first TTI length and the data transmitted in the second TTI length are simultaneously scheduled in the current sub-frame and in a same carrier, determining, by the terminal, to process the data transmitted in the first TTI length or the data transmitted in the second TTI length in the same carrier based on the configuration signaling or the predefined rule; or for uplink transmission and/or downlink transmission, determining not to support the data transmitted in the first TTI length and the data transmitted in the second TTI length being simultaneously processed in a same sub-frame, when the data transmitted in the first TTI length and the data transmitted in the second TTI length simultaneously exists in a current sub-frame, determining, by the terminal, to process the data transmitted in the first TTI length or the data transmitted in the second TTI length based on the configuration signaling or the predefined rule; or determining not to support the control channel transmitted in the first TTI length and the control channel transmitted in the second TTI length being simultaneously detected in a same sub-frame and in a same carrier, detecting, by the terminal the control channel transmitted in the first TTI length or the control channel transmitted in the second TTI length in the current sub-frame and in the same carrier based on the configuration signaling or the predefined rule; or determining not to support the control channel transmitted in the first TTI length and the control channel transmitted in the second TTI length being simultaneously detected in a same sub-frame, detecting, by the terminal the control channel transmitted in the first TTI length or the control channel transmitted in the second TTI length in the current sub-frame based on the configuration signaling or the predefined rule; or determining to support the control channel transmitted in the first TTI length and the control channel transmitted in the second TTI length being simultaneously detected in a same sub-frame and in a same carrier, simultaneously detecting, by the terminal, the control channel transmitted in the first TTI length and the control channel transmitted in the second TTI length in the current sub-frame and in the same carrier; or determining to support the control channel transmitted in the first TTI length and the control channel transmitted in the second TTI length being simultaneously detected in a same sub-frame, simultaneously detecting, by the terminal, the control channel transmitted in the first TTI length and the control channel transmitted in the second TTI length in the current sub-frame.

2. The data transmission method according to claim 1, wherein

Mode 3 of the determining the data transmitted in the first TTI length and/or the data transmitted in the second TTI length that are processed in the same sub-frame based on the capability of whether the data transmitted in the first TTI length and data transmitted in the second TTI length are simultaneously processed in the same sub-frame, reported by the terminal comprises:

when the capability indicates that the terminal supports the data transmitted in the first TTI length and the data transmitted in the second TTI length being simultaneously processed in the same sub-frame, if the data transmitted in the first TTI length and the data transmitted in the second TTI length are simultaneously scheduled in a current sub-frame, simultaneously processing, by the terminal, the data transmitted in the first TTI length and the data transmitted in the second TTI length in the current sub-frame, or determining, by the terminal, the data transmitted in the first TTI length and/or the data transmitted in the second TTI length that are processed by the terminal in the same sub-frame based on Mode 1 or Mode 2;

when the capability indicates that the terminal does not support the data transmitted in the first TTI length and the data transmitted in the second TTI length being simultaneously processed in the same sub-frame, when the data transmitted in the first TTI length and the data transmitted in the second TTI length are simultaneously scheduled in a current sub-frame, determining, by the terminal, to process the data transmitted in the first TTI length or the data transmitted in the second TTI length based on configuration signaling or the predefined rule; and/or when the capability indicates that the terminal supports a control channel transmitted in the first TTI length and a control channel transmitted in the second TTI length being simultaneously detected in a same sub-frame, simultaneously detecting, by the terminal, the control channel transmitted in the first TTI length and the control channel transmitted in the second TTI length in the current sub-frame;

when the capability indicates that the terminal does not support the control channel transmitted in the first TTI length and the control channel transmitted in the second TTI length being simultaneously detected in the same sub-frame, determining, by the terminal, to detect the control channel transmitted in the first TTI length or the control channel transmitted in the second TTI length in the current sub-frame based on the configuration signaling or the predefined rule;

Mode 2 of the determining the data transmitted in the first TTI length and/or the data transmitted in the second TTI length that are processed in the same sub-frame based on an upper limit value of the quantity of transport blocks or an upper limit value of the quantity of TTIs that are simultaneously processed in the same sub-frame comprises:

when a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or when the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, simultaneously processing, by the terminal, the data transmitted in the first TTI length and the data transmitted in the second TTI length in the current sub-frame; otherwise, determining, by the terminal, to process a part of the data transmitted in the first TTI length and the data transmitted in the second TTI length based on configuration signaling or the predefined rule; and Mode 1 of the determining the data transmitted in the first TTI length and/or the data transmitted in the second TTI length that are processed in the same sub-frame based on the carrier aggregation capability and/or the MIMO capability reported by the terminal comprises as least one of:

when the terminal does not support carrier aggregation, determining, by the terminal, not to support the data transmitted in the first TTI length and the data transmitted in the second TTI length being simultaneously processed in the same sub-frame; when the data transmitted in the first TTI length and the data transmitted in the second TTI length are simultaneously scheduled in a current sub-frame, determining, by the terminal, to process the data transmitted in the first TTI length or the data transmitted in the second TTI length based on configuration signaling or the predefined rule;

for uplink transmission, when the terminal does not support carrier aggregation and the data transmitted in the first TTI length and the data transmitted in the second TTI length are simultaneously scheduled in a current sub-frame: when the terminal has finished encoding of the data transmitted in the second TTI length before the data transmitted in the first TTI length has been processed, simultaneously processing, by the terminal, the data transmitted in the first TTI length and the data transmitted in the second TTI length in the current sub-frame; when the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on configuration signaling or the predefined rule;

when the terminal does not support carrier aggregation but supports MIMO, obtaining a total number of TBs based on the MIMO capability reported by the terminal; when a total number of the TBs of the data transmitted in the first TTI length that have an aligned start position in a time domain or overlap in the time domain and the data transmitted in the second TTI length in a current sub-frame is less than or equal to total number of TBs supported by the terminal, simultaneously processing, by the terminal, the data transmitted in the first TTI length and the data transmitted in the second TTI length in the current sub-frame; otherwise, Mode A: determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on configuration signaling or the predefined rule; and/or Mode B: for uplink transmission, when the terminal has finished the encoding of the data transmitted in the second TTI length before the data transmitted in the first TTI length has been processed, simultaneously processing, by the terminal, the data transmitted in the first TTI length and the data transmitted in the second TTI length in the current sub-frame; when the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on the configuration signaling or the predefined rule; and when the terminal supports carrier aggregation, determining an upper limit value of quantity of TBs or an upper limit value of the quantity of TTIs that are simultaneously processed by the terminal in the same sub-frame based on an upper limit value of the aggregated carriers supported by the terminal; or when the terminal supports carrier aggregation, determining the upper limit value of quantity of TBs that are simultaneously processed by the terminal in the same sub-frame based on the upper limit value of the aggregated carriers supported by the terminal and the MIMO capability of each aggregated carrier; or determining the upper limit value of the quantity of TBs that are simultaneously processed by the terminal in the same sub-frame based on the carrier aggregation capability and the MIMO capability of the terminal; when a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or when the total number of the TTIs of the data transmitted in the first TTI length that have an aligned start position in a time domain or overlap in the time domain and the data transmitted in the second TTI length in the current sub-frame is less than or equal to the upper limit value of the quantity of TTIs, simultaneously processing, by the terminal, the data transmitted in the first TTI length and the data transmitted in the second TTI length in the current sub-frame; otherwise, Mode A: determining, by the terminal, to process a part of the data transmitted in the first TTI length and the data transmitted in the second TTI length based on configuration signaling or the predefined rule; and/or Mode B: for uplink transmission, when the terminal has finished the encoding of the data transmitted in the second TTI length before the data transmitted in the first TTI length has been processed, simultaneously processing, by the terminal, the data transmitted in the first TTI length and the data transmitted in the second TTI length in the current sub-frame; when the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on the configuration signaling or the predefined rule, or when the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process a part of the data transmitted in the first TTI length and the data transmitted in the second TTI length based on the configuration signaling or the predefined rule.

3. The data transmission method according to claim 1, wherein the capability of whether the data transmitted in the first TTI length and the data transmitted in the second TTI length are simultaneously processed in the same sub-frame, reported by the terminal comprises:
  for uplink transmission and downlink transmission, the capability being reported together or separately; and/or
  for the terminal supporting carrier aggregation, the capability being reported together for all aggregated carriers or being reported separately for each aggregated carrier;

the capability of an upper limit value of quantity of transport blocks (TB) that are simultaneously processed in the same sub-frame or the capability of an upper limit value of quantity of TTIs that are simultaneously processed in the same sub-frame, reported by the terminal comprises:
  for uplink transmission and downlink transmission, the capability being reported together or separately.

4. The data transmission method according to claim 2, wherein the determining, by the terminal, to process the data transmitted in the first TTI length or the data transmitted in the second TTI length based on the configuration signaling or the predefined rule comprises:

the configuration singling indicating that the terminal determines to process one of the data transmitted in the first TTI length and the data transmitted in the second TTI length, or the configuration singling indicating that the terminal determines to process data with one TB or two TBs from the data transmitted in the first TTI length and the data transmitted in the second TTI length; or the predefined rule defining that the terminal determines to process one of the data transmitted in the first TTI length and the data transmitted in the second TTI length, or the predefined rule defining that the terminal determines to process data with one TB or two TBs from the data transmitted in the first TTI length and the data transmitted in the second TTI length; or the predefined rule defining that for downlink transmission, before a sub-frame where the data transmitted in the second TTI length belongs to, when the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or the predefined rule defining that for downlink transmission, in a sub-frame where the data transmitted in the second TTI length belongs to, when the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length; or the predefined rule defining that for uplink transmission, before a sub-frame where the data transmitted in the second TTI length belongs to, when the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or the predefined rule defining that for uplink transmission, in a sub-frame where the data transmitted in the second TTI length belongs to, when the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length; or wherein the detecting, by the terminal the control channel transmitted in the first TTI length or the control channel transmitted in the second TTI length based on the configuration signaling or the predefined rule comprises:

the configuration singling indicating that the terminal determines to detect one of the control channel transmitted in the first TTI length and the control channel transmitted in the second TTI length, or the configuration singling indicating that the terminal determines to detect a control channel with one TB or two TBs from the control channel transmitted in the first TTI length and the control channel transmitted in the second TTI length; or the predefined rule defining that the terminal determines to detect one of the control channel transmitted in the first TTI length and the control channel transmitted in the second TTI length, or the terminal determines to detect a control channel with one TB or two TBs from the control channel transmitted in the first TTI length and the control channel transmitted in the second TTI length; or the predefined rule defining that for downlink transmission, before a sub-frame where the control channel transmitted in the second TTI length belongs to, when the terminal receives scheduling information of the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for downlink transmission, in a sub-frame where the control channel transmitted in the second TTI length belongs to, when the terminal receives scheduling information of the control channel transmitted in the first TTI length in the sub-frame or a sub-frame next to the sub-frame, the terminal does not detect the control channel transmitted in the second TTI length in the sub-frame, and only detects the control channel transmitted in the first TTI length; or the predefined rule defining that for uplink transmission, before a sub-frame where the control channel transmitted in the second TTI length belongs to, when the terminal receives scheduling information of the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for uplink transmission, in a sub-frame where the control channel transmitted in the second TTI length belongs to, when the terminal receives scheduling information of the control channel transmitted in the first TTI length in the sub-frame or a sub-frame next to the sub-frame, the terminal does not detect the control channel transmitted in the second TTI length in the sub-frame, and only detects the control channel transmitted in the first TTI length.

5. The data transmission method according to claim 2, wherein the determining, by the terminal, to process a part of the data transmitted in the first TTI length and the data transmitted in the second TTI length based on configuration signaling or the predefined rule comprises:

the configuration signaling indicating that the terminal determines to process one of the data transmitted in the first TTI length and the data transmitted in the second TTI length, or the configuration signaling indicating that the terminal determines to process data with one TB or two TBs from the data transmitted in the first TTI length and the data transmitted in the second TTI length; when a total number of the TBs included in the determined data in a current sub-frame based on the configuration signaling exceeds an upper limit value of quantity of TBs or the total number of the TTIs included in the determined data in the current sub-frame based on the configuration signaling exceeds the upper limit value of the quantity of TTIs, the carrier index is further used for selection; or the configuration singling indicating that the terminal determines to process A1 data transmitted in the first TTI length and/or A2 data transmitted in the second TTI length, when the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the configuration signaling indicating a ratio to allocate the upper limit value of quantity of TBs or the upper limit value of the quantity of TTIs between the data transmitted in the first TTI length and the data transmitted in the second TTI length; when the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or when the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection; or the predefined rule defining that the terminal determines to process one of the data transmitted in the first TTI length and the data transmitted in the second TTI length, or the predefined rule defining that the terminal determines to process data with one TB or two TBs from the data transmitted in the first TTI length and the data transmitted in the second TTI length; when the total number of the TBs included in the determined data in the current sub-frame based on the predefined rule exceeds the upper limit value of the quantity of TBs or the total number of the TTIs included in the determined data in the current sub-frame based on the predefined rule exceeds the upper limit value of the quantity of TTIs, the carrier index is further used for selection; or the predefined rule defining that the terminal determines to process A1 data transmitted in the first TTI length and/or A2 data transmitted in the second TTI length, when the total number of the data transmitted in the first TTI length that has an aligned start position in a time domain or overlap in the time domain in the current sub-frame exceeds A1, and/or the total number of the data transmitted in the second TTI length exceeds A2, the carrier index is further used selection; or the predefined rule defining a ratio to allocate the upper limit value of the quantity of TBs or the upper limit value of the quantity of TTIs between the data transmitted in the first TTI length and the data transmitted in the second TTI length; when the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or when the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection.

6. The data transmission method according to claim 1, further comprising:

receiving or transmitting the data transmitted in the first TTI length and the data transmitted in the second TTI length in a same carrier, in a same sub-frame and in different frequency resources; or when the frequency resource used by the data transmitted in the first TTI length and the frequency resource used by the data transmitted in the second TTI length in a same carrier and in a same sub-frame overlap, for downlink transmission, determining, by the terminal, that a base station overwrites the data transmitted in the second TTI length by the data transmitted in the first TTI length at the overlapped frequency resource, and for uplink transmission, the terminal overwrites the data transmitted in the second TTI length by the data transmitted in the first TTI length at the overlapped frequency resource; or for uplink transmission, punching data of the data transmitted in the second TTI length on symbols overlapping with the data transmitted in the first TTI length when data transmitted in the first TTI length and the data transmitted in the second TTI length are in the same carrier and in the same sub-frame.

7. A data transmission method, comprising:

determining, by a base station, whether a terminal simultaneously processes data transmitted in a first Transmission Time Interval (TTI) length and data transmitted in a second TTI length in a same sub-frame based on capability reported by the terminal or a predefined rule, the data including a shared channel and/or a control channel;

wherein the first TTI length is less than the second TTI length, the determining, by a base station, data transmitted in the first TTI length and/or data transmitted in the second TTI length that are processed by a terminal in a same sub-frame based on capability reported by the terminal or a predefined rule comprises at least one of:

Mode 1: whether to simultaneously process data transmitted in the first TTI length and data transmitted in the second TTI length in the same sub-frame based on carrier aggregation capability and/or multiple-input multiple-output (MIMO) capability reported by the terminal;

Mode 2: whether to simultaneously process data transmitted in the first TTI length and data transmitted in the second TTI length in the same sub-frame based on the capability of an upper limit value of quantity of transport blocks (TB) that are simultaneously processed in the same sub-frame or the capability of an upper limit value of quantity of TTIs that are simultaneously processed in the same sub-frame, reported by the terminal; and Mode 3: whether to simultaneously process data transmitted in the first TTI length and data transmitted in the second TTI length in the same sub-frame based on capability of whether the data transmitted in the first TTI length and the data transmitted in the second TTI length are simultaneously processed in the same sub-frame, reported by the terminal, or wherein the determining data transmitted in the first TTI length and/or data transmitted in the second TTI length that are processed by the terminal in a same sub-frame based on a predefined rule comprises:

for uplink transmission, when the data transmitted in the first TTI length and the data transmitted in the second TTI length are simultaneously scheduled in a current sub-frame: when the terminal has finished the encoding of the data transmitted in the second TTI length before the data transmitted in the first TTI length has been processed, determining the data transmitted in the first TTI length and the data transmitted in the second TTI length being simultaneously processed by the terminal in the current sub-frame; when the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determining that the terminal processes the data transmitted in the first TTI length or the data transmitted in the second TTI length based on configuration signaling or the predefined rule; or for uplink transmission and for each carrier, when the data transmitted in the first TTI length and the data transmitted in the second TTI length are simultaneously scheduled in the current sub-frame: when the terminal has finished the encoding of the data transmitted in the second TTI length before the data transmitted in the first TTI length has been processed, determining the data transmitted in the first TTI length and the data transmitted in the second TTI length being simultaneously processed by the terminal in the current sub-frame; when the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determining that the terminal processes the data transmitted in the first TTI length or the data transmitted in the second TTI length based on a configuration signaling or a predefined rule; or for uplink transmission and/or downlink transmission, determining that the terminal does not support the data transmitted in the first TTI length and the data transmitted in the second TTI length being simultaneously processed in a same sub-frame and in a same carrier, when the data transmitted in the first TTI length and the data transmitted in the second TTI length are simultaneously scheduled in the current sub-frame and in a same carrier, determining that the terminal processes the data transmitted in the first TTI length or the data transmitted in the second TTI length in the same carrier based on the configuration signaling or the predefined rule; or for uplink transmission and/or downlink transmission, determining that the terminal does not support the data transmitted in the first TTI length and the data transmitted in the second TTI length simultaneously existing in a same sub-frame, when the data transmitted in the first TTI length and the data transmitted in the second TTI length are simultaneously scheduled in a current sub-frame, determining that the terminal processes the data transmitted in the first TTI length or the data transmitted in the second TTI length based on the configuration signaling or the predefined rule; or determining that the terminal does not support the control channel transmitted in the first TTI length and the control channel transmitted in the second TTI length being simultaneously detected in a same sub-frame and in a same carrier, determining that the terminal detects the control channel transmitted in the first TTI length or the control channel transmitted in the second TTI length in the current sub-frame and in the same carrier based on the configuration signaling or the predefined rule; or determining that the terminal does not support the control channel transmitted in the first TTI length and the control channel transmitted in the second TTI length being simultaneously detected in a same sub-frame, determining that the terminal detects the control channel transmitted in the first TTI length or the control channel transmitted in the second TTI length in the current sub-frame based on the configuration signaling or the predefined rule; or determining that the terminal supports the control channel transmitted in the first TTI length and the control channel transmitted in the second TTI length being simultaneously detected in a same sub-frame and in a same carrier, determining that the terminal detects the control channel transmitted in the first TTI length and the control channel transmitted in the second TTI length in the current sub-frame and in the same carrier; or determining that the terminal supports the control channel transmitted in the first TTI length and the control channel transmitted in the second TTI length being simultaneously detected in a same sub-frame, determining that the terminal detects the control channel transmitted in the first TTI length and the control channel transmitted in the second TTI length in the current sub-frame simultaneously.

8. The data transmission method according to claim 7, wherein

Mode 3 of the determining the data transmitted in the first TTI length and/or the data transmitted in the second TTI length that are processed by the terminal in the same sub-frame based on the capability of whether the data transmitted in the first TTI length and data transmitted in the second TTI length are simultaneously processed in the same sub-frame, reported by the terminal comprises:

when the capability indicates that the terminal supports the data transmitted in the first TTI length and the data transmitted in the second TTI length being simultaneously processed in the same sub-frame, when the data transmitted in the first TTI length and the data transmitted in the second TTI length are simultaneously scheduled in a current sub-frame, simultaneously processing, by the terminal, the data transmitted in the first TTI length and the data transmitted in the second TTI length in the current sub-frame; or determining the data transmitted in the first TTI length and/or the data transmitted in the second TTI length that are processed by the terminal in the same sub-frame based on Mode 1 or Mode 2;

when the capability indicates that the terminal does not support the data transmitted in the first TTI length and the data transmitted in the second TTI length being simultaneously processed in the same sub-frame, when the data transmitted in the first TTI length and the data transmitted in the second TTI length are simultaneously scheduled in a current sub-frame, determining to process the data transmitted in the first TTI length or the data transmitted in the second TTI length by the terminal based on configuration signaling or the predefined rule; and/or when the capability indicates that the terminal supports a control channel transmitted in the first TTI length and a control channel transmitted in the second TTI length being simultaneously detected in a same sub-frame, determining that the terminal simultaneously detects the control channel transmitted in the first TTI length and the control channel transmitted in the second TTI length in the current sub-frame;

when the capability indicates that the terminal does not support the control channel transmitted in the first TTI length and the control channel transmitted in the second TTI length being simultaneously detected in the same sub-frame, determining that the terminal detects the control channel transmitted in the first TTI length or the control channel transmitted in the second TTI length in the current sub-frame based on the configuration signaling or the predefined rule;

Mode 2 of the determining the data transmitted in the first TTI length and/or the data transmitted in the second TTI length that are processed by the terminal in the same sub-frame based on an upper limit value of the quantity of transport blocks or an upper limit value of the quantity of TTIs that are simultaneously processed in the same sub-frame comprises:

when a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or when the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, determining the data transmitted in the first TTI length and the data transmitted in the second TTI length being simultaneously processed by the terminal in the current sub-frame; otherwise, determining that the terminal processes a part of the data transmitted in the first TTI length and the data transmitted in the second TTI length based on configuration signaling or the predefined rule;

Mode 1 of the determining the data transmitted in the first TTI length and/or the data transmitted in the second TTI length that are processed by the terminal in the same sub-frame based on the carrier aggregation capability and/or the MIMO capability reported by the terminal comprises at least one of:

when the terminal does not support carrier aggregation, determining that the terminal does not support the data transmitted in the first TTI length and the data transmitted in the second TTI length being simultaneously processed in the same sub-frame; when the data transmitted in the first TTI length and the data transmitted in the second TTI length are simultaneously scheduled in a current sub-frame, determining that the terminal processes the data transmitted in the first TTI length or the data transmitted in the second TTI length based on configuration signaling or the predefined rule;

for uplink transmission, when the terminal does not support carrier aggregation and the data transmitted in the first TTI length and the data transmitted in the second TTI length are simultaneously scheduled in a current sub-frame: when the terminal has finished encoding of the data transmitted in the second TTI length before the data transmitted in the first TTI length has been processed, determining the data transmitted in the first TTI length and the data transmitted in the second TTI length being simultaneously processed by the terminal in the current sub-frame; when the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining that the terminal processes the data transmitted in the first TTI length or the data transmitted in the second TTI length based on configuration signaling or the predefined rule;

when the terminal does not support carrier aggregation but supports MIMO, obtaining a total number of TBs supported by the terminal based on the MIMO capability reported by the terminal; when a total number of the TBs of the data transmitted in the first TTI length that have an aligned start position in a time domain or overlap in the time domain and the data transmitted in the second TTI length in a current sub-frame is less than or equal to total number of TBs supported by the terminal, determining the data transmitted in the first TTI length and the data transmitted in the second TTI length being simultaneously processed by the terminal in the current sub-frame; otherwise, Mode A: determining that the terminal does not support the data transmitted in the first TTI length and the data transmitted in the second TTI length being simultaneously processed in the current sub-frame, and determining the data transmitted in the first TTI length or the data transmitted in the second TTI length being processed by the terminal based on configuration signaling or the predefined rule; and/or Mode B: for uplink transmission, when the terminal has finished the encoding of the data transmitted in the second TTI length before the data transmitted in the first TTI length has been processed, determining the data transmitted in the first TTI length and the data transmitted in the second TTI length being simultaneously processed by the terminal in the current sub-frame; when the terminal has not finished the encoding of the data transmitted in the second TTI length before the data transmitted in the first TTI length has been processed, determining that the terminal does not to support the data transmitted in the first TTI length and the data transmitted in the second TTI length being simultaneously processed in the current sub-frame, and determining that the terminal processes the data transmitted in the first TTI length or the data transmitted in the second TTI length based on the configuration signaling or the predefined rule; and when the terminal supports carrier aggregation, determining an upper limit value of quantity of TBs or an upper limit value of the quantity of TTIs that are simultaneously processed by the terminal in the same sub-frame based on an upper limit value of the aggregated carriers supported by the terminal; or when the terminal supports carrier aggregation, determining the upper limit value of quantity of TBs that are simultaneously processed by the terminal the upper limit value of quantity of TBs that are simultaneously processed by the terminal in the same sub-frame based on the upper limit value of the aggregated carriers supported by the terminal and the MIMO capability of each aggregated carrier; or determining the upper limit value of the quantity of TBs that are simultaneously processed by the terminal in the same sub-frame based on the carrier aggregation capability and the MIMO capability of the terminal; when a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or when the total number of the TTIs of the data transmitted in the first TTI length that have an aligned start position in a time domain or overlap in the time domain and the data transmitted in the second TTI length in the current sub-frame is less than or equal to the upper limit value of the quantity of TTIs, determining the data transmitted in the first TTI length and the data transmitted in the second TTI length being simultaneously processed by the terminal in the current sub-frame; otherwise, Mode A: determining a part of the data transmitted in the first TTI length and the data transmitted in the second TTI length being processed by the terminal based on configuration signaling or the predefined rule; and/or Mode B: for uplink transmission, when the terminal has finished the encoding of the data transmitted in the second TTI length before the data transmitted in the first TTI length has been processed, determining the data transmitted in the first TTI length and the data transmitted in the second TTI length being simultaneously processed by the terminal in the current sub-frame; when the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determining that the terminal processes the data transmitted in the first TTI length or the data transmitted in the second TTI length based on the configuration signaling or the predefined rule, or when the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determining that the terminal processes a part of the data transmitted in the first TTI length and the data transmitted in the second TTI length based on the configuration signaling or the predefined rule.

9. The data transmission method according to claim 7, wherein the capability of whether the data transmitted in the first TTI length and the data transmitted in the second TTI length are simultaneously processed in the same sub-frame, reported by the terminal comprises:
for uplink transmission and downlink transmission, the capability being reported together or separately; and/or
for the terminal supporting carrier aggregation, the capability being reported together for all aggregated carriers or being reported separately for each aggregated carrier; and
the capability of an upper limit value of quantity of transport blocks (TB) that are simultaneously processed in the same sub-frame or the capability of an upper limit value of quantity of TTIs that are simultaneously processed in the same sub-frame, reported by the terminal comprises:
for uplink transmission and downlink transmission, the capability being reported together or separately.

10. The data transmission method according to claim 8, wherein the determining that the terminal processes the data transmitted in the first TTI length or the data transmitted in the second TTI length based on the configuration signaling or the predefined rule comprises:
the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or
the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; or
the predefined rule defining that for downlink transmission, before a sub-frame where the data transmitted in the second TTI length belongs to, when the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or
the predefined rule defining that for downlink transmission, in a sub-frame where the data transmitted in the second TTI length belongs to, when the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length; or
the predefined rule defining that for uplink transmission, before a sub-frame where the data transmitted in the second TTI length belongs to, when the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or
the predefined rule defining that for uplink transmission, in a sub-frame where the data transmitted in the second TTI length belongs to, when the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length; or
the determining that the terminal detects the control channel transmitted in the first TTI length or the control channel transmitted in the second TTI length based on the configuration signaling or the predefined rule comprises:
the configuration singling indicating that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that for downlink transmission, before a sub-frame where the control channel transmitted in the second TTI length belongs to, when the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for downlink transmission, in a sub-frame where the control channel transmitted in the second TTI length belongs to, when the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length; or the predefined rule defining that for uplink transmission, before a sub-frame where the control channel transmitted in the second TTI length belongs to, when the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for uplink transmission, in a sub-frame where the control channel transmitted in the second TTI length belongs to, when the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length.

11. The data transmission method according to claim 8, wherein the determining that the terminal processes a part of the data transmitted in the first TTI length and the data transmitted in the second TTI length based on configuration signaling or the predefined rule comprises:

the configuration signaling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; when a total number of the TBs included in the determined data in a current sub-frame based on the configuration signaling exceeds an upper limit value of quantity of TBs or the total number of the TTIs included in the determined data in the current sub-frame based on the configuration signaling exceeds the upper limit value of the quantity of TTIs, the carrier index is further used for selection; or the configuration singling indicating that the terminal determines to using A1 data transmitted in the first TTI length and/or A2 data transmitted in the second TTI length, when the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the configuration signaling indicating a ratio to allocate the upper limit value of quantity of TBs or the upper limit value of the quantity of TTIs between the data transmitted in the first TTI length and the data transmitted in the second TTI length; when the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or when the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; when the total number of the TBs included in the determined data in the current sub-frame based on the predefined rule exceeds the upper limit value of the quantity of TBs or the total number of the TTIs included in the determined data in the current sub-frame based on the predefined rule exceeds the upper limit value of the quantity of TTIs, the carrier index is further used for selection; or the predefined rule defining that the terminal determines to using A1 data transmitted in the first TTI length and/or A2 data transmitted in the second TTI length, when the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the predefined rule defining a ratio to allocate the upper limit value of the quantity of TBs or the upper limit value of the quantity of TTIs between the data transmitted in the first TTI length and the data transmitted in the second TTI length; when the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or when the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection.

12. The data transmission method according to claim 7, further comprising:
scheduling the terminal to receive or transmit the data transmitted in the first TTI length and the data transmitted in the second TTI length in a same carrier, in a same sub-frame and in different frequency resources; or
when the frequency resource used by the data transmitted in the first TTI length and the frequency resource used by the data transmitted in the second TTI length in a same carrier and in a same sub-frame overlap, for downlink transmission, replacing, by the base station, the data transmitted in the second TTI length by the data transmitted in the first TTI length at the overlapped frequency resource, and for uplink transmission, determining, by the base station, that the terminal overwrites the data transmitted in the second TTI length by the data transmitted in the first TTI length at the overlapped frequency resource; or
for uplink transmission, punching data of the data transmitted in the second TTI length on symbols overlapping with the data transmitted in the first TTI length when data transmitted in the first TTI length and the data transmitted in the second TTI length are in the same carrier and in the same sub-frame.

13. A terminal, comprising:
a processor; and
a memory connected to the processor via a bus interface, and storing program and determined data by the processor,
wherein when the processor calls and executes the program and the data stored in the memory, the processor is configured to:
determine whether to simultaneously process data transmitted in a first Transmission Time Interval (TTI) length and data transmitted in a second TTI length in a same sub-frame based on capability reported by the terminal or a predefined rule, the data including a shared channel and/or a control channel,
wherein the first TTI length is less than the second TTI length;
wherein the determining, by a terminal, data transmitted in the first TTI length and/or data transmitted in the second TTI length that are processed in a same sub-frame based on capability reported by the terminal or a predefined rule comprises at least one of:
Mode 1: whether to simultaneously process data transmitted in the first TTI length and data transmitted in the second TTI length in the same sub-frame based on carrier aggregation capability and/or multiple-input multiple-output (MIMO) capability reported by the terminal;
Mode 2: whether to simultaneously process data transmitted in the first TTI length and data transmitted in the second TTI length in the same sub-frame based on capability of an upper limit value of quantity of transport blocks (TB) that are simultaneously processed in the same sub-frame or the capability of an upper limit value of quantity of TTIs that are simultaneously processed in the same sub-frame, reported by the terminal; and
Mode 3: whether to simultaneously process data transmitted in the first TTI length and data transmitted in the second TTI length in the same sub-frame based on capability of whether the data transmitted in the first TTI length and the data transmitted in the second TTI length are simultaneously processed in the same sub-frame, reported by the terminal,
or
wherein the determining, by a terminal, data transmitted in the first TTI length and/or data transmitted in the second TTI length that are processed in a same sub-frame based on a predefined rule comprises:
for uplink transmission, when the data transmitted in the first TTI length and the data transmitted in the second TTI length are simultaneously scheduled in a current sub-frame: when the terminal has finished the encoding of the data transmitted in the second TTI length before the data transmitted in the first TTI length has been processed, simultaneously processing, by the terminal, the data transmitted in the first TTI length and the data transmitted in the second TTI length in the current sub-frame; when the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on configuration signaling or the predefined rule; or
for uplink transmission and for each carrier, when the data transmitted in the first TTI length and the data transmitted in the second TTI length are simultaneously scheduled in the current sub-frame: when the terminal has finished the encoding of the data transmitted in the second TTI length before the data transmitted in the first TTI length has been processed, simultaneously processing, by the terminal, the data transmitted in the first TTI length and the data transmitted in the second TTI length in the current sub-frame; when the terminal has not finished the encoding of the data transmitted in the second TTI length before the data transmitted in the first TTI length has been processed, determining, by the terminal, not to support the data transmitted in the first TTI length and the data transmitted in the second TTI length being simultaneously processed in the current sub-frame, and determining, by the terminal, to process the data transmitted in the first TTI length or the data transmitted in the second TTI length based on a configuration signaling or a predefined rule; or
for uplink transmission and/or downlink transmission, determining not to support the data transmitted in the first TTI length and the data transmitted in the second TTI length being simultaneously processed in a same sub-frame and in a same carrier, when the data transmitted in the first TTI length and the data transmitted in the second TTI length are simultaneously scheduled in the current sub-frame and in a same carrier, determining, by the terminal, to process the data transmitted in the first TTI length or the data transmitted in the second TTI length in the same carrier based on the configuration signaling or the predefined rule; or for uplink transmission and/or downlink transmission, determining not to support the data transmitted in the first TTI length and the data transmitted in the second TTI length being simultaneously processed in a same sub-frame, when the data transmitted in the first TTI length and the data transmitted in the second TTI length simultaneously exists in a current sub-frame, determining, by the terminal, to process the data transmitted in the first TTI length or the data transmitted in the second TTI length based on the configuration signaling or the predefined rule; or determining not to support the control channel transmitted in the first TTI length and the control channel transmitted in the second TTI length being simultaneously detected in a same sub-frame and in a same carrier, detecting, by the terminal the control channel transmitted in the first TTI length or the control channel transmitted in the second TTI length in the current sub-frame and in the same carrier based on the configuration signaling or the predefined rule; or determining not to support the control channel transmitted in the first TTI length and the control channel transmitted in the second TTI length being simultaneously detected in a same sub-frame, detecting, by the terminal the control channel transmitted in the first TTI length or the control channel transmitted in the second TTI length in the current sub-frame based on the configuration signaling or the predefined rule; or determining to support the control channel transmitted in the first TTI length and the control channel transmitted in the second TTI length being simultaneously detected in a same sub-frame and in a same carrier, simultaneously detecting, by the terminal, the control channel transmitted in the first TTI length and the control channel transmitted in the second TTI length in the current sub-frame and in the same carrier; or determining to support the control channel transmitted in the first TTI length and the control channel transmitted in the second TTI length being simultaneously detected in a same sub-frame, simultaneously detecting, by the terminal, the control channel transmitted in the first TTI length and the control channel transmitted in the second TTI length in the current sub-frame.

14. The terminal according to claim 13, wherein the processor is configured to at least one of:

when the capability reported by the terminal indicates that the terminal supports the data transmitted in the first TTI length and the data transmitted in the second TTI length being simultaneously processed in the same sub-frame, when the data transmitted in the first TTI length and the data transmitted in the second TTI length are simultaneously scheduled in a current sub-frame, simultaneously process the data transmitted in the first TTI length and the data transmitted in the second TTI length in the current sub-frame; or determine the data transmitted in the first TTI length and/or the data transmitted in the second TTI length that are processed in the same sub-frame by using the second determination sub-module or the third determination sub-module; when the capability indicates that the terminal does not support the data transmitted in the first TTI length and the data transmitted in the second TTI length being simultaneously processed in the same sub-frame, when the data transmitted in the first TTI length and the data transmitted in the second TTI length are simultaneously scheduled in a current sub-frame, determine to process the data transmitted in the first TTI length or the data transmitted in the second TTI length based on configuration signaling or the predefined rule; and/or when the capability indicates that the terminal supports a control channel transmitted in the first TTI length and a control channel transmitted in the second TTI length being simultaneously detected in a same sub-frame, simultaneously detect the control channel transmitted in the first TTI length and the control channel transmitted in the second TTI length in the current sub-frame; when the capability indicates that the terminal does not support the control channel transmitted in the first TTI length and the control channel transmitted in the second TTI length being simultaneously detected in the same sub-frame, determine to detect the control channel transmitted in the first TTI length or the control channel transmitted in the second TTI length in the current sub-frame based on the configuration signaling or the predefined rule;

when a total number of the TBs of the data transmitted in the first TTI length that have an aligned start position in a time domain or overlap in the time domain and the data transmitted in the second TTI length in a current sub-frame is less than or equal to an upper limit value of quantity of TBs, or when the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, simultaneously process the data transmitted in the first TTI length and the data transmitted in the second TTI length in the current sub-frame; otherwise, determine to process a part of the data transmitted in the first TTI length and the data transmitted in the second TTI length based on configuration signaling or the predefined rule;

when the terminal does not support carrier aggregation, determine not to support the data transmitted in the first TTI length and the data transmitted in the second TTI length being simultaneously processed in the same sub-frame; when the data transmitted in the first TTI length and the data transmitted in the second TTI length are simultaneously scheduled in a current sub-frame, determine to process the data transmitted in the first TTI length or the data transmitted in the second TTI length based on configuration signaling or the predefined rule; for uplink transmission, when the terminal does not support carrier aggregation and the data transmitted in the first TTI length and the data transmitted in the second TTI length are simultaneously scheduled in a current sub-frame: when the terminal has finished encoding of the data transmitted in the second TTI length before the data transmitted in the first TTI length has been processed, simultaneously process the data transmitted in the first TTI length and the data transmitted in the second TTI length in the current sub-frame; when the terminal has not finished the encoding of the data transmitted in the second TTI length before the data transmitted in the first TTI length has been processed, determine not to support the data transmitted in the first TTI length and the data transmitted in the second TTI length being simultaneously processed in the current sub-frame, and determine to process the data transmitted in the first TTI length or the data transmitted in the second TTI length based on configuration signaling or the predefined rule; when the terminal does not support carrier aggregation but supports MIMO, obtain a total number of TBs based on the MIMO capability reported by the terminal; when a total number of the TBs of the data transmitted in the first TTI length that have an aligned start position in a time domain or overlap in the time domain and the data transmitted in the second TTI length in a current sub-frame is less than or equal to total number of TBs supported by the terminal, simultaneously process the data transmitted in the first TTI length and the data transmitted in the second TTI length in the current sub-frame; otherwise, Mode A: determine not to support the data transmitted in the first TTI length and the data transmitted in the second TTI length being simultaneously processed in the current sub-frame, and process the data transmitted in the first TTI length or the data transmitted in the second TTI length based on configuration signaling or the predefined rule; and/or Mode B: for uplink transmission, when encoding of the data transmitted in the second TTI length has finished before the data transmitted in the first TTI length has been processed, simultaneously process the data transmitted in the first TTI length and the data transmitted in the second TTI length in the current sub-frame; when the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and determine to process the data transmitted in the first TTI length or the data transmitted in the second TTI length based on the configuration signaling or the predefined rule; and when the terminal supports carrier aggregation, determine an upper limit value of quantity of TBs or an upper limit value of the quantity of TTIs that are simultaneously processed by the terminal in the same sub-frame based on an upper limit value of the aggregated carriers supported by the terminal; or when the terminal supports carrier aggregation, determine the upper limit value of quantity of TBs that are simultaneously processed by the terminal the upper limit value of quantity of TBs that are simultaneously processed by the terminal in the same sub-frame based on the upper limit value of the aggregated carriers supported by the terminal and the MIMO capability of each aggregated carrier; or determine the upper limit value of the quantity of TBs that are simultaneously processed by the terminal in the same sub-frame based on the carrier aggregation capability and the MIMO capability of the terminal; when a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or when the total number of the TTIs of the data transmitted in the first TTI length that have an aligned start position in a time domain or overlap in the time domain and the data transmitted in the second TTI length in the current sub-frame is less than or equal to the upper limit value of the quantity of TTIs, simultaneously process the data transmitted in the first TTI length and the data transmitted in the second TTI length in the current sub-frame; otherwise, Mode A: process a part of the data transmitted in the first TTI length and the data transmitted in the second TTI length based on configuration signaling or the predefined rule; and/or Mode B: for uplink transmission, when encoding of the data transmitted in the second TTI length has finished before the data transmitted in the first TTI length has been processed, simultaneously process the data transmitted in the first TTI length and the data transmitted in the second TTI length in the current sub-frame; when the terminal has not finished the encoding of the data transmitted in the second TTI length before the data transmitted in the first TTI length has been processed, determine not to support the data transmitted in the first TTI length and the data transmitted in the second TTI length being simultaneously processed in the current sub-frame, and determine to process the data transmitted in the first TTI length or the data transmitted in the second TTI length based on the configuration signaling or the predefined rule, or when the encoding of the data transmitted in the second TTI length has not finished before the data transmitted in the first TTI length has been processed, determine not to support the data transmitted in the first TTI length and the data transmitted in the second TTI length being simultaneously processed in the current sub-frame, and determine to process a part of the data transmitted in the first TTI length and the data transmitted in the second TTI length based on the configuration signaling or the predefined rule.

15. The terminal according to claim 13, wherein the capability of whether the data transmitted in the first TTI length and the data transmitted in the second TTI length are simultaneously processed in the same sub-frame, reported by the terminal comprises:
    for uplink transmission and downlink transmission, the capability being reported together or separately; and/or
    for the terminal supporting carrier aggregation, the capability being reported together for all aggregated carriers or being reported separately for each aggregated carrier; and
    the capability of an upper limit value of quantity of transport blocks (TB) that are simultaneously processed in the same sub-frame or the capability of an upper limit value of quantity of TTIs that are simultaneously processed in the same sub-frame, reported by the terminal comprises:
    for uplink transmission and downlink transmission, the capability being reported together or separately.

16. The terminal according to claim 14, wherein processor comprises:
    the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or
    the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; or the predefined rule defining that for downlink transmission, before a sub-frame where the data transmitted in the second TTI length belongs to, when the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or the predefined rule defining that for downlink transmission, in a sub-frame where the data transmitted in the second TTI length belongs to, when the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length; or the predefined rule defining that for uplink transmission, before a sub-frame where the data transmitted in the second TTI length belongs to, when the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or the predefined rule defining that for uplink transmission, in a sub-frame where the data transmitted in the second TTI length belongs to, when the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length; or the configuration signaling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; when a total number of the TBs included in the determined data in a current sub-frame based on the configuration signaling exceeds an upper limit value of quantity of TBs or the total number of the TTIs included in the determined data in the current sub-frame based on the configuration signaling exceeds the upper limit value of the quantity of TTIs, the carrier index is further used for selection; or the configuration singling indicating that the terminal determines to using A1 data transmitted in the first TTI length and/or A2 data transmitted in the second TTI length, when the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the configuration signaling indicating a ratio to allocate the upper limit value of quantity of TBs or the upper limit value of the quantity of TTIs between the data transmitted in the first TTI length and the data transmitted in the second TTI length; when the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or when the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; when the total number of the TBs included in the determined data in the current sub-frame based on the predefined rule exceeds the upper limit value of the quantity of TBs or the total number of the TTIs included in the determined data in the current sub-frame based on the predefined rule exceeds the upper limit value of the quantity of TTIs, the carrier index is further used for selection; or the predefined rule defining that the terminal determines to using A1 data transmitted in the first TTI length and/or A2 data transmitted in the second TTI length, when the total number of the data transmitted in the first TTI length that has an aligned start position in a time domain or overlap in the time domain in the current sub-frame exceeds A1, and/or the total number of the data transmitted in the second TTI length exceeds A2, the carrier index is further used selection; or the predefined rule defining a ratio to allocate the upper limit value of the quantity of TBs or the upper limit value of the quantity of TTIs between the data transmitted in the first TTI length and the data transmitted in the second TTI length; when the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or when the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection; or the configuration singling indicating that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that for downlink transmission, before a sub-frame where the control channel transmitted in the second TTI length belongs to, when the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for downlink transmission, in a sub-frame where the control channel transmitted in the second TTI length belongs to, when the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length; or the predefined rule defining that for uplink transmission, before a sub-frame where the control channel transmitted in the second TTI length belongs to, when the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for uplink transmission, in a sub-frame where the control channel transmitted in the second TTI length belongs to, when the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length.

17. The terminal according to claim 13, the processor is configured to:

receive or transmit the data transmitted in the first TTI length and the data transmitted in the second TTI length in a same carrier, in a same sub-frame and in different frequency resources; or when the frequency resource used by the data transmitted in the first TTI length and the frequency resource used by the data transmitted in the second TTI length in a same carrier and in a same sub-frame overlap, for downlink transmission, determine that a base station overwrites the data transmitted in the second TTI length by the data transmitted in the first TTI length at the overlapped frequency resource, and for uplink transmission, replace the data transmitted in the second TTI length by the data transmitted in the first TTI length at the overlapped frequency resource; or for uplink transmission, punch data of the data transmitted in the second TTI length on symbols overlapping with the data transmitted in the first TTI length when data transmitted in the first TTI length and the data transmitted in the second TTI length are in the same carrier and in the same sub-frame.

18. A base station, comprising:

a processor; and a memory connected to the processor via a bus interface, and storing program and determined data by the processor, wherein when the processor calls and executes the program and the data stored in the memory, the processor is configured to:

determine whether a terminal simultaneously processes data transmitted in a first Transmission Time Interval (TTI) length and data transmitted in a second TTI length in a same sub-frame based on capability reported by the terminal or a predefined rule, the data including a shared channel and/or a control channel;

wherein the first TTI length is less than the second TTI length;

the determining, by a base station, data transmitted in the first TTI length and/or data transmitted in the second TTI length that are processed by a terminal in a same sub-frame based on capability reported by the terminal or a predefined rule comprises at least one of:

Mode 1: whether to simultaneously process data transmitted in the first TTI length and data transmitted in the second TTI length in the same sub-frame based on carrier aggregation capability and/or multiple-input multiple-output (MIMO) capability reported by the terminal;

Mode 2: whether to simultaneously process data transmitted in the first TTI length and data transmitted in the second TTI length in the same sub-frame based on the capability of an upper limit value of quantity of transport blocks (TB) that are simultaneously processed in the same sub-frame or the capability of an upper limit value of quantity of TTIs that are simultaneously processed in the same sub-frame, reported by the terminal; and Mode 3: whether to simultaneously process data transmitted in the first TTI length and data transmitted in the second TTI length in the same sub-frame based on capability of whether the data transmitted in the first TTI length and the data transmitted in the second TTI length are simultaneously processed in the same sub-frame, reported by the terminal, or wherein the determining data transmitted in the first TTI length and/or data transmitted in the second TTI length that are processed by the terminal in a same sub-frame based on a predefined rule comprises:

for uplink transmission, when the data transmitted in the first TTI length and the data transmitted in the second TTI length are simultaneously scheduled in a current sub-frame: when the terminal has finished the encoding of the data transmitted in the second TTI length before the data transmitted in the first TTI length has been processed, determining the data transmitted in the first TTI length and the data transmitted in the second TTI length being simultaneously processed by the terminal in the current sub-frame; when the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determining that the terminal processes the data transmitted in the first TTI length or the data transmitted in the second TTI length based on configuration signaling or the predefined rule; or for uplink transmission and for each carrier, when the data transmitted in the first TTI length and the data transmitted in the second TTI length are simultaneously scheduled in the current sub-frame: when the terminal has finished the encoding of the data transmitted in the second TTI length before the data transmitted in the first TTI length has been processed, determining the data transmitted in the first TTI length and the data transmitted in the second TTI length being simultaneously processed by the terminal in the current sub-frame; when the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determining that the terminal processes the data transmitted in the first TTI length or the data transmitted in the second TTI length based on a configuration signaling or a predefined rule; or for uplink transmission and/or downlink transmission, determining that the terminal does not support the data transmitted in the first TTI length and the data transmitted in the second TTI length being simultaneously processed in a same sub-frame and in a same carrier, when the data transmitted in the first TTI length and the data transmitted in the second TTI length are simultaneously scheduled in the current sub-frame and in a same carrier, determining that the terminal processes the data transmitted in the first TTI length or the data transmitted in the second TTI length in the same carrier based on the configuration signaling or the predefined rule; or for uplink transmission and/or downlink transmission, determining that the terminal does not support the data transmitted in the first TTI length and the data transmitted in the second TTI length simultaneously existing in a same sub-frame, when the data transmitted in the first TTI length and the data transmitted in the second TTI length are simultaneously scheduled in a current sub-frame, determining that the terminal processes the data transmitted in the first TTI length or the data transmitted in the second TTI length based on the configuration signaling or the predefined rule; or determining that the terminal does not support the control channel transmitted in the first TTI length and the control channel transmitted in the second TTI length being simultaneously detected in a same sub-frame and in a same carrier, determining that the terminal detects the control channel transmitted in the first TTI length or the control channel transmitted in the second TTI length in the current sub-frame and in the same carrier based on the configuration signaling or the predefined rule; or determining that the terminal does not support the control channel transmitted in the first TTI length and the control channel transmitted in the second TTI length being simultaneously detected in a same sub-frame, determining that the terminal detects the control channel transmitted in the first TTI length or the control channel transmitted in the second TTI length in the current sub-frame based on the configuration signaling or the predefined rule; or determining that the terminal supports the control channel transmitted in the first TTI length and the control channel transmitted in the second TTI length being simultaneously detected in a same sub-frame and in a same carrier, determining that the terminal detects the control channel transmitted in the first TTI length and the control channel transmitted in the second TTI length in the current sub-frame and in the same carrier; or determining that the terminal supports the control channel transmitted in the first TTI length and the control channel transmitted in the second TTI length being simultaneously detected in a same sub-frame, determining that the terminal detects the control channel transmitted in the first TTI length and the control channel transmitted in the second TTI length in the current sub-frame simultaneously.

19. The base station according to claim 18, wherein the processor is configured to at least one of:

when the capability indicates that the terminal supports the data transmitted in the first TTI length and the data transmitted in the second TTI length being simultaneously processed in the same sub-frame, when the data transmitted in the first TTI length and the data transmitted in the second TTI length are simultaneously scheduled in a current sub-frame, simultaneously process the data transmitted in the first TTI length and the data transmitted in the second TTI length in the current sub-frame; or determine the data transmitted in the first TTI length and/or the data transmitted in the second TTI length that are processed by the terminal in the same sub-frame by using the fifth determination sub-module and the sixth determination sub-module; when the capability indicates that the terminal does not support the data transmitted in the first TTI length and the data transmitted in the second TTI length being simultaneously processed in the same sub-frame, when the data transmitted in the first TTI length and the data transmitted in the second TTI length are simultaneously scheduled in a current sub-frame, determine to process the data transmitted in the first TTI length or the data transmitted in the second TTI length by the terminal based on configuration signaling or the predefined rule; and/or when the capability indicates that the terminal supports a control channel transmitted in the first TTI length and a control channel transmitted in the second TTI length being simultaneously detected in a same sub-frame, determine that the terminal simultaneously detects the control channel transmitted in the first TTI length and the control channel transmitted in the second TTI length in the current sub-frame; when the capability indicates that the terminal does not support the control channel transmitted in the first TTI length and the control channel transmitted in the second TTI length being simultaneously detected in the same sub-frame, determine that the terminal detects the control channel transmitted in the first TTI length or the control channel transmitted in the second TTI length in the current sub-frame based on the configuration signaling or the predefined rule;

when a total number of the TBs of the data transmitted in the first TTI length that have an aligned start position in a time domain or overlap in the time domain and the data transmitted in the second TTI length in a current sub-frame is less than or equal to an upper limit value of quantity of TBs, or when the total number of the TTIs of the data transmitted in the first TTI length that have an aligned start position in a time domain or overlap in the time domain and the data transmitted in the second TTI length in the current sub-frame is less than or equal to the upper limit value of the quantity of TTI, determine the data transmitted in the first TTI length and the data transmitted in the second TTI length being simultaneously processed by the terminal in the current sub-frame; otherwise, determine that the terminal processes a part of the data transmitted in the first TTI length and the data transmitted in the second TTI length based on configuration signaling or the predefined rule;

when the terminal does not support carrier aggregation, determine that the terminal does not support the data transmitted in the first TTI length and the data transmitted in the second TTI length being simultaneously processed in the same sub-frame; when the data transmitted in the first TTI length and the data transmitted in the second TTI length are simultaneously scheduled in a current sub-frame, determine that the terminal processes the data transmitted in the first TTI length or the data transmitted in the second TTI length based on configuration signaling or the predefined rule;

for uplink transmission, when the terminal does not support carrier aggregation and the data transmitted in the first TTI length and the data transmitted in the second TTI length are simultaneously scheduled in a current sub-frame: when the terminal has finished encoding of the data transmitted in the second TTI length before the data transmitted in the first TTI length has been processed, determine the data transmitted in the first TTI length and the data transmitted in the second TTI length being simultaneously processed by the terminal in the current sub-frame; when the terminal has not finished the encoding of the data transmitted in the second TTI length before the data transmitted in the first TTI length has been processed, determine that the terminal does not support the data transmitted in the first TTI length and the data transmitted in the second TTI length are simultaneously processed in the current sub-frame, and determine that the terminal processes the data transmitted in the first TTI length or the data transmitted in the second TTI length based on configuration signaling or the predefined rule;

when the terminal does not support carrier aggregation but supports MIMO, obtain a total number of TBs supported by the terminal based on the MIMO capability reported by the terminal; when a total number of the TBs of the data transmitted in the first TTI length that have an aligned start position in a time domain or overlap in the time domain and the data transmitted in the second TTI length in a current sub-frame is less than or equal to total number of TBs supported by the terminal, determine the data transmitted in the first TTI length and the data transmitted in the second TTI length being simultaneously processed by the terminal in the current sub-frame; otherwise, Mode A: determine that the terminal does not support the data transmitted in the first TTI length and the data transmitted in the second TTI length being simultaneously processed in the current sub-frame, and determine the data transmitted in the first TTI length or the data transmitted in the second TTI length being processed by the terminal based on configuration signaling or the predefined rule; and/or Mode B: for uplink transmission, when the terminal has finished the encoding of the data transmitted in the second TTI length before the data transmitted in the first TTI length has been processed, determine the data transmitted in the first TTI length and the data transmitted in the second TTI length being simultaneously processed by the terminal in the current sub-frame; when the terminal has not finished the encoding of the data transmitted in the second TTI length before the data transmitted in the first TTI length has been processed, determine that the terminal does not to support the data transmitted in the first TTI length and the data transmitted in the second TTI length being simultaneously processed in the current sub-frame, and determine that the terminal processes the data transmitted in the first TTI length or the data transmitted in the second TTI length based on the configuration signaling or the predefined rule; and when the terminal supports carrier aggregation, determine an upper limit value of quantity of TBs or an upper limit value of the quantity of TTIs that are simultaneously processed by the terminal in the same sub-frame based on an upper limit value of the aggregated carriers supported by the terminal; or when the terminal supports carrier aggregation, determine the upper limit value of quantity of TBs that are simultaneously processed by the terminal the upper limit value of quantity of TBs that are simultaneously processed by the terminal in the same sub-frame based on the upper limit value of the aggregated carriers supported by the terminal and the MIMO capability of each aggregated carrier; or determine the upper limit value of the quantity of TBs that are simultaneously processed by the terminal in the same sub-frame based on the carrier aggregation capability and the MIMO capability of the terminal; when a total number of the TBs of the data transmitted in the first TTI length that have an aligned start position in a time domain or overlap in the time domain and the data transmitted in the second TTI length in a current sub-frame is less than or equal to the upper limit value of the quantity of TBs, or when the total number of the TTIs of the data transmitted in the first TTI length that have an aligned start position in a time domain or overlap in the time domain and the data transmitted in the second TTI length in the current sub-frame is less than or equal to the upper limit value of the quantity of TTIs, determine the data transmitted in the first TTI length and the data transmitted in the second TTI length being simultaneously processed by the terminal in the current sub-frame; otherwise, Mode A: determine a part of the data transmitted in the first TTI length and the data transmitted in the second TTI length being processed by the terminal based on configuration signaling or the predefined rule; and/or Mode B: for uplink transmission, when the terminal has finished the encoding of the data transmitted in the second TTI length before the data transmitted in the first TTI length has been processed, determine the data transmitted in the first TTI length and the data transmitted in the second TTI length being simultaneously processed by the terminal in the current sub-frame; when the terminal has not finished the encoding of the data transmitted in the second TTI length before the data transmitted in the first TTI length has been processed, determine that the terminal does not support the data transmitted in the first TTI length and the data transmitted in the second TTI length being simultaneously processed in the current sub-frame, and determine that the terminal processes the data transmitted in the first TTI length or the data transmitted in the second TTI length based on the configuration signaling or the predefined rule, or when the terminal has not finished the encoding of the data transmitted in the second TTI length before the data transmitted in the first TTI length has been processed, determining that the terminal does not support the data transmitted in the first TTI length and the data transmitted in the second TTI length being simultaneously processed in the current sub-frame, and determine that the terminal processes a part of the data transmitted in the first TTI length and the data transmitted in the second TTI length based on the configuration signaling or the predefined rule.

20. The base station according to claim 18, wherein the capability of whether the data transmitted in the first TTI length and the data transmitted in the second TTI length are simultaneously processed in the same sub-frame, reported by the terminal comprises:
  for uplink transmission and downlink transmission, the capability being reported together or separately; and/or
  for the terminal supporting carrier aggregation, the capability being reported together for all aggregated carriers or being reported separately for each aggregated carrier,
  the capability of an upper limit value of quantity of transport blocks (TB) that are simultaneously processed in the same sub-frame or the capability of an upper limit value of quantity of TTIs that are simultaneously processed in the same sub-frame, reported by the terminal comprises:
  for uplink transmission and downlink transmission, the capability being reported together or separately.

21. The base station according to claim 19, wherein the processor comprises:
  the configuration singling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; or
  the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; or
  the predefined rule defining that for downlink transmission, before a sub-frame where the data transmitted in the second TTI length belongs to, when the terminal receives scheduling information of the data transmitted in the first TTI length in the sub-frame where the data transmitted in the second TTI length belongs to, the terminal does not receive and/or process the data transmitted in the second TTI length in the sub-frame, and only receives and/or processes the data transmitted in the first TTI length; or
  the predefined rule defining that for downlink transmission, in a sub-frame where the data transmitted in the second TTI length belongs to, when the terminal receives scheduling information of the data transmitted in the first TTI length in the sub-frame or a sub-frame next to the sub-frame, the terminal does not receive and/or process the data transmitted in the second TTI length in the sub-frame, and only receives and/or processes the data transmitted in the first TTI length; or
  the predefined rule defining that for uplink transmission, before a sub-frame where the data transmitted in the second TTI length belongs to, when the terminal receives scheduling information of the data transmitted in the first TTI length in the sub-frame where the data transmitted in the second TTI length belongs to, the terminal does not process and/or transmit the data transmitted in the second TTI length in the sub-frame, and only processes and/or transmits the data transmitted in the first TTI length; or
  the predefined rule defining that for uplink transmission, in a sub-frame where the data transmitted in the second TTI length belongs to, when the terminal receives scheduling information of the data transmitted in the first TTI length in the sub-frame or a sub-frame next to the sub-frame, the terminal does not process and/or transmit the data transmitted in the second TTI length in the sub-frame, and only processes and/or transmits the data transmitted in the first TTI length; or
  the configuration signaling indicating that the terminal determines to process one of the data transmitted in the first TTI length and the data transmitted in the second TTI length, or the terminal determines to process data with one TB or two TBs from the data transmitted in the first TTI length and the data transmitted in the second TTI length; when a total number of the TBs included in the determined data in a current sub-frame based on the configuration signaling exceeds an upper limit value of quantity of TBs or the total number of the TTIs included in the determined data in the current sub-frame based on the configuration signaling exceeds the upper limit value of the quantity of TTIs, the carrier index is further used for selection; or
  the configuration singling indicating that the terminal determines to using A1 data transmitted in the first TTI length and/or A2 data transmitted in the second TTI length, when the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or
  the configuration signaling indicating a ratio to allocate the upper limit value of quantity of TBs or the upper limit value of the quantity of TTIs between the data transmitted in the first TTI length and the data transmitted in the second TTI length; when the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or when the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection; or the predefined rule defining that the terminal determines to process one of the data transmitted in the first TTI length and the data transmitted in the second TTI length, or the terminal determines to process data with one TB or two TBs from the data transmitted in the first TTI length and the data transmitted in the second TTI length; when the total number of the TBs included in the determined data in the current sub-frame based on the predefined rule exceeds the upper limit value of the quantity of TBs or the total number of the TTIs included in the determined data in the current sub-frame based on the predefined rule exceeds the upper limit value of the quantity of TTIs, the carrier index is further used for selection; or the predefined rule defining that the terminal determines to using A1 data transmitted in the first TTI length and/or A2 data transmitted in the second TTI length, when the total number of the data transmitted in the first TTI length that has an aligned start position in a time domain or overlap in the time domain in the current sub-frame exceeds A1, and/or the total number of the data transmitted in the second TTI length exceeds A2, the carrier index is further used for selection; or the predefined rule defining a ratio to allocate the upper limit value of the quantity of TBs or the upper limit value of the quantity of TTIs between the data transmitted in the first TTI length and the data transmitted in the second TTI length; when the total number of TBs in the data transmitted in the first TTI length that has an aligned start position in a time domain or overlap in the time domain in the current sub-frame exceeds the total number of the TBs in the data transmitted in the first TTI length determined based on the ratio, or the total number of TTIs in the data transmitted in the first TTI length that has an aligned start position in a time domain or overlap in the time domain in the current sub-frame exceeds the total number of the TTIs in the data transmitted in the first TTI length determined based on the ratio, and/or when the total number of TBs in the data transmitted in the second TTI length in the current sub-frame exceeds the total number of the TBs in the data transmitted in the second TTI length determined based on the ratio, or the total number of TTIs in the data transmitted in the second TTI length in the current sub-frame exceeds the total number of the TTIs in the data transmitted in the second TTI length determined based on the ratio, the carrier index is further used for selection; or the configuration singling indicating that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that the terminal determines to detect one of the control channel transmitted in the first TTI length and the control channel transmitted in the second TTI length, or the terminal determines to use a control channel including one TB or two TBs from the control channel transmitted in the first TTI length and the control channel transmitted in the second TTI length; or the predefined rule defining that for downlink transmission, before a sub-frame where the control channel transmitted in the second TTI length belongs to, when the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for downlink transmission, in a sub-frame where the control channel transmitted in the second TTI length belongs to, when the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length; or the predefined rule defining that for uplink transmission, before a sub-frame where the control channel transmitted in the second TTI length belongs to, when the terminal receives scheduling information of using the control channel transmitted in the first TTI length in the sub-frame where the control channel transmitted in the second TTI length belongs to, the terminal does not detect the control channel transmitted in the second TTI length in the sub-frame, and only detects the control channel transmitted in the first TTI length; or the predefined rule defining that for uplink transmission, in a sub-frame where the control channel transmitted in the second TTI length belongs to, when the terminal receives scheduling information of using the control channel transmitted in the first TTI length in the sub-frame or a sub-frame next to the sub-frame, the terminal does not detect the control channel transmitted in the second TTI length in the sub-frame, and only detects the control channel transmitted in the first TTI length.

22. The base station according to claim 18, the processor is configured to:

schedule the terminal to receive or transmit the data transmitted in the first TTI length and the data transmitted in the second TTI length in a same carrier, in a same sub-frame and in different frequency resources; or when the frequency resource used by the data transmitted in the first TTI length and the frequency resource used by the data transmitted in the second TTI length in a same carrier and in a same sub-frame overlap, for downlink transmission, replace the data transmitted in the second TTI length by the data transmitted in the first TTI length at the overlapped frequency resource, and for uplink transmission, determine that the terminal overwrites the data transmitted in the second TTI length by the data transmitted in the first TTI length at the overlapped frequency resource; or for uplink transmission, punch data of the data transmitted in the second TTI length on symbols overlapping with the data transmitted in the first TTI length when data transmitted in the first TTI length and the data transmitted in the second TTI length are in the same carrier and in the same sub-frame.

\* \* \* \* \*